United States Patent
Challenger et al.

(10) Patent No.: US 7,426,534 B2
(45) Date of Patent: Sep. 16, 2008

(54) METHOD AND SYSTEM FOR CACHING MESSAGE FRAGMENTS USING AN EXPANSION ATTRIBUTE IN A FRAGMENT LINK TAG

(75) Inventors: James R. H. Challenger, Garrison, NY (US); Michael H. Conner, Austin, TX (US); George P. Copeland, Austin, TX (US); Arun K. Iyengar, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 779 days.

(21) Appl. No.: 10/034,771

(22) Filed: Dec. 19, 2001

(65) Prior Publication Data

US 2003/0191800 A1    Oct. 9, 2003

(51) Int. Cl.
*G06F 15/16* (2006.01)
(52) U.S. Cl. .............. 709/203; 203/214; 203/217; 203/201; 711/1; 711/111; 711/113; 711/118; 711/122; 711/133; 707/10
(58) Field of Classification Search .......... 709/203, 709/206, 214, 217; 711/1, 111, 113, 118, 711/122, 133; 707/10
See application file for complete search history.

(56) References Cited

U.S. PATENT DOCUMENTS

| | | | |
|---|---|---|---|
| 5,050,166 A | 9/1991 | Cantoni et al. | 370/473 |
| 5,815,516 A | 9/1998 | Aaker et al. | 371/53 |
| 5,897,622 A | 4/1999 | Blinn et al. | 705/26 |
| 5,973,696 A | 10/1999 | Agranat et al. | |
| 5,983,227 A | 11/1999 | Nazem et al. | 707/10 |
| 5,987,480 A | 11/1999 | Donohue et al. | 715/501.1 |

(Continued)

FOREIGN PATENT DOCUMENTS

JP       11024982 A       1/1999

(Continued)

OTHER PUBLICATIONS

Dingle et al., "Web cache coherence," Computer Networks and ISDN Systems, v. 28, n. 7-11, pp. 907-920, May 1996.

(Continued)

*Primary Examiner*—Nathan J. Flynn
*Assistant Examiner*—Alina N. Boutah
(74) *Attorney, Agent, or Firm*—Hamilton & Terrile, LLP; Michael Rocco Cannatti

(57) ABSTRACT

A method, a system, an apparatus, and a computer program product are presented for a fragment caching methodology. After a message is received at a computing device that contains a cache management unit, a fragment in the message body of the message is cached. Subsequent requests for the fragment at the cache management unit result in a cache hit. A FRAGMENTLINK tag is used to specify the location in a fragment for an included or linked fragment which is to be inserted into the fragment during fragment or page assembly or page rendering. A FRAGMENTLINK tag may include a FOREACH attribute that is interpreted as indicating that the FRAGMENTLINK tag should be replaced with multiple FRAGMENTLINK tags. The FOREACH attribute has an associated parameter that has multiple values that are used in identifying multiple fragments for the multiple FRAGMENTLINK tags.

6 Claims, 28 Drawing Sheets

U.S. PATENT DOCUMENTS

| | | | |
|---|---|---|---|
| 6,029,182 A | 2/2000 | Nehab et al. ................ 715/523 |
| 6,067,569 A | 5/2000 | Khaki et al. ................ 709/224 |
| 6,115,752 A | 9/2000 | Chauhan ..................... 709/241 |
| 6,128,627 A | 10/2000 | Mattis et al. ................ 707/202 |
| 6,138,158 A | 10/2000 | Boyle et al. ................ 709/225 |
| 6,163,779 A | 12/2000 | Mantha et al. .............. 707/100 |
| 6,167,451 A | 12/2000 | Stracke, Jr. ................. 709/230 |
| 6,170,013 B1 | 1/2001 | Murata ....................... 709/229 |
| 6,192,382 B1* | 2/2001 | Lafer et al. ................. 715/513 |
| 6,219,676 B1 | 4/2001 | Reiner ........................ 707/201 |
| 6,226,642 B1 | 5/2001 | Beranek et al. ............... 707/10 |
| 6,230,196 B1* | 5/2001 | Guenthner et al. .......... 709/223 |
| 6,249,844 B1* | 6/2001 | Schloss et al. .............. 711/122 |
| 6,253,234 B1* | 6/2001 | Hunt et al. .................. 709/213 |
| 6,345,292 B1* | 2/2002 | Daugherty et al. .......... 709/214 |
| 6,427,187 B2* | 7/2002 | Malcolm ..................... 711/119 |
| 6,456,308 B1 | 9/2002 | Agranat et al. |
| 6,457,103 B1* | 9/2002 | Challenger et al. .......... 711/133 |
| 6,539,460 B2* | 3/2003 | Castelli et al. .............. 711/154 |
| 6,557,076 B1* | 4/2003 | Copeland et al. ............ 711/118 |
| 6,584,548 B1 | 6/2003 | Bourne et al. ............... 711/134 |
| 6,615,235 B1* | 9/2003 | Copeland et al. ............ 709/203 |
| 6,678,791 B1* | 1/2004 | Jacobs et al. ................ 711/118 |
| 6,718,427 B1* | 4/2004 | Carlson et al. ................. 711/5 |
| 6,771,264 B1* | 8/2004 | Duluk et al. ................. 345/426 |
| 6,983,310 B2 | 1/2006 | Rouse et al. |
| 7,028,072 B1 | 4/2006 | Kliger et al. |
| 7,047,281 B1 | 5/2006 | Kausik |
| 7,072,984 B1 | 7/2006 | Polonsky et al. |
| 7,269,784 B1 | 9/2007 | Kasriel et al. |
| 2002/0004813 A1* | 1/2002 | Agrawal et al. ............. 709/201 |
| 2002/0007393 A1* | 1/2002 | Hamel ........................ 709/203 |
| 2002/0016828 A1 | 2/2002 | Daugherty et al. |
| 2002/0108122 A1 | 8/2002 | Alao et al. |
| 2002/0112009 A1 | 8/2002 | Capers et al. |
| 2002/0184444 A1* | 12/2002 | Shandony ................... 711/118 |
| 2003/0039249 A1* | 2/2003 | Basso et al. ................. 370/394 |
| 2003/0061352 A1* | 3/2003 | Bohrer et al. ................ 709/226 |
| 2003/0076850 A1* | 4/2003 | Jason, Jr. .................... 370/414 |
| 2003/0101431 A1* | 5/2003 | Duesterwald et al. ....... 717/111 |
| 2003/0101439 A1* | 5/2003 | Desoli et al. ................ 717/148 |
| 2003/0120875 A1* | 6/2003 | Bourne et al. ............... 711/144 |
| 2004/0073630 A1 | 4/2004 | Copeland et al. |

FOREIGN PATENT DOCUMENTS

| | | |
|---|---|---|
| JP | 2000172614 A | 6/2000 |
| JP | 2000250803 A | 9/2000 |
| JP | 2000305836 A | 11/2000 |
| JP | 2000311108 A | 11/2000 |
| WO | WO 00/77615 | 12/2000 |
| WO | WO 02/17082 | 2/2002 |

OTHER PUBLICATIONS

R. Metcalfe, IEEE Internet Computing—Scaling the Internet, vol. 1, No. 2, Mar./Apr. 1997.

2000 IEEE International Conference on Personal Wireless Communications, Conference Proceedings, Dec. 2000, Hyderabad, India.

2000 IEEE International Symposium on Performance Analysis of Systems and Software, ISPASS, Apr. 24-25, 2000, Austin, Texas.

AV Proceedings—Seventh International Workshop on Research Issues in Data Engineering, High Performance Database Management for Large-Scale Applications, Apr. 7-8, 1997, Birmingham, England, IEEE Computer Society Technical Committee on Data Engineering.

Patterson et al., "Using HTML 4" 1998, Que Corporation, $3^{rd}$ ed., pp. 6-8.

Microsoft Computer Dictionary, Fifth Edition, p. 443, Microsoft Press, 2002.

Hampton, Kip, High Performance XML Parsing with SAX, XML.com, Feb. 14, 2001, http://www.xml.com/pub/a/2001/02/14/perlsax.html.

About SAX, Genesis, FAQ, http://sax.sourceforge.net. FAQ last modified Nov. 28, 2001.

* cited by examiner

```
<!ELEMENT FRAGMENTLINK - O EMPTY  -- fragment directive -->
<!ATTLIST FRAGMENTLINK
src      %URL       #REQUIRED -- primary URL of the fragment
alt      %URL       #IMPLIED  -- alternate URL of the fragment
parms    %parmlist  #IMPLIED  -- query parms applied to src
foreach %string     #IMPLIED  -- name of cookie used for
                              -- foreach processing
showlink no|comment|CDATA #IMPLIED
   -- whether this fragmentlink tag should be included as a
   -- comment in the assembled page
id       ID         #IMPLIED  -- unique name of this element
class    CDATA      #IMPLIED  -- class name of this element
>

<!ENTITY % parmlist "CDATA"
 -- Space delimited list of form element names
-->

Start tag: required; End tag: forbidden.
```

FIG. 3

```
Fragment = "Fragment" ":" 1#fragment-directive fragment-directive   = fragment-request-directive
                     | fragment-response-directive fragment-response-directive = "contains-fragments"
                            | "dependencies" "=" quoted-list
                            | "cacheid" "=" rulelist fragment-request-directive  = "supports-fragments"

quoted-list = <"> 1#string <"> rulelist = <"> 1#cacherule <"> cacherule = "(" parmrule [","  cookierule] ")" | "URL"

parmrule = 1#parmname
parmname = string | "[" string "]"

cookierule = 1#cookiename
cookiename = string | "[" string "]"
```

FIG. 4

METHOD AND SYSTEM FOR CACHING MESSAGE FRAGMENTS USING AN EXPANSION ATTRIBUTE IN A FRAGMENT LINK TAG

CROSS-REFERENCE TO RELATED APPLICATIONS

The present application is related to the following applications:

application Ser. No. 10/034,724, filed Dec. 19, 2001, titled "Method and system for caching role-specific fragments";

application Ser. No. 10/034,748, filed Dec. 19, 2001, titled "Method and system for caching fragments while avoiding parsing of pages that do not contain fragments";

application Ser. No. 10/034,770, filed Dec. 19, 2001, titled "Method and system for restrictive caching of user-specific fragments limited to a fragment cache closest to user";

application Ser. No. 10/034,772, filed Dec. 19, 2001, titled "Method and system for fragment linking and fragment caching"; and application Ser. No. 10/034,726, filed Dec. 19, 2001, titled "Method and system for processing multiple fragment requests in a single message".

BACKGROUND OF THE INVENTION

1. Field of the Invention

The present invention relates to an improved data processing system and, in particular, to a data processing system with improved network resource allocation. Still more particularly, the present invention provides a method and system for caching data objects within a computer network.

2. Description of Related Art

The amount of data that is transmitted across the Internet continues to grow at a rate that exceeds the rate of growth in the number of users of the Internet or the rate of growth in the number of their transactions. A major factor in this growth is the changing nature of World Wide Web sites themselves. In the early phase of the World Wide Web, Web pages were comprised mainly of static content, such as text, images and links to other sites. The extent of the user's interaction with a Web site was to download an HTML page and its elements. Since the content was usually the same regardless of who requested the page, it was comparatively simple for the Web server to support numerous users. The present trend however, is toward interactive Web sites in which the content and appearance of the Web site change in response to specific users and/or user input. This is particularly true for e-commerce sites, which support online product selection and purchasing. Such sites are distinguished from earlier Web sites by their greater dynamic content. A familiar example of this is the "online catalog" provided at many Internet business sites. Each customer logged onto the site to make a purchase has the opportunity to browse the catalog, and even peruse detailed information on thousands of products. Seemingly, the Web server must maintain and update a unique Web page for each shopper. Internet users enjoy the convenience of such customizable, interactive Web sites, and customer expectations will undoubtedly provide an impetus for further use of dynamic content in Web pages.

The burgeoning use of dynamic content in Internet Web pages causes certain logistical problems for the operators of Web sites. Today's e-commerce sites are characterized by extremely high "browse-to-buy ratios". For shopping sites, a typical ratio is 60 interactions that do not update permanent business records ("requests" or "queries") to each one that does ("transactions")—browsing a product description is an example of a request, while making a purchase exemplifies a transaction. One effect of the increasing prevalence of dynamic content is that, although the number of transactions is growing at a predictable and manageable rate, the number of requests is growing explosively. The high user-interactivity of Web pages containing dynamic content is responsible for the large number of requests per transaction. The dynamic content within those Web pages is typically generated each time that a user requests to browse one of these Web pages. This results in a tremendous amount of content that must be prepared and conveyed to the user during a single session.

User expectations compel the site provider to provide dynamic Web content promptly in response to their requests. If potential customers perceive the Web site as too slow, they may cease visiting the site, resulting in lost business. However, dealing with the sheer volume of Internet traffic may impose an inordinate financial burden on an e-business. The most straightforward way for an e-business to meet the increasing demand for information by potential customers is to augment its server-side hardware by adding more computers, storage, and bandwidth. This solution can be prohibitively expensive and inefficient.

A more cost effective approach is caching, a technique commonly employed in digital computers to enhance performance. The main memory used in a computer for data storage is typically much slower than the processor. To accommodate the slower memory during a data access, wait states are customarily added to the processor's normal instruction timing. If the processor were required to always access data from the main memory, its performance would suffer significantly. Caching utilizes a small but extremely fast memory buffer, termed a "cache", to capture the advantage of a statistical characteristic known as "data locality" in order to overcome the main memory access bottleneck. Data locality refers to the common tendency for consecutive data accesses to involve the same general region of memory. This is sometimes stated in terms of the "80/20" rule in which 80% of the data accesses are to the same 20% of memory.

The following example, although not Web-related, illustrates the benefits of caching in general. Assume one has a computer program to multiply two large arrays of numbers and wants to consider ways the computer might be modified to allow it to run the program faster. The most straightforward modification would be to increase the speed of the processor, which has limitations. Each individual multiply operation in the program requires the processor to fetch two operands from memory, compute the product, and then write the result back to memory. At higher processor speeds, as the time required for the computation becomes less significant, the limiting factor becomes the time required for the processor to interact with memory. Although faster memory could be used, the use of a large amount of extremely high-speed memory for all of the computer's memory needs would be too impractical and too expensive. Fortunately, the matrix multiplication program exhibits high data locality since the elements of each of the two input arrays occupy consecutive addresses within a certain range of memory. Therefore, instead of using a large amount of extremely high-speed memory, a small amount of it is employed as a cache. At the start of the program, the input arrays from the main memory are transferred to the cache buffer. While the program executes, the processor fetches operands from the cache and writes back corresponding results to the cache. Since data accesses use the high-speed cache, the processor is able to execute the program much faster than if it had used main memory. In fact, the use of cache results in a speed improvement nearly as great as if the entire main memory were upgraded but at a significantly lower cost. Note that a cache system is beneficial only in situations where the assumption of data locality is justified; if the processor frequently has to go outside the cache for data, the speed advantage of the cache disappears.

Another issue connected with the use of a data cache is "cache coherency." As described above, data are typically copied to a cache to permit faster access. Each datum in the cache is an identical copy of the original version in main memory. A problem can arise if one application within the computer accesses a variable in main memory while another application accesses the copy in the cache. If either version of the variable is changed independently of the other, the cache loses coherency with potentially harmful results. For example, if the variable is a pointer to critical operating system data, a fatal error may occur. To avoid this, the state of the cache must be monitored. When data in the cache is modified, the "stale" copies in the main memory are temporarily invalidated until they can be updated. Hence, an important aspect of any cache-equipped system is a process to maintain cache coherency.

In view of these well-known issues and benefits, caches have been implemented within data processing systems at various locations within the Internet or within private networks, including so-called Content Delivery Networks (CDNs). As it turns out, Web traffic is well-suited to caching. The majority of e-commerce Internet traffic consists of data that is sent from the server to the user rather than vice versa. In most cases, the user requests information from a Web site, and the user sends information to the Web site relatively infrequently. For example, a user frequently requests Web pages and relatively infrequently submits personal information or transactional information that is stored at the Web site. Hence, the majority of the data traffic displays good cache coherency characteristics. Moreover, the majority of the data traffic displays good data locality characteristics because a user tends to browse and re-browse the content of a single Web site for some period of time before moving to a different Web site. In addition, many users tend to request the same information, and it would be more efficient to cache the information at some point than to repeatedly retrieve it from a database. Additionally, most web applications can tolerate some slack in how up-to-date the data is. For example, when a product price is changed, it may be tolerable to have a few minutes of delay for the change to take effect, i.e. cache coherency can be less than perfect, which also makes caching more valuable.

The benefits of caching Web content can be broadly illustrated in the following discussion. Each request from a client browser may flow through multiple data processing systems that are located throughout the Internet, such as firewalls, routers, and various types of servers, such as intermediate servers, presentation servers (e.g., reading static content, building dynamic pages), application servers (e.g., retrieving data for pages, performing updates), and backend servers (e.g., databases, services, and legacy applications). Each of these processing stages has associated cost and performance considerations.

If there is no caching at all, then all requests flow through to the presentation servers, which can satisfy some requests because they do not require dynamic content. Unfortunately, many requests also require processing from the application servers and backend servers to make updates or to obtain data for dynamic content pages.

However, a request need only propagate as far as is necessary to be satisfied, and performance can be increased with the use of caches, particularly within the application provider's site. For example, caching in an intermediate server may satisfy a majority of the requests so that only a minority of the requests propagate to the presentation servers. Caching in the presentation servers may handle some of the requests that reach the presentation servers, so that only a minority of the requests propagate to the application servers. Since an application server is typically transactional, limited caching can be accomplished within an application server. Overall, however, a significant cost savings can be achieved with a moderate use of caches within an application provider's site.

Given the advantages of caching, one can improve the responsiveness of a Web site that contains dynamic Web content by using caching techniques without the large investment in servers and other hardware that was mentioned above. However, a major consideration for the suitability of caching is the frequency with which the Web content changes. In general, the implementation of a cache becomes feasible as the access rate increases and the update rate decreases. More specifically, the caching of Web content is feasible when the user frequently retrieves static content from a Web site and infrequently sends data to be stored at the Web site. However, if the Web site comprises a significant amount of dynamic content, then the Web site is inherently configured such that its content changes frequently. In this case, the update rate of a cache within the Web site increases significantly, thereby nullifying the advantages of attempting to cache the Web site's content.

Various solutions for efficiently caching dynamic content within enterprises have been proposed and/or implemented. These techniques for caching Web content within a Web application server have significantly improved performance in terms of throughput and response times.

After gaining significant advantages of caching dynamic content within e-business Web sites, it would be advantageous to implement cooperative caches throughout networks themselves, so-called "distributed caching", because caching content closer to the user could yield much more significant benefits in response time or latency. However, well-known caching issues would have to be considered for a distributed caching solution. Indiscriminate placement and implementation of caches may increase performance in a way that is not cost-effective. Important issues that determine the effectiveness of a cache include the cache size, the cache hit path length, the amount of work required to maintain the cache contents, and the distance between the data requester and the location of the data.

With respect to cache size, memories and disk space continue to increase in size, but they are never big enough such that one does not need to consider their limitations. In other words, a distributed caching technique should not assume that large amounts of memory and disk space are available for a cache, and the need for a small cache is generally preferable to the need for a large cache. In addition, the bandwidth of memories and disks is improving at a slower rate than their sizes is increasing, and any attempt to cache larger and larger amounts of data will eventually be limited by bandwidth considerations.

With respect to cache hit path length, a distributed caching solution should preferably comprise a lightweight runtime application that can be deployed easily yet determine cache hits with a minimum amount of processing such that the throughput of cache hits is very large. The desired form of a distributed caching application should not be confused with other forms of distributed applications that also "cache" data close to end-users. In other words, there are other forms of applications that benefit from one of many ways of distributing parts of an application and its associated data throughout the Internet. For example, an entire application and its associated databases can be replicated in different locations, and the deploying enterprise can then synchronize the databases and maintain the applications as necessary. In other cases, the read-only display portion of an application and its associated data can be distributed to client-based browsers using plug-ins, JavaScript™, or similar mechanisms while keeping business logic at a protected host site.

With respect to the amount of work required to maintain the cache contents, caching within the serving enterprise improves either throughput or cost, i.e. the number of requests that are processed per second or the amount of required server hardware, because less work is done per request. Within the serving enterprise, the cache is preferably located closer to the entry point of the enterprise because the amount of processing by any systems within the enterprise is reduced, thereby increasing any improvements. For example, caching near a dispatcher can be much more effective than caching within an application server. Caching within the serving enterprise improves latency somewhat, but this is typically secondary because the latency within the serving enterprise is typically much smaller than the latency across the internet. Considerations for a robust distributed caching technique outside of the serving enterprise is intertwined with this and other issues.

With respect to the distance between the data requester and the location of the data, user-visible latency in the Internet is dominated by the distance between the user and the content. This distance is measured more by the number of routing hops than by physical distance. When content is cached at the "boundaries" of the Internet, such as Internet Service Providers (ISPs), user-visible latency is significantly reduced. For large content, such as multimedia files, bandwidth requirements can also be significantly reduced. A robust distributed caching solution should attempt to cache data close to users.

Since users are geographically spread out, caching content close to users means that the content has to be replicated in multiple caches at ISPs and exchange points throughout the internet. In general, this can reduce the control that the caching mechanism has over the security of the content and the manner in which the content is updated, i.e. cache coherency. One can maintain a coherent cache within a serving enterprise relatively easily given the fact that the caching mechanism within the serving enterprise is ostensibly under the control of a single organization. However, maintaining caches both inside and outside of the serving enterprise significantly increases the difficulty and the amount of work that is required to ensure cache coherency. Although the security and coherency considerations can be minimized if content distribution vendors, e.g., CDNs, are used in which cache space is rented and maintained within a much more controlled network environment than the public Internet, such solutions effectively nullify some of the advantages that are obtained through the use of open standards through the public Internet.

Preferably, a distributed caching technique should be implementable with some regard to enterprise boundaries yet also implementable throughout the Internet in a coordinated manner. In addition, caches should be deployable at a variety of important locations as may be determined to be necessary, such as near an end-user, e.g., in a client browser, near a serving enterprise's dispatcher, within a Web application server, or anywhere in between. Moreover, the technique should adhere to specifications such that different organizations can construct different implementations of a distributed caching specification in accordance with local system requirements.

The issues regarding any potentially robust distributed caching solution are complicated by the trend toward authoring and publishing Web content as fragments. A portion of content is placed into a fragment, and larger content entities, such as Web pages or other documents, are composed of fragments, although a content entity may be composed of a single fragment. Fragments can be stored separately and then assembled into a larger content entity when it is needed.

These runtime advantages are offset by the complexity in other aspects of maintaining and using fragments. Fragments can be assigned different lifetimes, thereby requiring a consistent invalidation mechanism. In addition, while fragments can be used to separate static portions of content from dynamic portions of content so that static content can be efficiently cached, one is confronted with the issues related to the caching of dynamic content, as discussed above. Most importantly, fragment assembly has been limited to locations within enterprise boundaries.

Therefore, it would be advantageous to have a robust distributed caching technique that supports caching of fragments and other objects. Moreover, it would be particularly advantageous to co-locate fragment assembly at cache sites throughout a network with either much regard or little regard for enterprise boundaries as is deemed necessary, thereby reducing processing loads on a serving enterprise and achieving additional benefits of distributed computing when desired. In addition, it would be advantageous to have a consistent naming technique such that fragments can be uniquely identified throughout the Internet, i.e. so that the distributed caches are maintained coherently.

As a further consideration for a robust distributed caching solution, any potential solution should consider the issue of existing programming models. For example, one could propose a distributed caching technique that required the replacement of an existing Web application server's programming model with a new programming model that works in conjunction with the distributed caching technique. Preferably, an implementation of a distributed caching technique would accommodate various programming models, thereby avoiding any favoritism among programming models.

It would be advantageous that an implementation of the distributed caching technique resulted in reduced fragment cache sizes that are maintainable by lightweight processes in a standard manner throughout the Internet with minimal regard to cache location. In addition, it would be particularly advantageous for the distributed caching technique to be compatible with existing programming models and Internet standards such that an implementation of the distributed caching technique is interoperable with other systems that have not implemented the distributed caching technique.

SUMMARY OF THE INVENTION

A method, a system, an apparatus, and a computer program product are presented for a fragment caching methodology. After a message is received at a computing device that contains a cache management unit, a fragment in the message body of the message is cached. Subsequent requests for the fragment at the cache management unit result in a cache hit. The cache management unit operates equivalently in support of fragment caching operations without regard to whether the computing device acts as a client, a server, or a hub located throughout the network; in other words, the fragment caching methodology is uniform throughout a network.

A FRAGMENT header is defined to be used within a network protocol, such as HTTP; the header associates metadata with a fragment for various purposes related to the processing and caching of a fragment. Cache ID rules accompany a fragment from an origin server; the cache ID rules describe a method for forming a unique cache ID for the fragment such that dynamic content can be cached away from an origin server. A cache ID may be based on a URI (Uniform Resource Identifier) for a fragment, but the cache ID may also be based on query parameters and/or cookies.

A FRAGMENTLINK tag is used to specify the location in a fragment for an included or linked fragment which is to be inserted into the fragment during fragment or page assembly or page rendering. A FRAGMENTLINK tag may include a FOREACH attribute that is interpreted as indicating that the FRAGMENTLINK tag should be replaced with multiple FRAGMENTLINK tags. The FOREACH attribute has an associated parameter that names a cookie having multiple values that are used in identifying multiple fragments for the multiple FRAGMENTLINK tags.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 3 is a formal Standard Generalized Markup Language (SGML) definition of the FRAGMENTLINK tag in accordance with a preferred embodiment of the present invention;

FIG. 4 is a formal definition of the FRAGMENT header in accordance with a preferred embodiment of the present invention;

DETAILED DESCRIPTION OF THE INVENTION

The present invention is directed to a distributed fragment caching technique. In general, the devices that may comprise or relate to the present invention include a wide variety of data processing technology. Therefore, as background, a typical organization of hardware and software components within a distributed data processing system is described prior to describing the present invention in more detail.

Figure 1A:
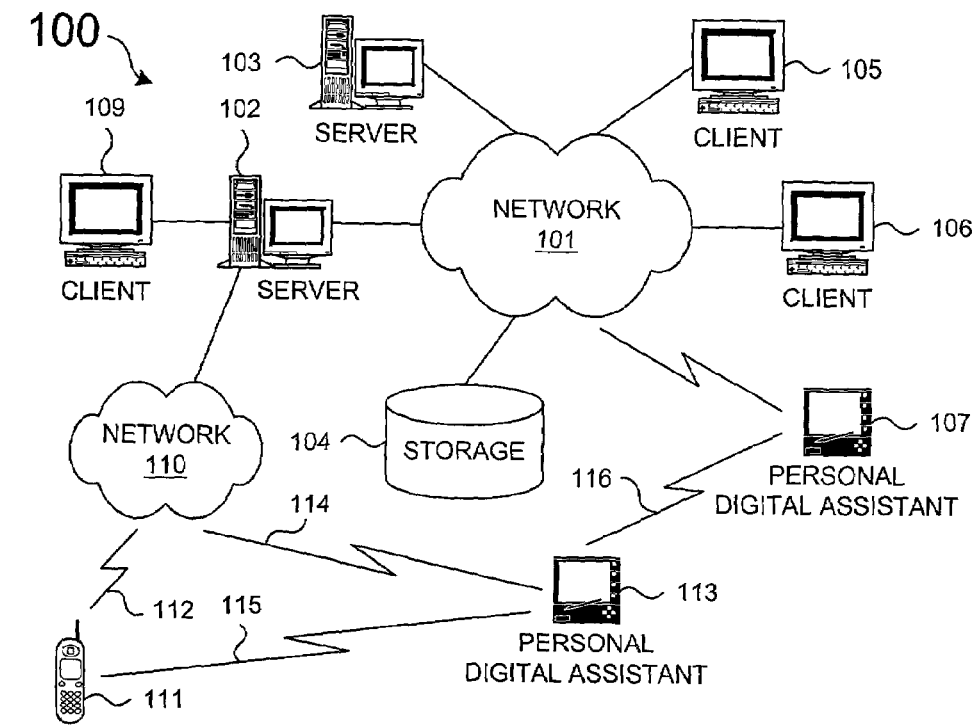
FIG. 1A depicts a typical distributed data processing system in which the present invention may be implemented.

With reference now to the figures, FIG. 1A depicts a typical network of data processing systems, each of which may implement some aspect of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown. It should be noted that the distributed data processing system shown in FIG. 1A is contemplated as being fully able to support a variety of peer-to-peer subnets and peer-to-peer services.

In the depicted example, distributed data processing system 100 may include the Internet with network 101 representing a global collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), a wireless LAN, or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention. It should be noted that the subsequent examples specifically refer to client-type functionality as compared to server-type functionality. However, as is well-known, some computing devices exhibit both client-type functionality and server-type functionality, such as hubs or computing devices, i.e. peers, within a peer-to-peer network. The present invention is able to be implemented on clients, servers, peers, or hubs as necessary.

Figure 1B:
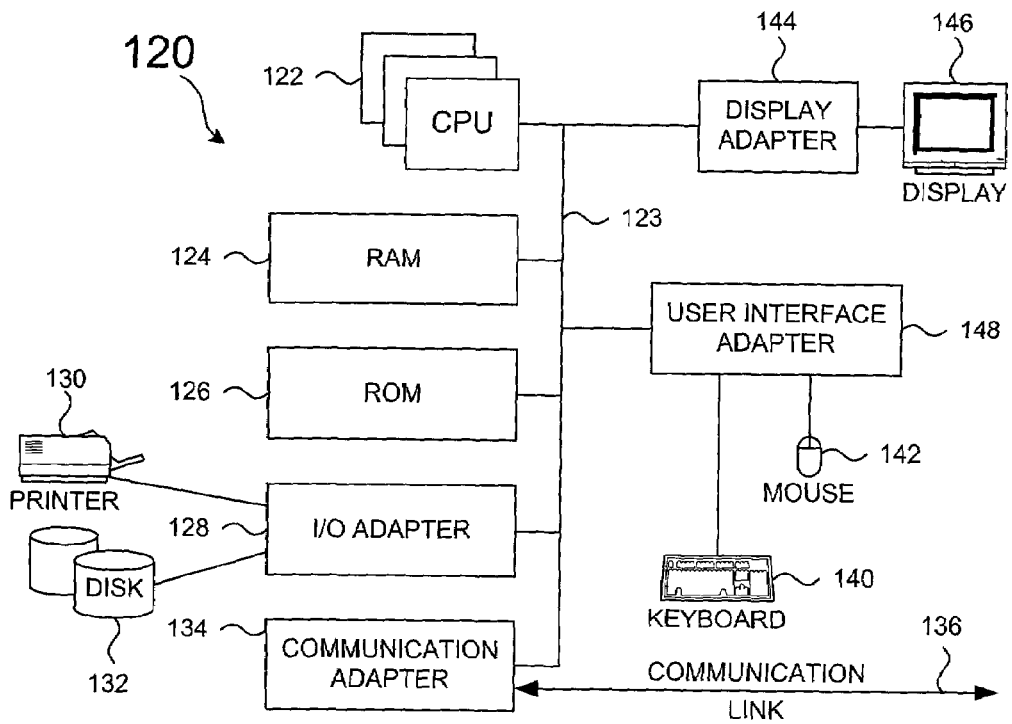
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140, mouse 142, or other devices not shown, such as a touch screen, stylus, or microphone. Display adapter 144 connects system bus 123 to display 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would expect to find some similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Linux® operating system, while another device contains a simple Java® runtime environment. A representative computer platform may include a browser, which is a well-known software application for accessing files, documents, objects, or other data items in a variety of formats and encodings, such as graphic files, word processing files, Extensible Markup Language (XML), Hypertext Markup Language (HTML), Handheld Device Markup Language (HDML), Wireless Markup Language (WML). These objects are typically addressed using a Uniform Resource Identifier (URI). The set of URIs comprises Uniform Resource Locators (URLs) and Uniform Resource Names (URNs).

Figure 1C:
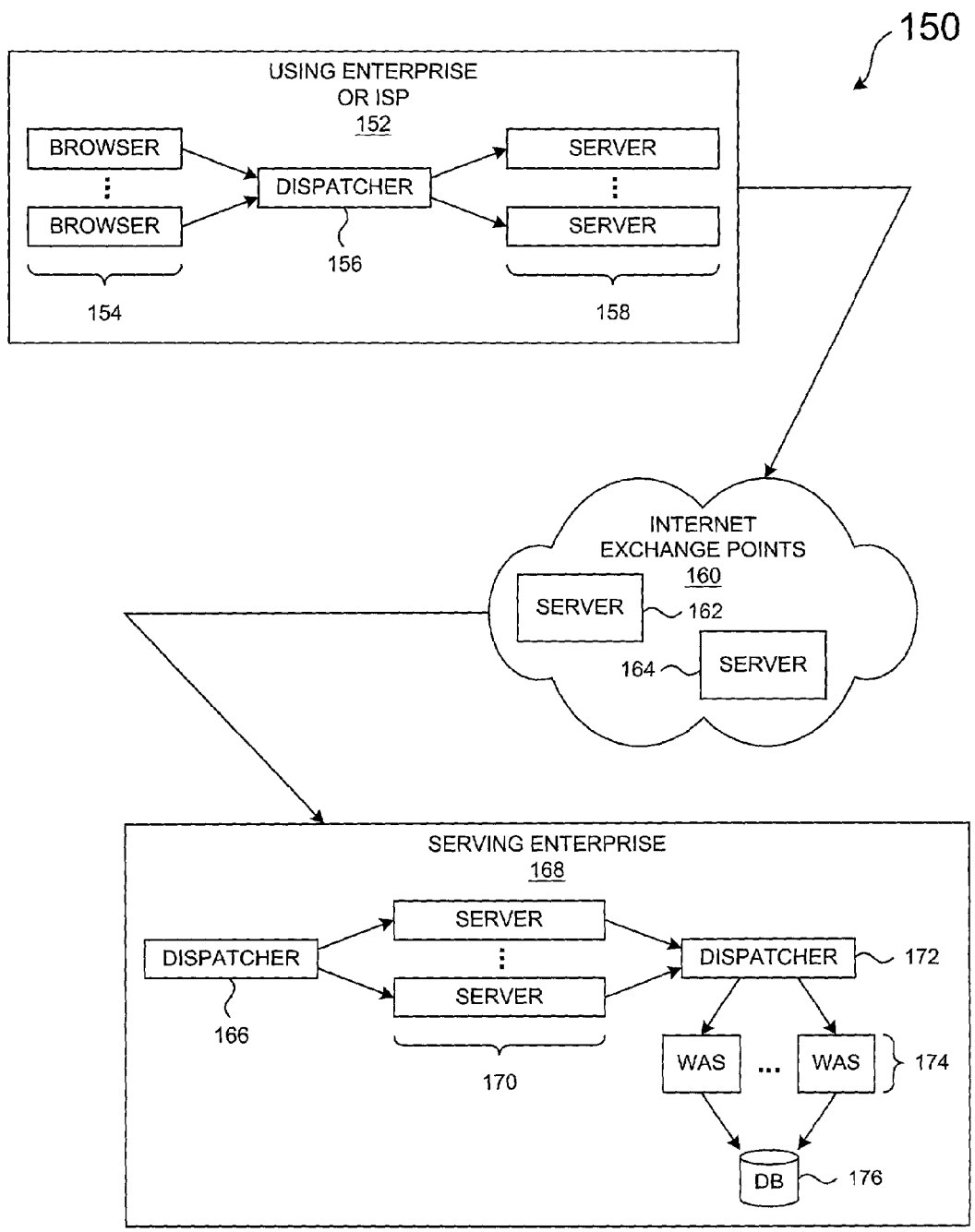
FIG. 1C depicts a typical distributed data processing system in which caches are implemented throughout a distributed data processing system.

With reference now to FIG. 1C, a diagram depicts a typical distributed data processing system, such as the one shown in FIG. 1A, in which caches are implemented throughout the distributed data processing system. Distributed data processing system 150 contains requesting entity 152 that generates requests for content. Requesting entity 152 may be an ISP that serves various individual or institutional customers or an enterprise that uses the requested content for various purposes. As data, e.g., a request, moves from the requesting entity (using entity) toward the responding entity (serving entity, e.g., an origin server), the data is described as moving "upstream". As data, e.g., a response, moves from the responding entity toward the receiving entity, the data is described as moving "downstream".

Requests from client browsers 154 are routed by dispatcher 156, which evenly distributes the requests through a set of intermediate servers 158 in an attempt to satisfy the requests prior to forwarding the requests through the Internet at Internet exchange point 160. Each browser 154 may maintain a local cache, and each server 158 supports a forward proxy caching mechanism. Internet exchange point 160 also contains intermediate servers 162 and 164, each of which may maintain a cache. Various considerations for implementing a cache in browsers 154 or in intermediate servers 158, 160, 162, and 164 include improving response times and/or reducing bandwidth.

Requests are then routed from Internet exchange point 160 to dispatcher 166 in serving enterprise 168. Dispatcher 166 evenly distributes incoming requests through intermediate servers 170 that attempt to satisfy the requests prior to forwarding the requests to dispatcher 172; each intermediate server 170 supports a reverse proxy caching mechanism. Unfulfilled requests are evenly distributed by dispatcher 172 across Web application servers 174, which are able to ultimately satisfy a request in conjunction with database services or other applications that access database 176. Various considerations for implementing a cache in intermediate servers 170 or in Web application servers 174 include improving throughput and/or reducing costs.

Responses are routed in the opposite direction from the serving enterprise to a client device. It should be noted that similar intermediate servers can be deployed within the using enterprise, throughout the Internet, or within the serving enterprise. It should also be noted that each successive stage away from the client through which a request passes adds to the perceived response time.

The present invention may be implemented on a variety of hardware and software platforms, as described above. More specifically, though, the present invention is directed to a distributed fragment caching technique. Before describing the present invention in more detail, though, some background information is provided on static and dynamic Web content in general.

The format of Web pages containing static text and graphic content is typically specified using markup languages, such as HTML. The markup consists of special codes or tags which control the display of words and images when the page is read by an Internet browser. However, Java Server Pages (JSPs) and servlets are more suitable for Web pages containing dynamic content.

Basically, a JSP is a markup language document with embedded instructions that describe how to process a request for the page in order to generate a response that includes the page. The description intermixes static template content with dynamic actions implemented as Java code within a single document. Using JSP, one can also inline Java code into the page as server-side scriptlets. In other words, Java tags are specified on a Web page and run on the Web server to modify the Web page before it is sent to the user who requested it. This approach is appropriate when the programming logic is relatively minor. Having any more than a trivial amount of programming logic inside the markup language document defeats the advantages of JSP: separating the presentation of a document from the business logic that is associated with the document. To avoid inlining excessive amounts of code directly into the markup language document, JSP enables the ability to isolate business logic into JavaBeans which can be accessed at runtime using simple JSP tags.

More specifically, a JSP uses markup-like tags and scriptlets written in the Java programming language to encapsulate the logic that generates some or all of the content for the page. The application logic can reside in server-based resources, such as JavaBean components, that the page accesses with these tags and scriptlets. Use of markup language tags permits the encapsulation within a markup language document of useful functionality in a convenient form that can also be manipulated by tools, e.g., HTML page builders/editors. By separating the business logic from the presentation, a reusable component-based design is supported. JSP enables Web page authors to insert dynamic content modules into static HTML templates, thus greatly simplifying the creation of Web content. JSP is an integral part of Sun's Java Enterprise Edition (J2EE) programming model.

It should be noted that although the examples of the present invention that are discussed below may employ JSPs, the present invention is not restricted to this embodiment. Other types of server pages, e.g., Microsoft's Active Server Pages (ASPs), could also be employed.

A product display JSP presents data about products. A request for a particular product, e.g., a wrench, will identify that JSP as well as a product id as a query parameter. An execution of that JSP with a product id parameter outputs a page of HTML. When the underlying data for that product changes, e.g., the wrench price increases, that page should be invalidated. To do this, a dependency must be established between the page and the data by associating a dependency id that represents the data with the page.

Granularity is a characteristic of Web pages that is important to an efficient caching strategy. The content of a Web page is comprised of several components, some of which may change frequently while others are relatively static. The granularity of a Web page may be described in terms of "fragments", which are portions of content. A fragment can be created in a variety of manners, including fulfilling an HTTP request for a JSP file. In the above example, the product display page is a single fragment page.

Figure 2:
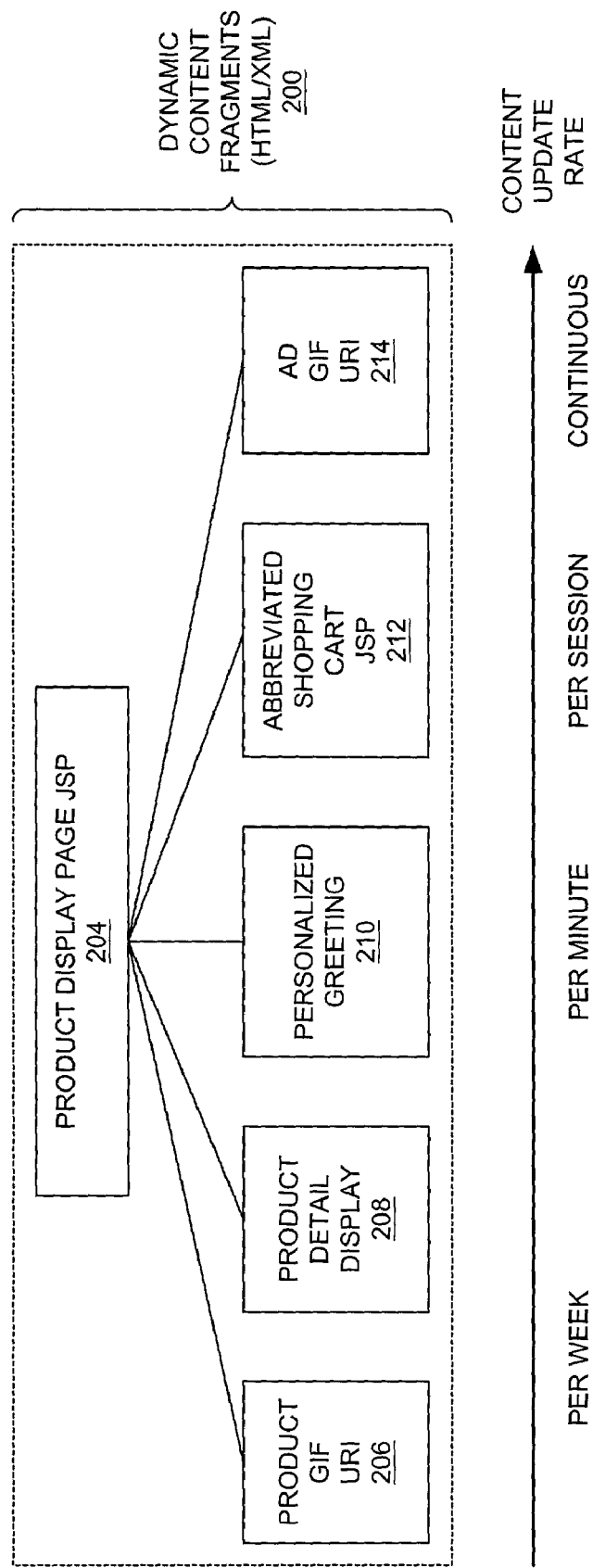
FIG. 2 illustrates a typical Web page composed of fragments.

With reference now to FIG. 2, a block diagram illustrates a Web page composed of fragments. This example illustrates that fragment granularity permits portions of a page to be cached even though some fragments are volatile and are known to be updated on some temporal basis. In other words, various types of Web content benefit to different degrees from caching.

A product display Web page comprises dynamic content fragments 200. The top-level fragment is a Java Server Page (JSP) 204, which contains five child fragments 206-214. Fragments 208 and 212 are cached. It should be noted that the child fragments are arranged from left to right in order of increasing rate of change in their underlying data, as indicated by the timeline in the figure.

Product URI 206 is a Uniform Resource Identifier (URI) link to a Graphics Interchange Format (GIF or .gif) image file of the product. A formatted table may hold detailed product description 208. A fragment which displays personalized greeting 210 may use a shopper name. This greeting changes often, e.g., for every user, but it may still be helpful to cache it since a given shopper name will be reused over the course of a session by the same user.

JSP 212 creates an abbreviated shopping cart. Shopping cart JSP 212 may create an HTML table to display the data. This content will change even more frequently than personalized greeting 210 since it should be updated every time the shopper adds something to his cart. Nevertheless, if the shopping cart appears on every page returned to the shopper, it is more efficient to cache JSP 212 than to retrieve the same data each time the cart is displayed. JSP 204 might also contain advertisement 214 appearing on the Web page which displays a stock watch list. Since the advertisement changes each time the page is requested, the update rate would be too high to benefit from caching.

FIGS. 1A-2 show various distributed data processing systems and an example of dynamic content as a background context for the discussion of the present invention. As mentioned above, it can be difficult to efficiently cache fragments. The present invention is directed to a technique that uses extensions to HTML and HTTP for efficiently caching fragments with particular attention to overcoming the difficulties associated with caching dynamic fragments and personalized fragments, i.e. dynamic content. A formalized introduction to the technique of the present invention is first presented, which is then followed by a description of some examples that use the technique of the present invention.

It should be noted that the examples provided below mention specific specifications of protocols, such as HTTP/1.1 and HTML 4.1. However, one of ordinary skill in the art would appreciate that the present invention may operate in conjunction with other protocols as long as a minimum set of equivalent features and functionality as required by the present invention were present in the other protocols.

Terminology

A "static fragment" is defined to be a fragment which can be obtained without the use of query parameters or cookies. A static fragment can be referenced, cached, and/or fetched entirely from its URI.

A "dynamic fragment" is a fragment which is generated as a result of calculation at the server based on the parameters or cookies supplied by the requester. An example of a dynamic fragment might the results of a sports event. A dynamic fragment is characterized as consisting of a user-requested subset of data which is specific to a site.

A "personalized fragment" is also generated as a result of calculation based on the requester's parameters or cookies. A personalized fragment is a special case of a dynamic fragment in that its content is dependent on the user. A personalized fragment may be non-volatile, e.g., an account number, or volatile, e.g., a shopping basket. For the purpose of defining and managing fragments, dynamic and personalized fragments present equivalent problems; hence, the terms "dynamic" and "personalized" will be used interchangeably.

A "top-level fragment" is a fragment which is not embedded in any other fragment but which may itself embed other fragments.

A "page assembler" is a program which composes a page from fragments. The process of collecting fragments and composing a page is called "page assembly". The process of examining a fragment to determine whether additional fragments should be fetched and assembled into the document is referred to hereinafter as "parsing" even if a literal parse is not performed. For example, a fragment may be accompanied by meta-information that names additional fragments that should be fetched for assembly and that specifies the precise locations where the additional fragments should be inserted; examining such a fragment for additional fragments is not necessarily a formal computer-science parse.

Definition of FRAGMENTLINK Tag

With reference now to FIG. 3, a formal Standard Generalized Markup Language (SGML) definition of the FRAGMENTLINK tag is provided in accordance with a preferred embodiment of the present invention. The FRAGMENTLINK tag is used to specify the location of a fragment which is to be inserted into the document during page assembly or page rendering. The new object is parsed as part of the parent document and may contain FRAGMENTLINK tags of its own. The definitions of the attributes of the FRAGMENTLINK tag are discussed below.

(It should be noted that markup languages typically use angled brackets ("<" and ">") as delimiters. In order to avoid potential formatting problems or electronic interpretation problems with markup language versions of this document, curly braces ("{" and "}") have been used throughout this document as replacement delimiters. As another formatting note, some examples of long text strings occupy more than one line of text in this document; one of ordinary skill in the art would be able to determine which text examples were intended to be shown as a single line of text even though they appear in the document to cross line boundaries.)

src=URI

The SRC attribute specifies the source location of the fragment to be inserted into the document; the SRC attribute acts as a source identifier for obtaining the fragment. If the URI is a relative URI, an absolute URI is from the parent's path and any relevant BASE tags. It should be noted that this can cause confusion if a single common fragment is contained within two different pages. It is recommended that authors code only absolute path names for the fragment URI. The protocol portion of the URI may specify "cookie", in which case the value of the inserted text is taken from the named cookie.

alt=string

The ALT attribute specifies alternate HTML text to be substituted in the event that the URI from the SRC attribute cannot be fetched. If no ALT attribute is specified and the SRC attribute's fragment cannot be fetched, no fragment is fetched.

parms=% parmlist

The PARMS attribute specifies a list of space delimited names. Each name corresponds to a query parameter that may exist in the URI of the parent fragment. When the PARMS attribute is specified, the URI specified in the SRC attribute is considered to be incomplete. In order to complete the SRC attribute, the values of each of the query parameters named in PARMS attribute should be fetched from the parent document and used to create a name-value pair. This name-value pair is to be appended to the SRC attribute's URI as a query parameter in order to complete it. If the named parameter does not exist in the parent URI, the parameter is not appended to the fragment's URI. Each parameter should be appended to the SRC attribute's URI in the same order in which it occurs within the PARMS attribute.

foreach=quoted-string

The FOREACH attribute specifies a quoted string. The value of the quoted string is preferably the name of a cookie whose value is a list of space-delimited name-value pairs with the name and value separated by an equal sign ("=") or some other type of equivalent delimiter. For each name-value pair in the cookie, a new FRAGMENTLINK tag is generated whose SRC attribute is the URI with the name-value pair added as a query parameter. This provides a shorthand for automatically generating multiple FRAGMENTLINK tags which differ only in the value of one query parameter, e.g., a user's stock watchlist.

In other words, the FOREACH attribute provides for the expansion of a single link to a fragment into a set of multiple links to multiple fragments. Each name-value pair becomes a pair of an expansion parameter name and an expansion parameter value.

showlink=(no|comment|CDATA)

The SHOWLINK attribute specifies the name of the tag that is used to wrap the included fragment data. If specified as "no", the data is included with no wrapping tag. If specified as "comment", the FRAGMENTLINK tag is rewritten as an HTML comment. If specified as any other value, the FRAGMENTLINK tag is rewritten as the specified tag. No checking is made to verify that the CDATA is a valid tag, thus leaving it to the page author to decide exactly how to denote the fragment. If the SHOWLINK attribute is omitted, no wrapping is done.

id=ID

If the ID attribute is specified, then its identifier value is assigned as a unique name to the fragment within the resultant DOM element representing this fragment in accordance with "HTML 4.01 Specification", W3C Recommendation, Dec. 24, 1999, herein incorporated by reference, available from the World Wide Web Consortium (W3C) at www.w3c.org.

class=CDATA

If the CLASS attribute is specified, then it assigns a class name or set of class names to the DOM element representing this fragment in accordance with the HTML specification.

When a page is assembled, the page assembler fetches the specified fragment and inserts it into the parent object. The SHOWLINK attribute can be used to allow the inserted data to be wrapped inside a tag or an HTML comment. Nested fragments are provided for, but no fragment may directly or indirectly include itself. The nesting structure of all the fragments within a fragment space should form a directed, acyclic graph (DAG). Any accompanying HTTP response headers are not considered part of the document and should be removed before insertion into the document. Caches should retain those headers as they do with any other document. An alternate fragment URI may be specified. The fragment that is specified by the ALT attribute is fetched and inserted if the SRC fragment cannot be fetched. If neither the SRC attribute's fragment nor the ALT attribute's fragment can be fetched, rendering may continue as if no FRAGMENTLINK tag had been included in the original document.

The difficulty with the use of dynamic or personalized fragments is that the URI used to fetch them should be calculated from the environment or context in which the parent page exists. In other words, the URI may need to be dynamically created from the query parameters that accompany the parent document; the PARMS attribute supports this feature. The PARMS attribute consists of a list of the names of the query parameters from the parent document to be used when fetching the fragment. Name-value pairs are formed for each parameter named on the PARMS attribute and are appended as (possibly additional) query parameters to the URI specified in the SRC attribute in the FRAGMENTLINK tag. These name-value pairs should be appended in the same order as they appear on the PARMS attribute. Additionally, the cookies associated with the parent may be needed to correctly fetch or compute the fragment. All cookies which accompany the parent document should be supplied with the request for the fragment.

Often, for example, in the use of a stock watchlist, many FRAGMENTLINK tags are required which differ only in the value of a query parameter. The FOREACH attribute can be used as a shorthand to simplify coding of the page, to reduce bandwidth requirements when transmitting the fragment, and to reduce the size of the fragment in a cache. For example, suppose a FRAGMENTLINK tag is generated thus:

```
{fragmentlink
    src="http://www.acmeInvest.com/stockQuote.jsp"
    alt="Error occurred trying to find stockQuote.jsp"
    foreach="issues"/}
``` and suppose there is a cookie:

Cookie: issues="stock=IBM stock=CSCO stock=DELL"

This would cause the FRAGMENTLINK tag to be expanded into a series of FRAGMENTLINK tags, which in turn causes each newly generated FRAGMENTLINK tag to be evaluated:

```
{fragmentlink
    src="http://www.acmeInvest.com/stockQuote.jsp?stock=IBM"
    alt="An error occurred trying to find stockQuote.jsp"/}
{fragmentlink
    src="http://www.acmeInvest.com/stockQuote.jsp?stock=CSCO"
    alt="An error occurred trying to find stockQuote.jsp"/}
{fragmentlink
    src="http://www.acmeInvest.com/stockQuote.jsp?stock=DELL"
    alt="An error occurred trying to find stockQuote.jsp"/}
    Often the text of a fragment is small and can be
    included as the value of a cookie, resulting in
    considerable performance gains during page assembly. To
    specify this, the keyword COOKIE is placed in the
    protocol of the URI, for example:
        {fragmentlink src="cookie://cookiename"/}
```

Definition of FRAGMENT Header

With reference now to FIG. 4, a formal definition of the FRAGMENT header is provided in accordance with a preferred embodiment of the present invention. The present invention can use a novel HTTP header and an extension to the existing "Cache-Control" header. The FRAGMENT header is compatible with the HTTP specification, "Hypertext Transport Protocol—HTTP/1.1", Request for Comments 2616 (RFC 2616), Internet Engineering Task Force, June 1999, herein incorporated by reference, available from the Internet Engineering Task Force at www.ietf.org.

All information relating to the object as a fragment is encapsulated in a header called FRAGMENT. This header is used to identify whether either the client, server, or some intermediate cache has page assembly abilities. The header also specifies rules for forming a cache identifier for fragments (based on the query parameters of the URI and cookies accompanying the object). In addition, the header specifies the dependency relationships of objects to their underlying data in support of host-initiated invalidations. The FRAGMENT header is to be used only if the "Cache-Control: fragmentrules" directive is in effect. The complete syntax of the FRAGMENT header is shown in FIG. 4. The definitions of the attributes of the FRAGMENT header are discussed below.

contains-fragments: This attribute specifies that the body of the response contains fragment directives which can be used by a page assembler.

supports-fragments: This attribute specifies that either the original requester or a cache within the data stream support page assembly. This directive may be inserted by any cache or client which fully supports page assembly.

dependencies: This attribute specifies a list of dependency names upon which the body of the response is dependent.

cacheid: This attribute specifies the list of rules to be used to form the cache ID for the object. If a rule is specified as "URI", the full URI of the response is to be used as the cache ID. If the cache ID is specified as a rule, the rules are to be applied to the request URI to form a cache ID as described in more detail further below.

In the present invention, caching rules for fragments are different than for other types of objects if the cache supports page assembly. Therefore, the "Cache-Control" header is extended to indicate that fragment caching rules apply. This is to be done with an extension to override the no-cache directive. A new cache-request-directive called "fragmentrules" is implemented as an extension to the "Cache-Control" general-header field as specified in section 14.9.6 of the HTTP/1.1 specification. The intent of this extension is to modify the behavior of the no-cache directive in caches which support fragment assembly. Caches which do not support fragment assembly are to ignore the "fragmentrules" directive, which is basic default behavior for HTTP/1.0 and HTTP/1.1. Caches which do support fragment assembly are to ignore the "no-cache" directive (and any "Pragma: no-cache" header if present) when accompanied by a "fragmentrules" directive and apply caching rules according to any other headers which accompany the response. An example of a "Cache-Control" header would be:

Cache-Control: no-cache, fragmentrules

Identifying Page Assembly Capabilities and Responsibilities

The present invention provides the advantage of being able to define fragment inclusion so that it is possible to implement page assembly at any point in the chain of events from page-authoring to browser rendering, including all caches in which a fragment may exist, including the browser cache. A software entity that can do page assembly is defined as an assembly point.

The feature presents the following possible scenarios:

1. There is no assembly point closer to the browser than the HTTP server serving the page. In this case, the server should do the assembly itself and serve a fully-assembled page.

2. There is a proxy of some sort which can perform page assembly for the origin server. This proxy can become an assembly point for the site. The origin server may serve fragments to this proxy and not need to do any page assembly.

3. The user's browser can perform page assembly. In this case, no network cache or server need perform page assembly.

In order to determine how to serve a fragment, i.e. fully assembled or unassembled, servers and caches should be able to determine if at least one of the upstream agents is serving as an assembly point. The present invention uses an HTTP request header such that any agent that has the ability to serve as an assembly point for the server may use the header to indicate that it can accept fragments and need not receive a full page. The "supports-fragments" directive of the FRAGMENT header may be inserted by any client or cache to indicate to downstream caches that it is an assembly point. An example of the "supports-fragments" directive would be:

fragment: supports-fragments

Simply because a processor supports page assembly does not imply that it should do page assembly on all objects received from the server. It is both a waste of resources and a potential source of problems to parse every document received from a server and attempt to assemble it. Therefore, a server should indicate that an object needs to be assembled before it is served. The "contains-fragments" directive of the FRAGMENTS header should be inserted by any server for which page assembly in caches or browsers is required. An example of the "contains-fragments" directive would be:

fragment: Contains-Fragments

Most current HTTP caches, including browser caches, assume that all objects that have query parameters are not cacheable. HTTP/1.1 extends and generalizes caching capabilities to permit caches to cache any object it successfully fetched. However, even HTTP 1.1 caches are often configured to not cache objects that they think are dynamic on the assumption that it is a poor use of resources to cache dynamic objects. An example of a situation where this assumption is invalid is in the case of personalized data. Personalized pages are created by associating query parameters or cookies with a page, thereby identifying the page as a specific, personalized instance of a more general page. The fact that the page is personalized does not make the page inherently uncacheable. The page is uncacheable only if the data from which the page is based is highly volatile. This is especially true in enterprise servers which cache only the Web content of a specific enterprise.

The argument usually given against caching such a page is that the incidence of reuse of such pages is too low to justify space in a cache. This argument is insufficient for several reasons.

1. The cost of a document, from first creation to final rendering in a browser, is only nominally a function of the document's size. If the document is "dynamic" in some way, then most of the cost is in creating the document in the first place. Therefore, even very low reuse can result in significant cost savings at the server.

2. Capacity in caches has grown significantly and continues to grow at a very high rate.

3. The adoption of fragment technology may actually reduce the amount of data cached by eliminating redundant instances of the same HTML content.

The introduction of fragments has the potential to greatly complicate the specification of cache policies, especially if page assemblers are to be constructed inside of caches. Each fragment of a page can require a different cache policy. The present invention uses HTTP response headers to increase the granularity of caching policies over what is available in the prior art.

There are two factors affecting caching which must be communicated to implemented page assemblers: (1) fragment lifetime; and (2) explicit server-initiated invalidation of objects. In the absence of server-initiated invalidation, the same mechanisms for specifying object lifetime in caches for other objects can be applied to fragments. If it is important to prevent a fragment from being cached in a cache that does not explicitly support fragments, the "Cache-Control" header with directives "no-cache" and "fragmentrules" should be included in the response. The "no-cache" directive prevents caching of the fragment by non-implementing caches, and the "fragmentrules" directive permits the implementing caches to override the "no-cache" directive.

Server-Initiated Invalidation

Caches which support server-initiated invalidation can be informed which fragments are to be invalidated via explicit control from the server. In order to maintain compatibility with existing and older caches that do not recognize or support server-initiated invalidation, such server-invalidated fragments should be served the HTTP/1.1 "Cache-Control" header and directive "no-cache".

These fragments should be served with the extended directive "fragmentrules" if it is desired that a cache override the "no-cache" directive and apply fragment-specific rules. Any cache that implements the fragment caching technique of the present invention should also implement functionality in accordance with the HTTP/1.1 cachability rules as described in the HTTP/1.1 specification.

A fragment which is invalidated by a server may depend on multiple sources of data, and multiple fragments may depend on the same data. It is highly desirable to be able to invalidate multiple fragments by locating all fragments based on common data by sending a single invalidation order to the cache. To do this efficiently, the server will assign one or more invalidation IDs to a fragment. Implementing caches use the invalidation IDs to provide secondary indexing to cached items. When a server-initiated invalidation order arrives, all cached items that are indexed under the invalidation IDs are invalidated. Invalidation IDs are specified via the "dependencies" directive of the FRAGMENT header. An example of the use of the "dependencies" directive would be:

fragment: dependencies="dep1 dep2"

Implementing servers use the "dependencies" directive to indicate that the serving host will explicitly invalidate the object. Normal aging and cachability as defined in the HTTP/1.1 specification are not affected by this directive, so objects which are infrequently invalidated may be removed from cache in the absence of a server-initiated invalidation. If the "dependencies" header is specified, caches may ignore any "cache-control: no-cache" headers.

The invalidation ID, URI, and cache ID have separate roles. Providing separate mechanisms for specifying each of these prevents unnecessary application design conflicts that may be difficult to resolve.

Dynamic Fragment Cache Identifiers

It is possible that an object should be cached under an identifier which is different from its URI. It is also possible that constraints should be placed upon the exact way the cache ID is formed, based on the content of the URI itself. This is because often a URI is formed for a dynamic object with query parameters which should not be used as part of the unique cache ID. If those parameters are not removed from the URI before caching, false cache misses can occur, resulting in multiple copies of the same object being stored under multiple IDs.

To avoid this problem, a set of rules for forming cache IDs should be shipped in the response header of dynamic objects whose URI cannot be directly used as a cache ID. Each rule comprises a list of query parameter names and cookie names. In the prior art, cookies are not used as part of a cache ID, but in many applications the information that makes a request unique from other requests is the data inside of the cookies. Therefore, the value of a cookie can be specified as part of a cache ID. Any cookie which is to be used as part of a cache ID should be in the form of a name-value pair.

In other words, a CACHEID directive consists of one or more rulesets. A ruleset consists of one or more rules. A rule consists of a list of strings, where each string is the name of a query parameter from the request URI or an accompanying cookie. An example of a CACHEID directive would be:

fragment: cacheid="(p1 [p2],c4) (p3, c4 [c5]) URI"

This directive consists of three rules: (p1 [p2],c4); (p3, c4 [c5]); and URI. The "p_" terms in the rules are parmnames for query parameters, and the "c_" terms are cookienames for cookies.

To create a cache ID, the cache starts with the pathname portion of the fragment's URI. It then attempts to apply each rule within a ruleset. If every rule within a ruleset can be applied, the string from this action is used as the cache ID. If some rule of a ruleset cannot be applied, then the ruleset is skipped, the next ruleset is applied, and so on. If no ruleset exists for which every non-optional rule can be applied, then the object is not cacheable; otherwise, the first ruleset that was successfully applied is used to form the cache ID.

A rule enclosed in square brackets ("[" and "]") is an optional rule which should be applied if possible, but the failure of an optional rule does not contribute to the failure of the rulelist. If no CACHEID directive accompanies an object, then the object is cached under its full URI, including its query parameters.

To apply the rules, the cache should first form a base cache ID by removing all query parameters from the original URI. To apply a parmrule, the cache looks for a query parameter with the name specified in the parmname. If the name exists, the corresponding name-value pair from the original URI is appended to the base cache ID to form a new base cache ID. This process continues until all rules have been successfully applied. If a non-optional rule cannot be applied, then the base cache ID is restored to its original state and the next rulelist is applied. To apply a cookierule, the cache looks for a cookie in the form of a name-value pair with the name specified in the cookiename parameter. If it exists, then the name-value pair is appended to the base cache ID to form a new base cache ID. This process continues until all rules have been successfully applied. If a non-optional rule cannot be applied, then the base cache ID is restored to its original state and the next rulelist is applied. If a rulelist consists of the string "URI", then the entire URI of the response is used as the cache ID. In the example mentioned above, the full URI of the request is used if neither of the other two rulelists can be successfully applied.

When a request for an object arrives at a cache, the cache, i.e. the cache management unit or the maintainer of the cache, first checks to see if the object is cached under its full URI. If so, then the object is returned; if not, then a base cache ID is formed from the path portion of the fragment's URI, and a lookup is again performed. If the object is not found, a rules table associated with the cache is searched for the base cache ID. If the base cache ID is registered in the cache's rules table, then the rules for that URI are applied as described above. If a rulelist is successfully applied, then the object is again looked for under the new cache ID. If it is not found, then the cache considers this to be a miss, and the request is forwarded toward the server; otherwise, if the object is found, then the object is returned to the requester.

Continuing with the example provided above, suppose the full URI of an object is:

http://foo.bar.com/buyme?p1=parm1&p3=parm3 and the response has an accompanying cookie named "c4" with the value "cookie4". In this case, the cache ID could be formed as:

http://foo.bar.com/buyme/p1=parm1/c4=cookie4 because the first rule applies, i.e., "(p1 [p2],c4)".

Page Assembly through Multiple Caches

With reference now to FIGS. 5A-5G, a set of fragment-supporting and non-fragment-supporting agents along object retrieval paths are shown as the basis for a discussion on the manner in which the fragment caching technique of the present invention may be successfully implemented in a variety of processing environments.

Some complications can arise when there are multiple caches along the path between a client browser and a server in which some of the caches claim support for page assembly and some of the caches do not claim support for page assembly. These problems do not arise for other types of embedded objects, such as images or multimedia, because caches and browsers always treat these objects as independent, unrelated objects. Even after rendering in a browser, the original objects are still discrete in the browser's cache. However, if a page comprises a top-level fragment "p" and a child fragment "c", a request for an object using the URI for "p" may return either the fragment "p" or the fully composed page "P", depending upon the level of support for page assembly in the chain of agents starting with the browser and terminating at the destination server.

FIGS. 5A-5G illustrate various configurations of agents with different capabilities and the manner in which the present invention can handle them. In each figure, a first cache, Cache1, and a second cache, Cache2, are situated between a client browser and a server. In these examples, "f" designates an agent that supports fragments; "nf" designates an agent that does not support fragments; "p" designates a parent fragment; "c" designates a child fragment; and "P(p, c)" designates the page composed by embedding child fragment "c" into parent fragment "p".

Figure 5A:
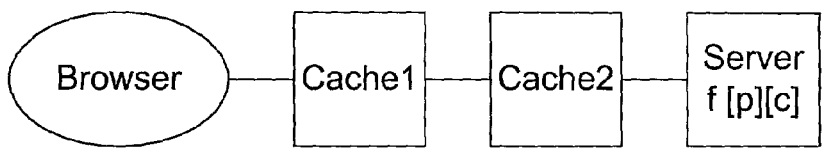
FIGS. 5A-5G depict a set of fragment-supporting and non-fragment-supporting agents along object retrieval paths.

FIG. 5A represents the simplest case. In this example, the server supports fragments and the two caches and browser may or may not support fragments. There is a top-level fragment "p" containing a child fragment "c". The server stores "p" and "c" separately but knows they are related. For a particular request for "p", if any agent between the browser and the server (at any number of levels) supports fragments, then separate fragments are returned; otherwise, the server assembles the fragments and returns a fully assembled page.

Figure 5B:
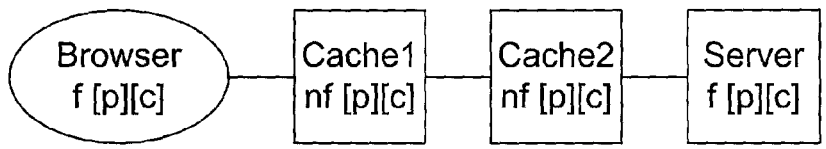

Referring to FIG. 5B, the browser supports fragments but Cache1 and Cache2 do not. After the browser has requested p (and subsequently c, after trying to assemble p), then each agent has cached a copy of "p" and "c". The server has returned separate fragments because the browser would have indicated that it supports fragments. However, Cache1 and Cache2 act as if they are caching two independent HTTP objects, particularly because they were requested separately by the browser, yet the browser and server know that the copies of "p" and "c" are related. The browser caches them separately but composes them when needed.

Figure 5C:
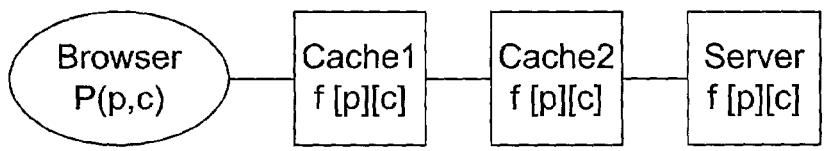

Referring to FIG. 5C, the browser does not support fragments but Cache1 and Cache2 do support fragments. In this case, the server has returned separate fragments because Cache2 would have indicated fragment support. Cache2 returned separate fragments because Cache1 would have indicated fragment support. Cache1 composed the final page "P(p,c)" from the "p" and "c" fragments before returning it to the browser because the browser did not indicate fragment support.

Figure 5D:
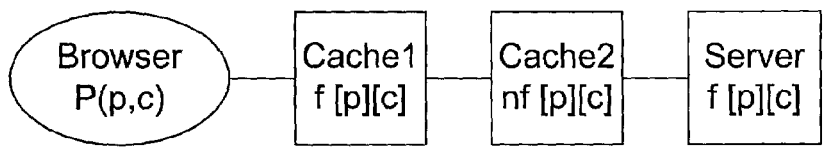

Referring to FIG. 5D, the browser and Cache2 do not support fragments but Cache1 does support fragments. The server has returned separate fragments because Cache1 would have indicated fragment support, and that indication would have been carried in the HTTP header through Cache2. Cache2 acts as if it is caching two independent HTTP objects, but the browser, Cache1 and server know the separate fragments are related. Cache2 passed separate fragments because they are stored separately and it does not know they are related. Cache1 composed the final page "P(p,c)" from the "p" and "c" fragments before returning it to the browser because the browser did not indicate fragment support.

Figure 5E:
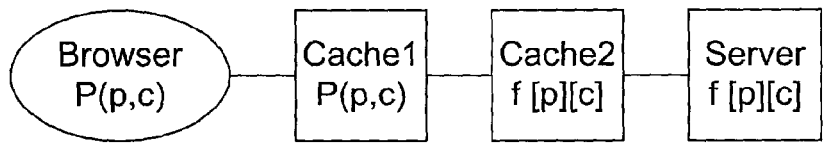

Referring to FIG. 5E, the browser and Cache1 do not support fragments but Cache2 does support fragments. The server has returned separate fragments because Cache2 indicated fragment support. Cache2 composed the final page "P(p,c)" from the "p" and "c" fragments before passing it to Cache1 because neither the browser nor Cache1 indicated fragment support. Cache1 and the browser store the composed fragments as a single HTTP object, i.e., the final page "P(p,c)".

Figure 5F:
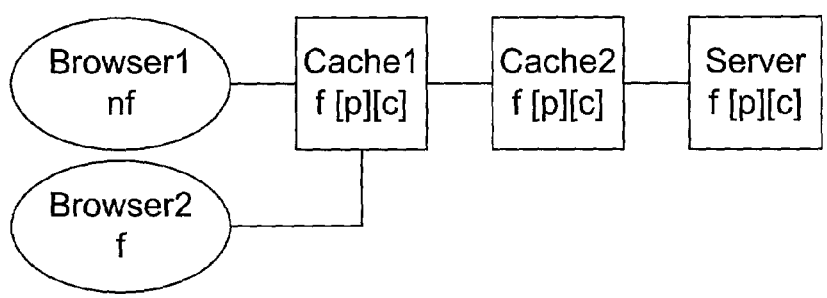

Referring to FIG. 5F, the single browser is replaced with two browsers, Browser1 and Browser2. Browser2 issues a request for a page that will map to the parent fragment "p". Cache1 forwards a request to Cache2 that will carry the "supports-fragments" header issued by Browser2. Cache2 returns to Cache1 fragment "p" with a fragment link for fragment "c"; Cache1 returns it to Browser2. Browser2 parses fragment "p" and then issues a request for child fragment "c".

A potential problem arises if Browser1, which is not set up for fragment handling, now issues a request for the page. Browser1 issues a request containing a URI that is the same as that issued by Browser 2, and this URI will match the cache ID for fragment "p". If Cache1 has the p fragment cached, Cache1 will send the cached fragment containing the FRAGMENTLINK tag for fragment "c" to Browser1. Since Browser1 does not understand the FRAGMENTLINK tag, Browser1 will ignore it, thereby causing an incomplete page to be rendered.

Figure 5G:
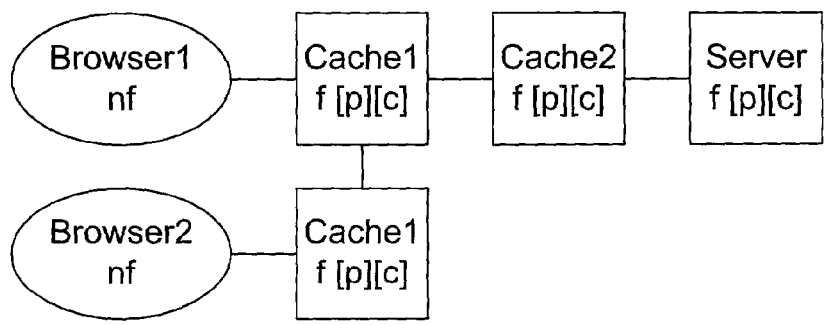

This situation generalizes to any configuration within the network in which both an agent that supports fragments and another agent that does not support fragments connect to a cache that does not support fragments, as shown more generally in FIG. 5G. If Browser2 requests fragment "p", Cache1 which supports fragments will receive fragments "p" and "c" and assemble them, after which Cache1 delivers page "P(p, c)" to Browser2. A subsequent request for fragment "p" from Browser1 through Cache1 could result in delivery of an unassembled page.

To manage this potential problem, any top-level fragment from a server which supports page assembly should mark the top-level fragments as uncacheable, e.g., using "Cache-Control: no-cache fragmentrules". Caches which do support page assembly will recognize the "fragmentrules" in the directive, thereby overriding the "no-cache" directive and applying the correct behavior to the object. It should be noted that only top-level fragments should be marked uncacheable to manage this situation. This is because of the ambiguity that can arise because the URI for the full page is the same as the URI for the top-level fragment; that is, the URI can refer to two different objects. Embedded fragments never exist in more than one form, so this ambiguity does not occur for embedded fragments.

Considerations for Preventing Inappropriate Caching

As noted immediately above, any top-level fragment from a server which supports page assembly should mark the top-level fragments as uncacheable. This prevents a potential problem in which a cache that does not support fragments attempts to cache a top-level fragment that contains other fragments; if it did so, as shown in FIG. 5G, the top-level fragment might be accessed along a path from some browser that did not include a fragment-supporting cache, thereby improperly rendering the page with FRAGMENTLINK tags rather than the content that would be specified by the FRAGMENTLINK tags.

In addition, a cache that does not support fragments would typically use the URI or URI path that is associated with an object as a cache index/key; unbeknownst to the cache, the object could be a fragment. Since the object is a fragment, it is possible that it is inappropriate to use only the URI or URI path as a cache ID in the cache that does not support fragments; in a fragment-supporting cache, a cache ID would be formed in accordance with the fragment caching rules associated with the object, i.e. fragment. In other words, the cache that does not support fragments continues to formulate its cache indices according to its cache ID algorithm for all cached objects, yet the technique of the present invention intends for fragment caching rules to be used to form cache IDs for cacheable fragments prior to generating a cache index for placement of the fragment within the cache. Hence, the cache that does not support fragments could possibly return its object, which is actually a fragment, in a response as a result of a cache hit. Various types of inaccuracies or rendering errors could then occur downstream. In order to prevent such errors, then caching should be prevented when it is inappropriate.

In general, caching in non-fragment-supporting caches can be prevented by including the "Cache-Control: no-cache fragmentrules" header and by including the "Pragma: no-cache" header. The second header tells caches that do not support HTTP/1.1 to not cache the fragment; a cache that supports fragments should also support HTTP/1.1. As briefly noted above, with respect to FIG. 5G, the "no-cache" directive in the first header tells caches that support HTTP/1.1 but do not support fragments to not cache the fragment, and the "fragmentrules" directive tells caches that support fragments that the fragment should be cached under fragment caching rules.

Considerations for Efficient Caching

For fragments that are shared across multiple users, e.g., a product description or a stock quote, it is most efficient to allow caching in most or all caches between the browser and Web application server. Fragments can be viewed as being distributed along a tree structure where each cache fans out to other caches. The first request for a specific fragment will populate caches along the path between the user and the Web application server. Subsequent requests for the same fragment by other users may find the fragment in these caches and not have to go all the way to the Web application server.

For fragments that are user-specific, e.g., personalized fragments, such as a stock watchlist, it is most efficient to allow caching only in the closest fragment-supporting cache to the end-user because the only subsequent requests for the same fragment will be along the same path. Otherwise, the intermediate caches will fill with these user-specific fragments, even though these intermediate caches never see a subsequent request for these user-specific fragments because they are satisfied by caches much closer to the user, thereby crowding out shared fragments from the intermediate caches.

The HTTP "Cache-Control" header with the "private" directive has previously been used to specify this same user-specific characteristic for pages so that only browser caches will cache them. This same header is used by the present invention to instruct fragment-supporting caches to cache content in the fragment-supporting cache closest to the user. It should be noted that including "Cache-Control: private" in a user-specific fragment is an optional performance optimization.

Considerations for Compound Documents

When fetching fragments for fragment assembly, an HTTP request should be formed. Most of the headers for this response can be inherited from the response headers in the top-level fragment. However, some response headers refer to the specific object being fetched, and care should be taken when inheriting them from a parent fragment. Similarly, most response headers can be discarded, and the response headers that accompany the top-level fragment can be used when returning the response to the client. Again, some response headers are specific to the individual object, and may affect the state of the overall document.

This section discusses the issues regarding the handling of HTTP request/response headers in fragment assembly. The term "downward propagation" is used to refer to the inheritance of request headers by a request for an embedded object from the parent or top-level fragment. The term "upward propagation" is used to refer to the resolution of response headers from an embedded object into the parent or top-level fragment.

One special issue concerning compound documents with respect to cookies is that, during page assembly, the original "set-cookie" response header is not available. Only the resultant cookie request header is available from the client. In particular, none of the actual "path", "domain", or "expires" values are available. If a less-deeply nested fragment embeds another fragment that does not meet the restrictions placed on the cookie that came with the request, it is not proper to pass that cookie to the child fragment. Because not all the original information is present, it is not possible, in general, to determine whether passing the cookie is proper. Similarly, a nested fragment may have an accompanying "set-cookie" header. The actual value of that cookie may be needed to compute the cache ID of that fragment. In addition, the value of the cookie may be needed to fetch more deeply nested fragments. Some information can be inferred, however. One can assume that the "expires" portion of the cookie had not yet taken effect; if it had, the cookie would not exist in the request. One can assume that the domain is some portion of the domain in the request, and one can also assume that the path is some portion of the path in the request.

Normally, a browser checks the constraints on a cookie, and if a request does not meet the constraints, the cookie is not included in the request headers. However, in a page assembling cache, it is possible that a FRAGMENTLINK tag enclosed in a document with an accompanying cookie references a URI which does not meet the constraints of the original cookie. Because the object referenced in the FRAGMENTLINK tag may require the parent's cookie to be properly evaluated, one should propagate cookies from less-deeply nested fragments to more-deeply nested fragments. To ensure that the page assembler does not pass a cookie in an improper way that violates the constraints upon that cookie, the guideline is that the path and domain for the nested fragment's URI should meet the most conservative portion of the path and domain of the top-level fragment. In other words, the domain in the URI of the nested fragment should match, or be a superset of, the domain of its parent, and the path portion of the URI should match, or be a superset of, its parent's path. This can be referred to as "downward propagation of cookies".

In contrast, the following describes "upward propagation of cookies". When a fragment is fetched from a host, it is possible that the response includes a "set-cookie" header. This cookie may itself be required for correct evaluation of more deeply nested fragments within the newly returned fragment. Therefore, the page assembler should convert the "set-cookie" header into a "cookie" header for the purposes of fetching more deeply nested fragments. This new cookie may be required for at least two purposes: (1) evaluation of more deeply nested fragments at the server; and (2) generation of the cache ID for the recently fetched fragment or for the more deeply nested fragments. In the case that the cookie is required for cache ID generation, it is necessary that the new cookie be transmitted back to the requester with the assembled page. This is because the cookie should accompany the next request for that page, or for any page referencing the cached fragment, in order to calculate the cache ID from the request before attempting to fetch it from the server.

Converting the cookie in the "set-cookie" header into a "cookie" header in the request for nested fragments constitutes the act of implicitly accepting the cookie on the user's behalf. The guideline for handling this situation includes: (1) the top-level fragment should already have a cookie of that name; and (2) the path and domain of the fragment should conform to the most conservative portion of the path and domain of the top-level fragment.

If these constraints are met, the effect of the new "set-cookie" header will be simply to change the value of an existing cookie. From an application point of view, this simply means that "dummy" cookies may need to accompany the top-level fragment. These "dummy" cookies will have their values updated during the process of fetching the nested fragments and when the fragment's "set-cookie" headers are propagated back to the user.

Another special consideration for compound documents, other than cookies, involves "if-modified-since" headers. The "if-modified-since" header is used by requesters to indicate that an object should be returned only if it has been modified since a specific date and time. If the object has not been modified since that time, it is considered "fresh", and an HTTP 304 "Not Modified" response is normally returned from the server, thereby saving the bandwidth that would be required to ship the larger response body.

In a compound document, some components may be "fresh" while others are "stale", and the status of other components may be indeterminate. If any component cannot be determined to be "fresh", then the entire document should be returned as a complete response (HTTP 200). If all components have been determined to be "fresh", an HTTP 304 response may be returned. However, to determine if a fragment is fresh, it may be necessary to perform page assembly, taking note of the HTTP response codes of the components. If one component is "fresh", its contents are still required if the component is not a leaf node in order to find and fetch components which are nested.

Therefore, requests to the cache which would return an HTTP 304 response should also return the text of the fragment so that page assembly can continue. Requests to the server, e.g., as a result of a cache miss, should be issued without the "if-modified-since" header since otherwise the server might return an HTTP 304 response when the text of the fragment was required to continue page assembly. In other words, "if-modified-since" headers cannot be propagated downward for compound documents because an HTTP 304 response could result in an invalid response to the client.

Another special consideration for compound documents is similar to the issue with "if-modified-since" headers but instead involves "last-modified" headers. The page assembler should also understand which fragments return "last-modified" headers and merge the results into one combined "last-modified" header with the latest date for the composed page. If any of the fragments do not return a "last-modified" header, then the overall assembled page needs to not return a "last-modified" header. This is important because the browser will ignore the content if it notices the "last-modified" header is the same as the file in its local cache.

For example, consider a page that includes one piece of dynamic content (with no "last-modified" header) and one piece of static content (from HTML) with a "last-modified" header. If one were to return the page with the "last-modified" header of the static page, then subsequent requests to the same page would be ignored by the browser, and the old page from the browser cache would be displayed. In other words, if all fragments contain a "last-modified" header, it should be propagated upward and adjusted to reflect the most recent modification time of any constituent fragment. If any fragment lacks a "last-modified" header, then no "last-modified" header may be returned.

Considerations for Programming Models

The present invention describes a technique for distributed fragment caching. However, it is intended to be as neutral as possible so that any Web application server programming model can use it to delegate caching functionality, e.g., to intermediate servers and browsers. The present invention uses extensions to HTML, i.e., the FRAGMENTLINK tag, and HTTP, i.e., new fragment caching headers, which are also programming model neutral.

When programming fragments, a Web application developer should specify the following two types of information:

1. An include mechanism. This specifies which fragment to include and where to include it within another fragment. Because its location on the page is important, this has to be embedded within code, e.g., JSP templates or servlet classes.

2. Caching control metadata. This specifies conditions for a fragment, e.g., time limits. This information can either be embedded in code or specified separately by associating it with the template name, e.g., a JSP file name or servlet class.

If the J2EE programming model is used to implement the present invention, then these two features can be supported by the following mechanisms:

1. For the include mechanism, the J2EE programming model already has an include construct, e.g., "jsp:include" tag or "RequestDispatcher.include" method, within the Web application server to specify included fragments. The J2EE runtime can be modified to rewrite the J2EE include construct into a FRAGMENTLINK tag when appropriate.

2. The caching control information can be specified from a systems management console and associated with each fragment template/class instead of embedded in code. The Web application server can insert this information in the appropriate headers. This approach has the following advantages over putting this information into code:

A. It allows changes to be dynamically made via an administrative console, instead of having to get programmers involved because it is burned into code.

B. It avoids adding new mechanisms to the J2EE programming model.

Rewriting a J2EE include construct into a FRAGMENTLINK tag requires the following considerations. J2EE semantics for query parameters say that all query parameters are passed from a parent fragment to a child fragment, recursively. When a J2EE Web application server generates a FRAGMENTLINK tag, the SRC attribute should be the J2EE include's URI with the parent's query parameters appended. A non-J2EE Web application server would generate the SRC attribute consistent with its programming model. In this manner, the same semantics will occur regardless of whether or not a surrogate is present because the request seen by the application code will be identical in either case. The FRAGMENTLINK tag has several attributes, e.g., ALT, FOREACH, SHOWLINK, ID, and CLASS, that do not have a corresponding "jsp:include" attribute. To be used in a J2EE environment, these features would need extensions to the "jsp:include".

Different web application servers may support other programming models (e.g., ASP) that have similar but different mechanisms for including a nested fragment. For each of these programming models, the web application server should generate FRAGMENTLINK tags that are consistent with the rules of that programming model.

Considerations for Invalidation

To keep caches up-to-date, entries need to be invalidated or overwritten when their contents are no longer valid. Invalidation can either be time-based or triggered by an external event. Time can either be a maximum lifetime in the cache, e.g., no longer than 10 minutes old, or an absolute time, e.g., no later than noon Feb. 5, 2001. Maximum lifetime is specified using the standard HTTP "Cache-Control" header with the standard HTTP "max-age" directive. Absolute time is specified using the standard HTTP "Expires" header.

As an example, it might be acceptable for a product description to be up to 10 minutes out of date. This would be specified as "Cache-Control: max-age=600", which means that this fragment will stay cached no longer than 600 seconds. As another example, a sale might last until Monday, Dec. 24, 2001 at 11:00 pm EST. This would be specified as "Expires=Mon, Dec. 24, 2001 23:00:00 EST". In either case, the fragment may be removed from the cache by the cache's replacement algorithm in order to make room for new fragments.

For event-triggered invalidations, the application server initiates an invalidation. The application server can use database triggers, an application programming interface (API) called by an updating HTTP request, or any other mechanism to determine that content has become outdated.

The technique of the present invention is open to a variety of invalidation mechanisms. Similarly, the protocol used by an application server to send invalidation messages to fragment-supporting caches is not mandated by the technique of the present invention. The only conformity that is required is the inclusion of information in the FRAGMENT header that lists the dependencies that the fragment has on its underlying data.

A fragment's dependency is an identifier for some underlying data that was used to create the fragment. As an example of a dependency, several pages might use the same underlying user profile but use different fragments because different subsets of the user profile are used or because they are formatted differently. The application could determine the mapping between the user profile and all of the fragments that use it, and then build the cache ID for these whenever the user profile changes. However, it is better software engineering to have this mapping located in each of the fragments, which is the source of each dependency. This allows the application to simply invalidate using the user ID that is associated with the user profile and have the cache invalidate all fragments that are dependent on the user ID. When a new fragment is added that uses the user profile or one is removed, the dependency is local to that fragment, and the application's invalidation mechanism is unchanged. For example, this dependency could be declared for a particular user profile in the following manner:
Fragment:
dependencies="http://www.acmeStore.com_userID=@ ($*!%"

Multiple dependencies are specified as a space-separated list. Dependencies are case sensitive. A fragment-supporting cache will allow invalidations to take place based on these dependencies.

To use an overwriting approach to invalidating cache entries, no new header information is needed. The fragment-supporting cache needs a protocol that allows new cache entries to be added. Like the invalidation protocol mentioned above, this overwrite protocol is not mandated by the technique of the present invention.

Considerations for Security Issues

Potential security requirements should be respected by caches that support fragments. When a user operates a browser-like application and clicks on a URI, the user trusts the application designer to treat any information provided in the URI or the user's cookies to be used according to the application's security policy. With a FRAGMENTLINK tag, the application designer delegates some responsibility for the proper use of this information to caches; a cache implemented in accordance with the present invention should enforce the rule that a FRAGMENTLINK tag cannot link to a domain other than that of its parent.

A page that contains other fragments is eventually assembled into a fully-expanded page, and this can happen anywhere along the path between the browser and the application server. To ensure security, the application developer should adhere to the following rule: a fragment requires HTTPS if it contains another fragment that requires HTTPS. This rule should be applied recursively so that it propagates all the way up to the top-level fragment. This rule prevents a protected fragment from being viewed inside an unprotected fragment.

For an HTTPS request, the FRAGMENT header with a "supports-fragments" directive should only be included if the cache can terminate the HTTPS session. Otherwise, it cannot see FRAGMENTLINKs to process them. A cache that does not terminate HTTPS can still support fragments for HTTP requests.

Description of a Cache Management Unit for a Fragment-Supporting Cache

Figure 6A:
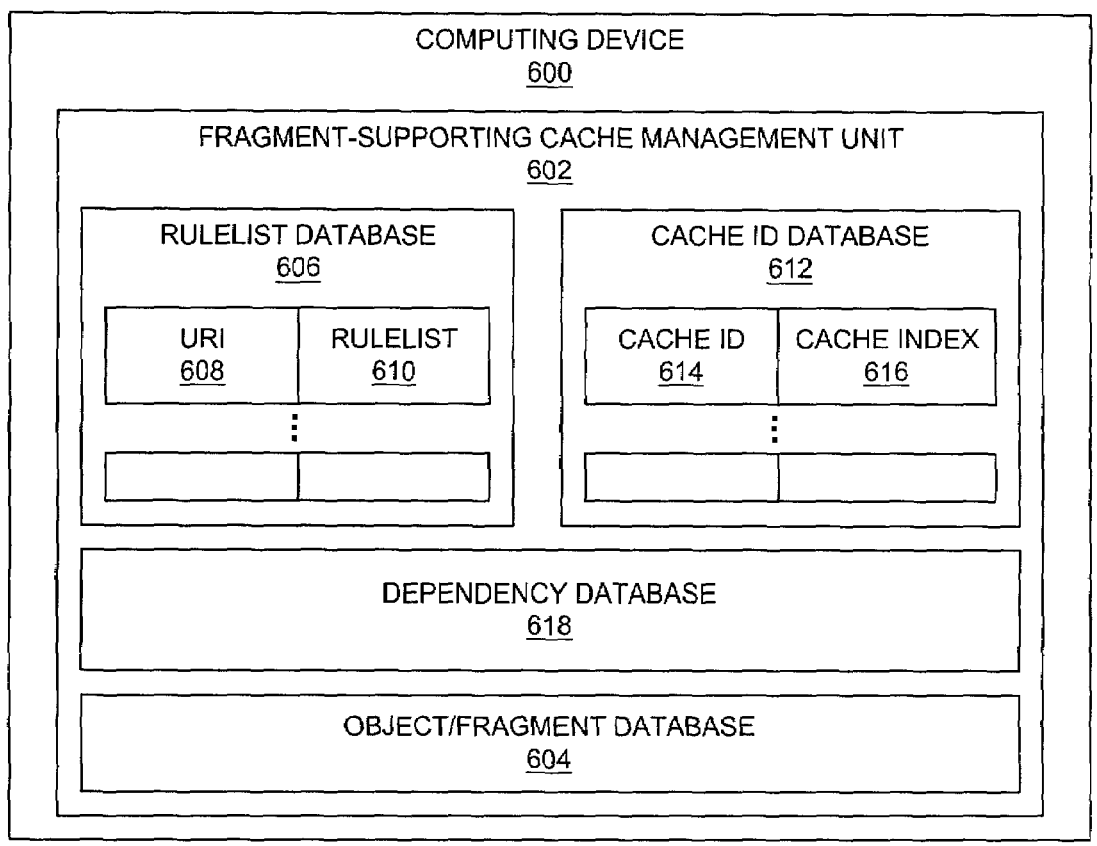
FIG. 6A depicts a cache management unit for a fragment-supporting cache within a computing device.

With reference now to FIG. 6A, a block diagram depicts a cache management unit for a fragment-supporting cache within a computing device in accordance with an implementation of the present invention. Computing device 600, which may be a client, a server, or possibly have both client and server functionality, contains fragment-supporting cache management unit 602, which contains functionality for caching objects on behalf of computing device 600. For example, cache management unit 602 may act as an intermediate cache on a data path between other cache-enabled devices; in other cases, cache management unit 602 may cache objects in a client device on behalf of an end-user.

Fragment-supporting cache management unit 602 comprises object database 604 for storing/caching objects, which may include metadata that is associated with the objects and network headers that were received along with the objects. Fragment-supporting cache management unit 602 also comprises databases for storing information related to cache management operations, which are mentioned here but described in more detail below with respect to FIGS. 6B-6D. Rulelist database 606 stores URI paths 608 and their associated rulelists 610. Cache ID database 612 stores cache IDs 614 and their associated cache indices 616. Dependency database 618 stores the mapping between dependency IDs and cache IDs. Multiple cache IDs may be associated with a single dependency, and multiple dependencies may be associated with a single cache ID.

Figure 6B:
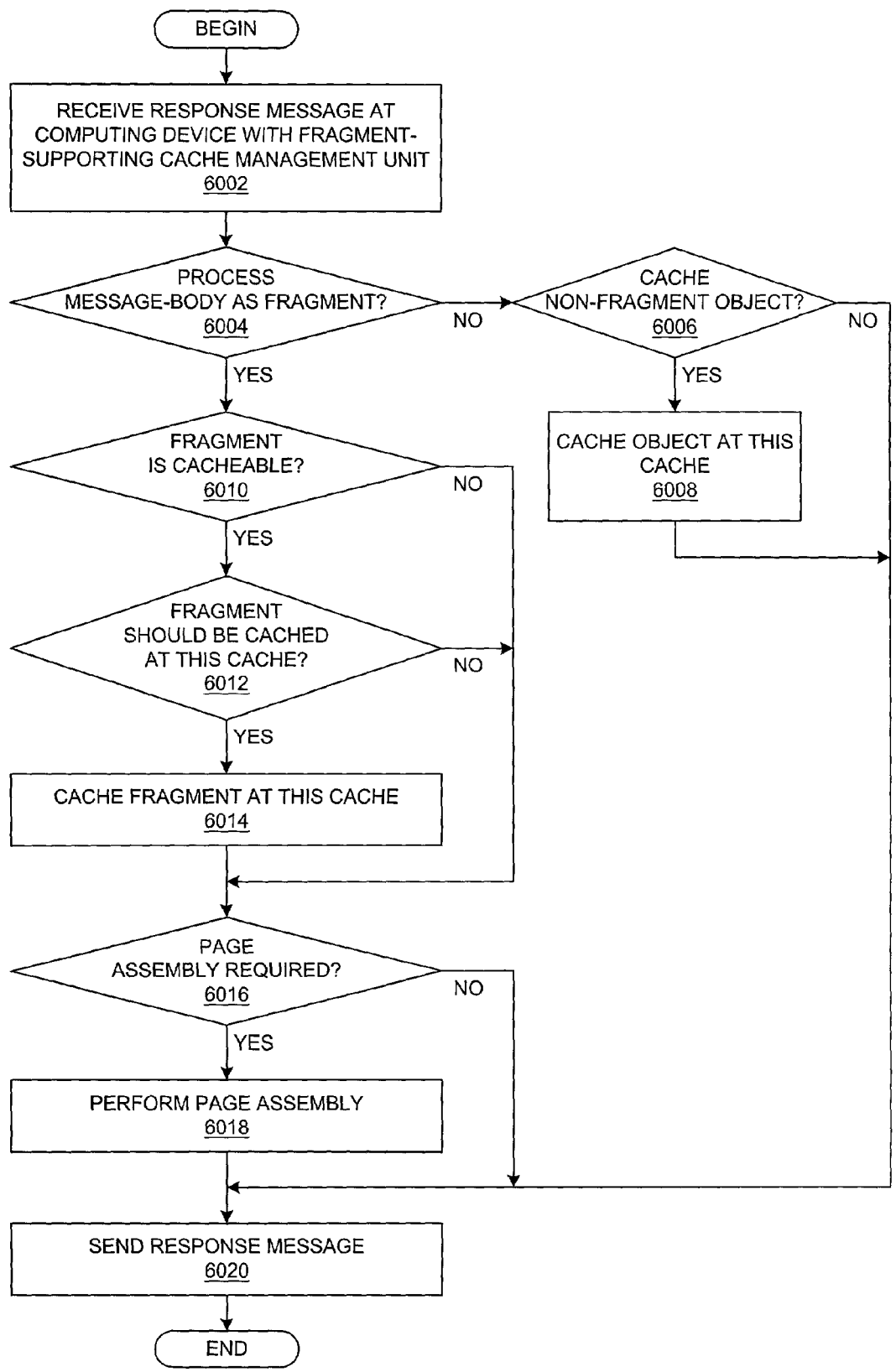
FIG. 6B is a flowchart that depicts a process that may be used by a fragment-supporting cache management unit when processing response messages that contain fragments.

Description of Some of the Processes within a Cache Management Unit for a Fragment-Supporting Cache With reference now to FIG. 6B, a flowchart depicts a process that may be used by a fragment-supporting cache management unit when processing response messages that contain fragments in accordance with an implementation of the present invention. In other words, FIG. 6B depicts a process that might be used to determine if and how an object in a response message should be processed and/or cached at a fragment-supporting cache.

The process begins when a computing device that contains a fragment-supporting cache management unit, such as that shown in FIG. 6A, receives a response message (step 6002), such as an HTTP Response message. A determination is then made as to whether the cache management unit should process the message body or payload portion in the response message as a fragment or non-fragment (step 6004).

If the response message should be processed as containing a non-fragment, then a determination is made as to whether or not the non-fragment object should be and can be cached at this computing device, i.e. cached by the cache management unit (step 6006), using the existing HTTP 1.1 rules. For example, a response message containing a non-fragment object may have an indication that it should not be cached; in an HTTP Response message, a "Cache-Control" header may have a "no-cache" directive. If the object should be cached and it is possible for it to be cached, then it is stored appropriately by the cache management unit (step 6008). In either case, the caching operation for the object is completed, and the process branches to complete any other operations for the response message.

If the response message should be processed as containing a fragment, then a determination is made as to whether the fragment is cacheable (step 6010). If not, then the process branches to complete any other operations for the response message. If the fragment is cacheable, then a determination is made as to whether this particular fragment should be cached in the cache of this particular computing device (step 6012). If not, then the process branches to complete any other operations for the response message. If the fragment that is currently being processed should be cached at the current computing device, then it is stored in the cache of the computing device by the cache management unit (step 6014).

If any of the cases in which the fragment has been cached, or was determined not to be cached at the current computing device, or was determined not to be cacheable, then a determination is made as to whether page assembly is required for the fragment prior to forwarding the response message (step 6016). If page assembly is required, then page assembly is performed (step 6018). In either case, the fragment or non-fragment object from the response message has been fully processed by the cache management unit of the current computing device, and the response message is modified, if necessary, and forwarded towards its destination (step 6020), thereby completing the process.

Figure 6C:
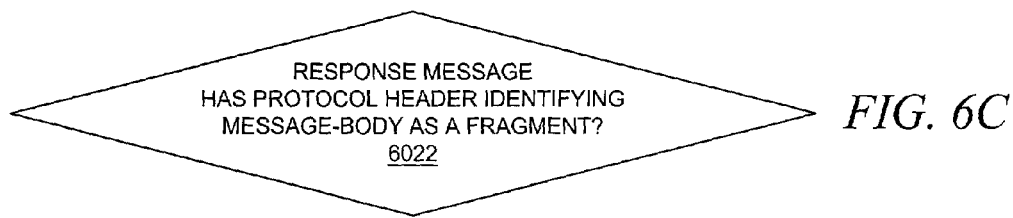
FIG. 6C is a flowchart step that depicts a preferred method for determining whether or not a message body contains a fragment object.

With reference now to FIG. 6C, a flowchart step depicts a preferred method for determining whether or not a message body contains a fragment object. FIG. 6C presents a step that may be substituted for step 6004 in FIG. 6B. In a preferred embodiment, it is determined whether or not the received response message contains a message/protocol header that identifies the payload or the message body as a fragment (step 6022). In particular, as shown in FIG. 4, a FRAGMENT header can be placed in an HTTP message to indicate that the payload of the message contains a fragment object.

Figure 6D:
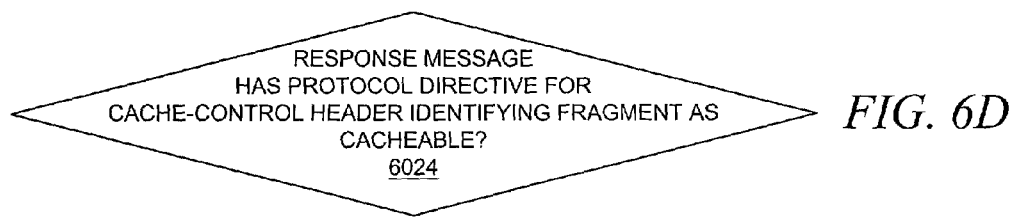
FIG. 6D is a flowchart step that depicts a more particular method for determining whether or not a fragment object is cacheable.

With reference now to FIG. 6D, a flowchart step depicts a more particular method for determining whether or not a fragment object is cacheable. FIG. 6D presents a step that may be substituted for step 6010 in FIG. 6B. In this embodiment, it is determined whether or not the received response message contains a directive for a protocol header for cache control that identifies the fragment as cacheable (step 6024).

Figure 6E:
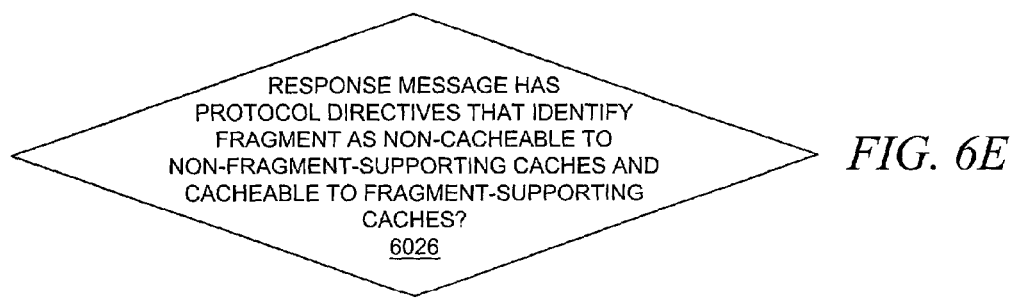
FIG. 6E is a flowchart step that depicts a preferred method for determining whether or not a fragment object is cacheable.

With reference now to FIG. 6E, a flowchart step depicts a preferred method for determining whether or not a fragment object is cacheable. In a manner similar to FIG. 6D, FIG. 6E presents a step that may be substituted for step 6010 in FIG. 6B. In a preferred embodiment, it is determined whether or not the received response message has a directive for a message/protocol header that identifies the fragment as cacheable to fragment-supporting caches and as non-cacheable to non-fragment-supporting caches (step 6026). In particular, as discussed above, a "Cache-Control" header may be included in an HTTP message, and it is standard practice to place a "no-cache" directive in the "Cache-Control" header to prevent caching of objects; the present invention maintains this practice for non-fragment-supporting caches while extending the use of the "Cache-Control" header to include a "fragmentrules" directive to indicate that the fragment in the a message is cacheable in accordance with fragment-caching rules.

Figure 6F:
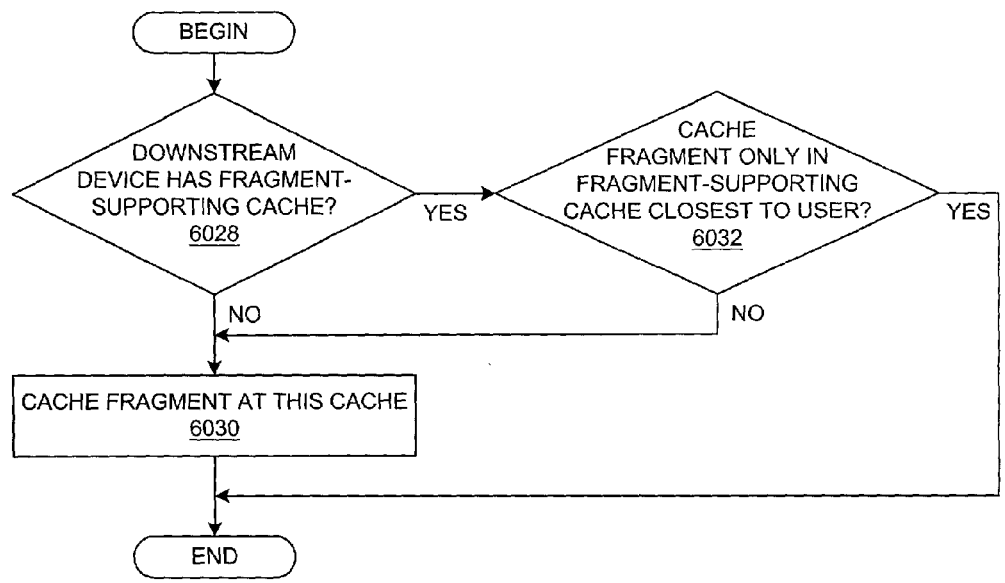
FIG. 6F, a flowchart that depicts a method for determining whether or not a fragment object should be cached at a particular computing device.

With reference now to FIG. 6F, a flowchart depicts a method for determining whether or not a fragment object should be cached at a particular computing device. FIG. 6F depicts a process that may be substituted for steps 6012 and 6014 in FIG. 6B; when this process is invoked, it has already been determined that the response message contains a cacheable fragment.

The process begins by determining whether or not a downstream device has a fragment-supporting cache (step 6028). A downstream device would be a computing device to which the current computing device would forward the response message. If a downstream device does not have a fragment-supporting cache, then the cache management unit of the current computing caches the fragment object that is currently being processed (step 6030), and the process is complete.

If a downstream device does have a fragment-supporting cache, a determination is made as to whether or not the fragment object that is, currently being processed should only be cached in the fragment-supporting cache that is closest to the destination user/client device (step 6032). If not, then the current fragment object may also be cached at the current computing device, and the process branches to step 6030 to cache the fragment. However, if the fragment should only be cached in the fragment-supporting cache closest to the destination user/client device, then the current computing device does not cache the fragment, and the process is complete.

Figure 6G:
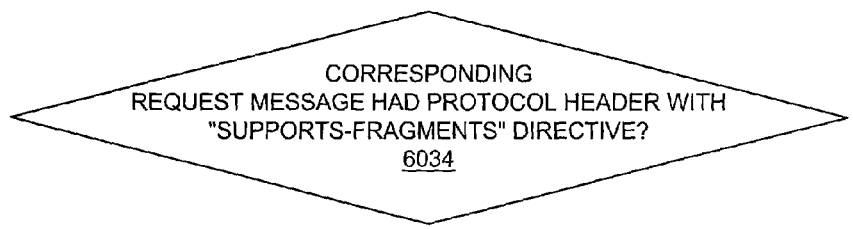
FIG. 6G is a flowchart step that depicts a preferred method for determining whether or not a downstream device has a fragment-supporting cache.

With reference now to FIG. 6G, a flowchart step depicts a preferred method for determining whether or not a downstream device has a fragment-supporting cache. FIG. 6G presents a step that may be substituted for step 6028 in FIG. 6F. FIG. 6F and FIG. 6G depict processes that are initiated after receiving a response message; the response message would be received as a consequence of previously receiving and forwarding a request message by the current computing device. Hence, the cache management unit has maintained some form of state information for the previously received request message when the response message is received.

With respect to determining whether or not a downstream device has a fragment-supporting cache, in a preferred embodiment, a determination is made as to whether or not the previously received request message contained a message/protocol header with a directive indicating that fragments are supported (step 6034). In particular, as shown in FIG. 4, a FRAGMENT header can be placed in an HTTP message, and the FRAGMENT header may contain a "supports-fragments" directive.

Figure 6H:
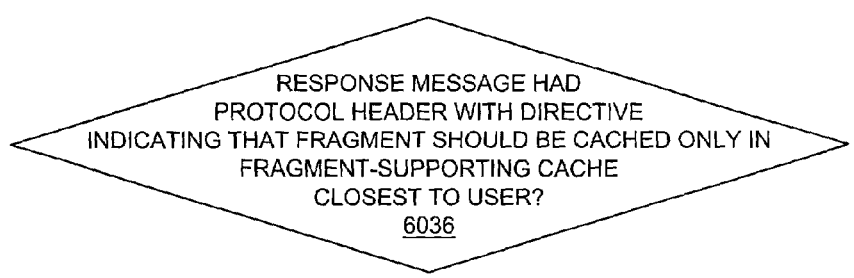
FIG. 6H is a flowchart step that depicts a more particular method for determining whether or not the fragment object that is currently being processed should only be cached in the fragment-supporting cache that is closest to the destination user/client device.

With reference now to FIG. 6H, a flowchart step depicts a more particular method for determining whether or not the fragment object that is currently being processed should only be cached in the fragment-supporting cache that is closest to the destination user/client device. FIG. 6H presents a step that may be substituted for step 6032 in FIG. 6F. In this embodiment, the response message that is currently being processed by the current computing device has a message/protocol header that contains a directive from the origin server that indicates that the fragment in the response message should only be cached in the fragment-supporting cache closed to the destination user/device (step 6036).

Figure 6I:
FIG. 6I is a flowchart step that depicts a preferred method for determining whether or not the fragment object that is currently being processed should only be cached in the fragment-supporting cache that is closest to the destination user/client device.

With reference now to FIG. 6I, a flowchart step depicts a preferred method for determining whether or not the fragment object that is currently being processed should only be cached in the fragment-supporting cache that is closest to the destination user/client device. In a manner similar to FIG. 6H, FIG. 6I presents a step that may be substituted for step 6032 in FIG. 6F. In a preferred embodiment, the response message that is currently being processed by the current computing device has an HTTP "Cache-Control" message/protocol header that contains a "private" directive from the origin server that indicates to fragment-supporting caches that the fragment in the response message should only be cached in the fragment-supporting cache closed to the destination user/ device (step 6038).

Figure 6J:
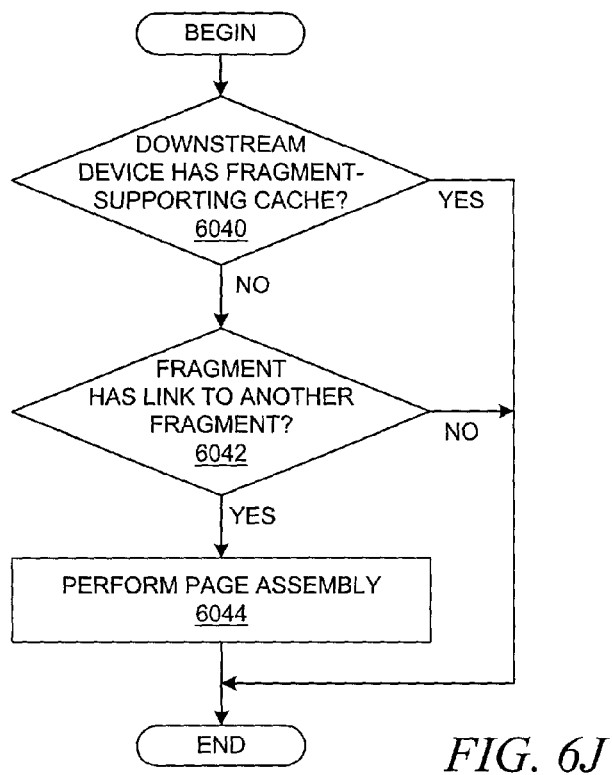
FIG. 6J is a flowchart that depicts a method for determining whether or not page assembly is required prior to returning a response message from the current computing device.

With reference now to FIG. 6J, a flowchart depicts a method for determining whether or not page assembly is required prior to returning a response message from the current computing device. FIG. 6J depicts a process that may be substituted for steps 6016 and 6018 in FIG. 6B; when this process is invoked, the fragment from the response message has already been cached if necessary.

The process begins by determining whether or not a downstream device has a fragment-supporting cache (step 6040), e.g., in a manner similar to step 6028 in FIG. 6F. If a downstream device does have a fragment-supporting cache, then page assembly is not required, and the process is complete. If a downstream device does not have a fragment-supporting cache, then a determination is made as to whether or not the fragment that is currently being processed has a link to another fragment (step 6042). If not, then no page assembly is required, and the process is complete. If a link to another fragment is present in the current fragment, then page assembly is performed (step 6044), and the process is complete.

Figure 6K:
FIG. 6K is a flowchart step that depicts a more particular method for determining whether or not the fragment object that is currently being processed has a link to another fragment.

With reference now to FIG. 6K, a flowchart step depicts a more particular method for determining whether or not the fragment object that is currently being processed has a link to another fragment. FIG. 6K presents a step that may be substituted for step 6042 in FIG. 6J. In this embodiment, a determination is made as to whether the current fragment has a markup language element containing a tagged element that indicates a source identifier or source location of a fragment to be included (step 6046). In particular, as shown in FIG. 3, a FRAGMENTLINK element can be placed within the body of an HTML object to indicate a link to another fragment. In the HTTP specification, a source identifier is known as a "Request-URI", i.e. an identifier that identifies the resource upon which to apply the request.

Figure 6L:
FIG. 6L is a flowchart step that depicts an alternate method for determining whether or not the fragment object that is currently being processed has a link to another fragment.

With reference now to FIG. 6L, a flowchart step depicts an alternate method for determining whether or not the fragment object that is currently being processed has a link to another fragment. In a manner similar to FIG. 6K, FIG. 6L presents a step that may be substituted for step 6042 in FIG. 6J. In this alternative embodiment, a determination is made as to whether the response message that is currently being processed contains a message/protocol header with a directive indicating that the fragment in the message body of the response message, i.e. the fragment that is currently being processed, has a link to another fragment (step 6048). This could be determined by scanning the fragment for a FRAGMENTLINK. However, it is much more efficient to use a response header to indicate this, so that unnecessary scans are avoided. In particular, as shown in FIG. 4, a FRAGMENT header can be placed in an HTTP message, and the FRAGMENT header may contain a "contains-fragments" directive. This directive allows the cache management unit of the current computing device to forego a scan of the current fragment to search for a FRAGMENTLINK element.

Figure 6O:
FIG. 6O is a flowchart step that depicts a preferred method for determining whether or not the fragment link in the current fragment from the response message indicates that it should be expanded to multiple fragment links.
Figure 6M:
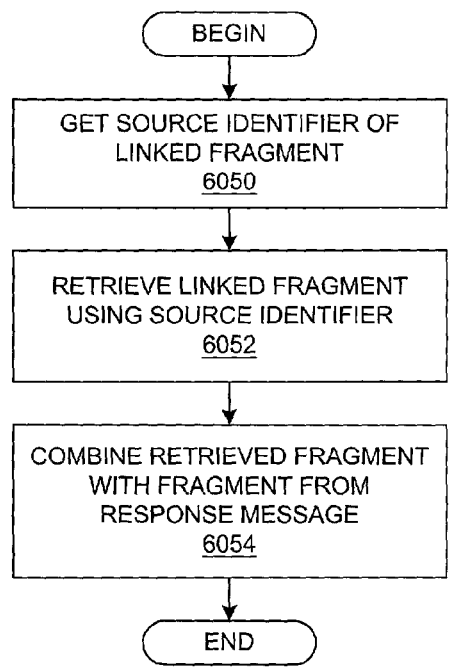
FIG. 6M is a flowchart that depicts a process for performing page assembly.

With reference now to FIG. 6M, a flowchart depicts a process for performing page assembly. FIG. 6M presents a step that may be substituted for step 6018 in FIG. 6B or for step 6044 in FIG. 6J. The process begins by getting the source identifier, e.g., URI, of the linked fragment that is included in the current fragment from the response message (step 6050). The linked fragment is then retrieved using the source identifier (step 6052). The retrieved fragment and the current fragment from the response message are then combined to form an assembled page (step 6054), i.e. a new fragment, and the process is complete.

Combining the content of fragments is dependent on the encoding rules for the content type of the fragments. For example, each element in a markup language may be regarded as a fragment, and a child element can be embedded within a parent element by inserting the tagged element within the delimiting tags of the parent element. Combining fragments, however, also requires consideration for the manner in which the headers and property values of the fragments are to be combined, as is discussed in more detail further below.

Figure 6N:
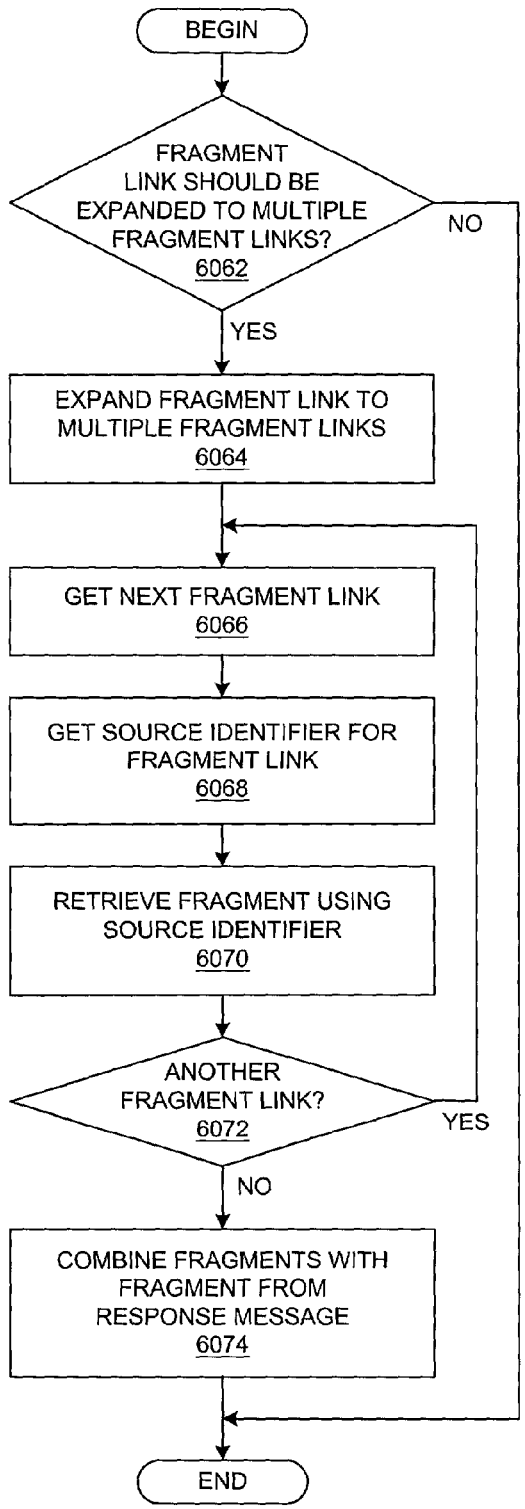
FIG. 6N is a flowchart that depicts a process for optionally expanding a fragment link to multiple fragment links.

With reference now to FIG. 6N, a flowchart depicts a process for optionally expanding a fragment link to multiple fragment links. Referring back to FIG. 6M, if the current fragment contains multiple fragment links, then step 6050 and 6052 could be repeated as many times as is necessary to retrieve the multiple linked fragments, all of which could then be combined to form a single assembled page. In contrast, FIG. 6N depicts a process by which a single fragment link can be compactly denoted to include references to multiple fragments that are combined to form an assembled page.

The process begins with a determination of whether or not the fragment link in the current fragment from the response message indicates that it should be expanded to multiple fragment links (step 6062). If not, then the process is complete; if so, then the fragment link is expanded to a set of multiple fragment links using information associated with the fragment link (step 6064).

The multiple fragment links are then processed in a loop. The next fragment link in the set of multiple fragment links is obtained (step 6066), and the source identifier for the fragment link is obtained (step 6068). The identified fragment is then retrieved using the source identifier (step 6070). A determination is made as to whether there is another fragment link in the set of multiple fragment links (step 6072), and if so, then the process branches back to step 6066 to process another fragment link. If there are no remaining fragment links, i.e. all fragments have been retrieved, then all of the retrieved fragments are combined with the fragment from the original response message (step 6074), and the process is complete.

With reference now to FIG. 6O, a flowchart step depicts a preferred method for determining whether or not the fragment link in the current fragment from the response message indicates that it should be expanded to multiple fragment links. FIG. 6O presents a step that may be substituted for step 6062 in FIG. 6N. In a preferred embodiment, a determination is made as to whether or not a markup-language-tagged element for the fragment link in the fragment from the response message includes an attribute that indicates that the fragment link should be expanded (step 6076). In particular, as shown in FIG. 3, a FRAGMENTLINK element can have a FOREACH attribute.

Figure 6P:
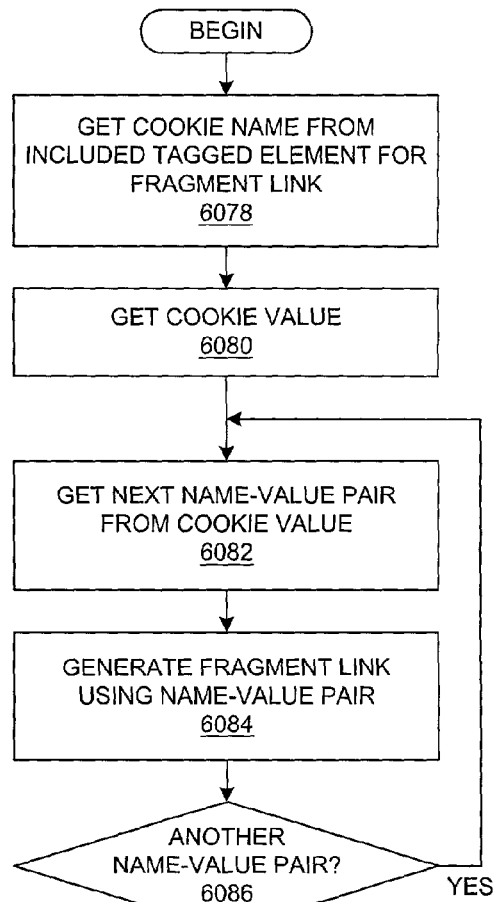
FIG. 6P is a flowchart that depicts a process for expanding a fragment link to multiple fragment links in accordance with information associated with the fragment link.

With reference now to FIG. 6P, a flowchart depicts a process for expanding a fragment link to multiple fragment links in accordance with information associated with the fragment link. FIG. 6P presents a series of steps that may be substituted for step 6064 in FIG. 6N.

The process begins by getting a cookie name from the included markup-language-tagged element for the fragment link (step 6078). As shown in FIG. 3, a FOREACH attribute may provide a string that is interpreted as the name of a cookie. The value of the cookie is retrieved (step 6080); the value of the cookie is a string that represents a list of name-value pairs, which are then processed in a loop. The next name-value pair is retrieved from the cookie value (step 6082), and a fragment link is generated by using the name-value pair, e.g., using the name-value pair as a query parameter (step 6084). A determination is then made as to whether there is another name-value pair in the cookie value (step 6086), and if so, then the process branches back to step 6082 to process another name-value pair. For example, a FRAGMENTLINK element could be generated for each name-value pair, thereby expanding the original FRAGMENTLINK element into a set of multiple FRAGMENTLINK elements that replace the original FRAGMENTLINK element. If there are no remaining name-value pairs, then the process is complete.

Figure 6Q:
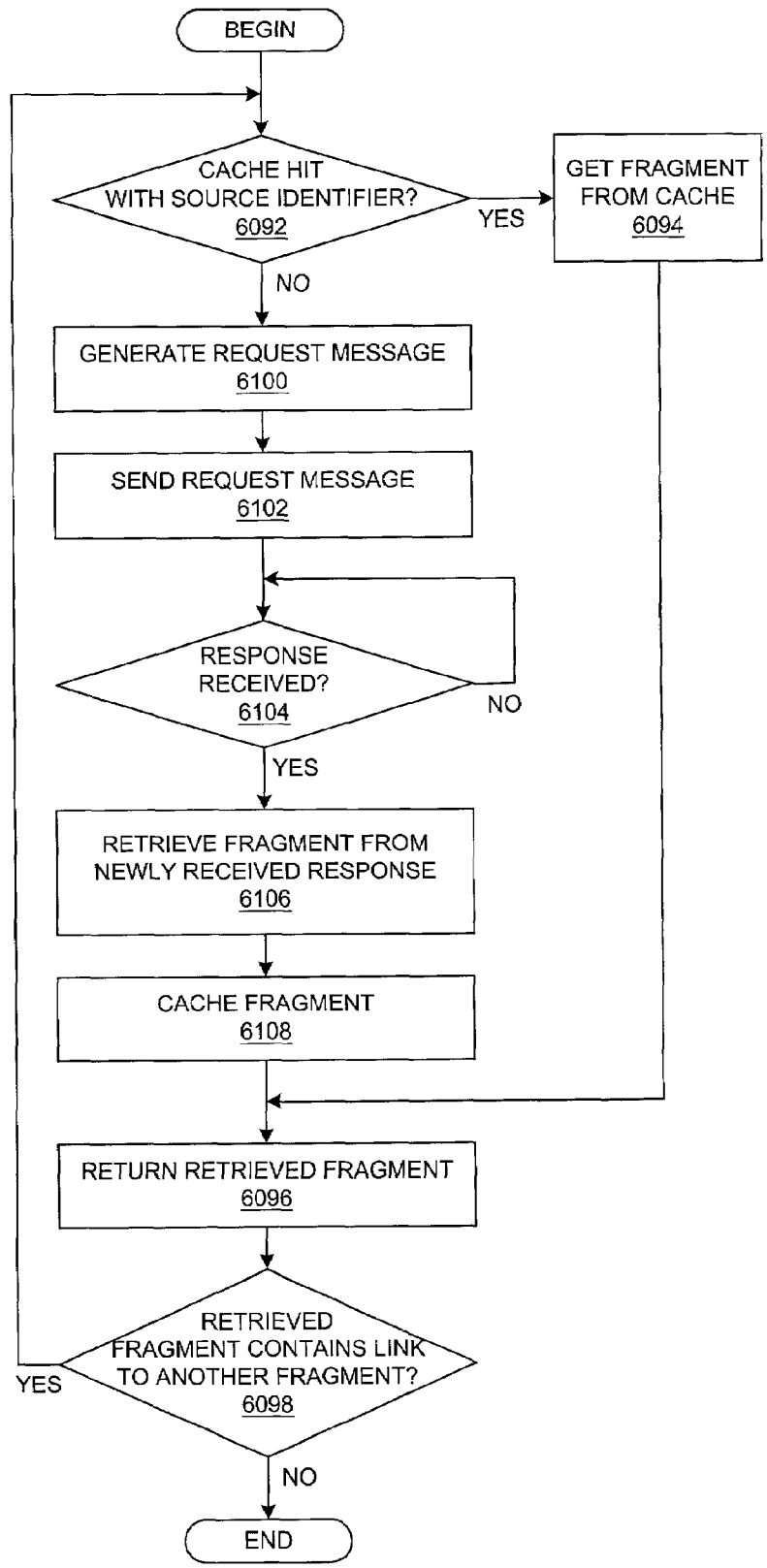
FIG. 6Q is a flowchart that depicts a process for retrieving a fragment using a source identifier for the fragment.

With reference now to FIG. 6Q, a flowchart depicts a process for retrieving a fragment using a source identifier for the fragment. FIG. 6Q presents a process that may be substituted for step 6052 in FIG. 6M or for step 6070 in FIG. 6N; the process in FIG. 6Q commences after a source identifier for a fragment has already been determined.

The process begins with a determination of whether or not there is a cache hit with the source identifier within the local cache at the current computing device (step 6092). If so, then the fragment can be retrieved from the cache (step 6094), and the retrieved fragment is returned to calling routine (step 6096). If the retrieved fragment contains a fragment link, then the process loops back to step 6092 to retrieve the fragment that is identified by the fragment link (step 6098), thereby continuing the process in order to retrieve all child fragments.

If there was a cache miss with the source identifier within the local cache at step 6092, then a request message is generated (step 6100) and sent using the source identifier as the destination identifier (step 6102). As explained with respect to FIG. 4, the request message would include a "supports-fragments" directive since the current computing device contains a fragment-supporting cache management unit. The cache management unit then waits for a response to the request message (step 6104). Preferably, a thread is spawned for the request, and the thread sleeps as it waits for a response while the computing device performs other operations.

After a response message is received, then the fragment in the message body of the response message is retrieved (step 6106) and cached (step 6108). As mentioned above, the retrieved fragment is returned to the calling routine, and if the retrieved fragment contains a fragment link, then the process loops back to step 6092 to retrieve the fragment that is identified by the fragment link, thereby continuing the process in order to retrieve all child fragments. Otherwise, the process of retrieving a fragment is complete.

Figure 6R:
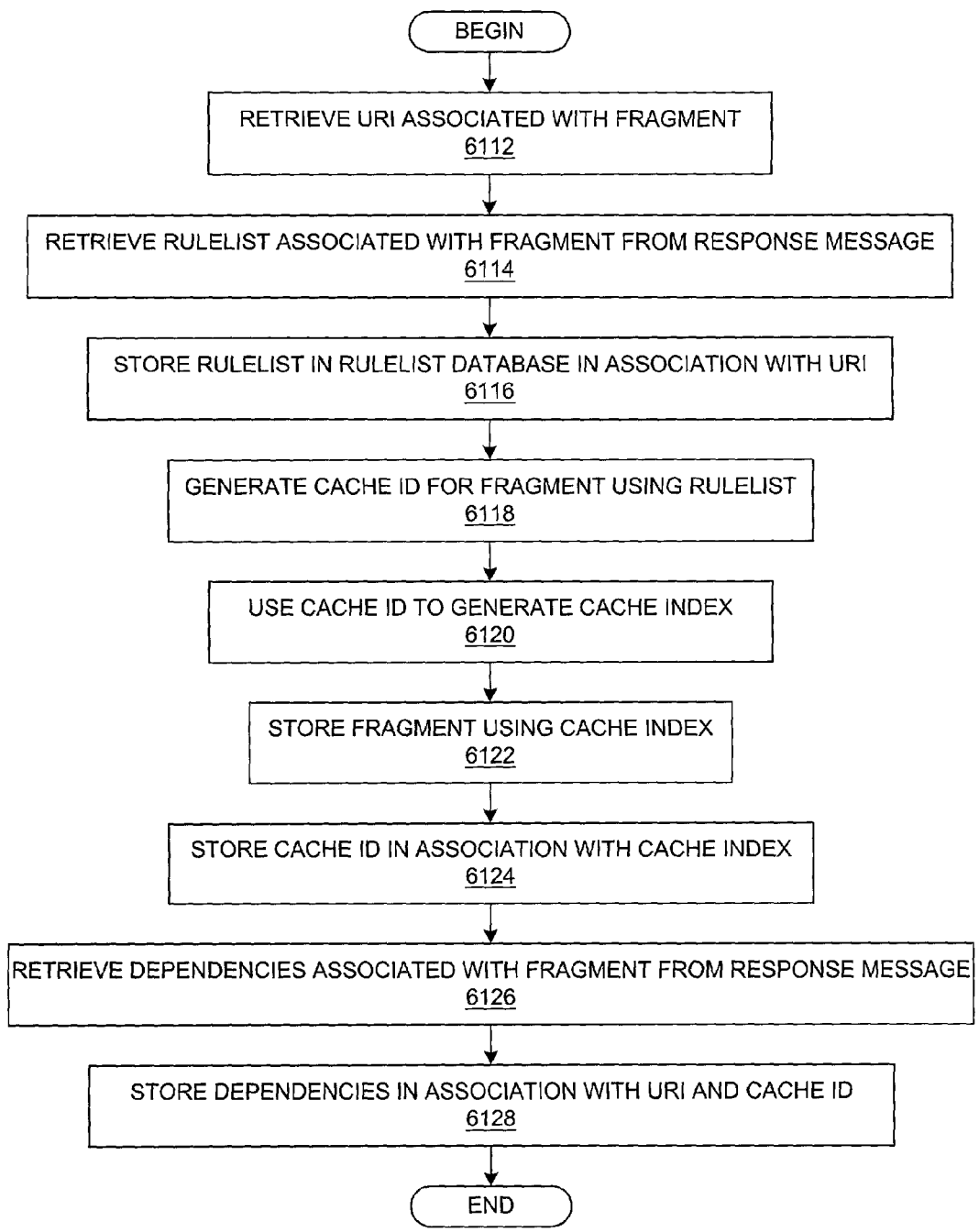
FIG. 6R is a flowchart that depicts some of the processing that is performed when a fragment is cached within a fragment-supporting cache management unit.

With reference now to FIG. 6R, a flowchart depicts some of the processing that is performed when a fragment is cached within a fragment-supporting cache management unit. FIG. 6R presents a process that may be substituted for step 6014 in FIG. 6B or for step 6030 in FIG. 6F; the process in FIG. 6R commences after a a fragment has already been received in a response message at the current computing device.

The process begins by retrieving the source identifier associated with the fragment, e.g., the URI in the response message (step 6112) along with the rulelist that is associated with the fragment (step 6114) if a rulelist is present in the response message. The rulelist is stored in the rulelist database in association with the URI path (step 6116) for later use when attempting to make a cache hit for a request that is being processed. The rulelist is used to guide the generation of a cache ID for caching the fragment within the response message (step 6118).

The cache ID is then used to generate a cache index (step 6120); the cache index is used to determine the location within the fragment storage, i.e. cache memory, at which the fragment from the response message should be stored. The cache index may be created by putting the cache ID through a hashing algorithm. The technique of the present invention is flexible in that each implementation of a cache management unit may employ its own algorithm for computing a cache index after the cache ID has been generated in a manner that adheres to the technique of using cache ID rules that accompany a fragment.

The fragment is then stored in the cache (step 6122) along with any other necessary information or metadata, including the headers in the HTTP Response message that accompanied the fragment or equivalent information, and the newly generated cache ID is then stored in association with the cache index (step 6124).

Alternatively, the cache index might be computed whenever necessary, and there might be no need to store the cache index. As another alternative, the cache ID might be used directly as some type of storage index or database identifier, and there may be no need to compute a separate cache index.

If there were any dependencies associated with the fragment within the response message, then the dependencies are retrieved (step 6126) and stored in association with the fragment's cache ID (step 6128).

Figure 6S:
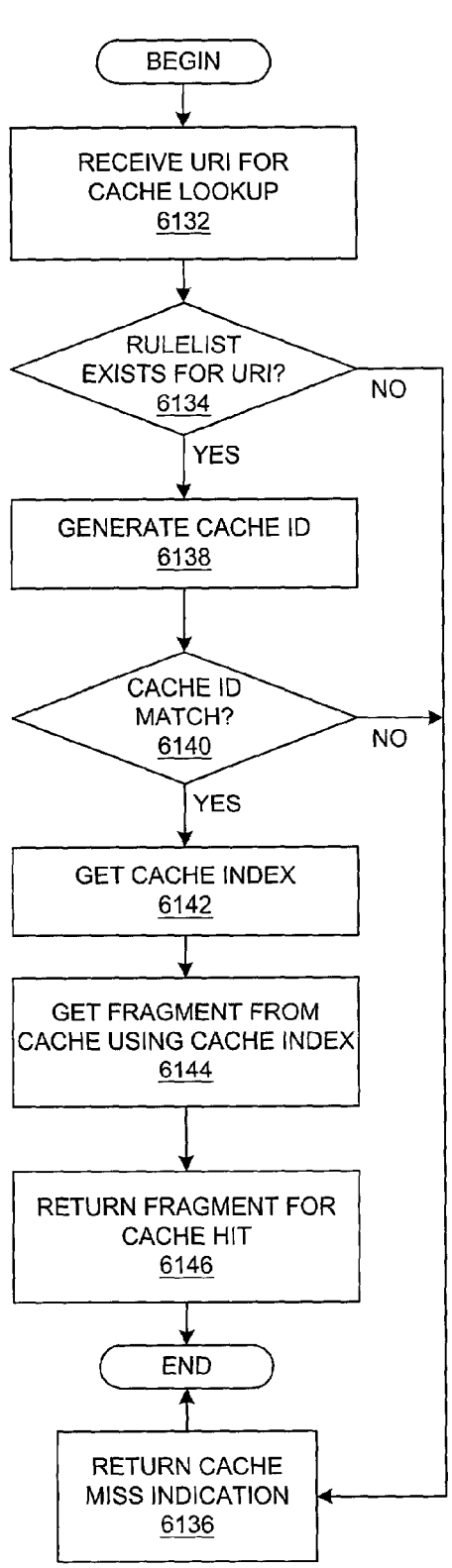
FIG. 6S is a flowchart that depicts a process that may be used by a fragment-supporting cache management unit to obtain a fragment if it is cached at a computing device that contains the cache management unit.

With reference now to FIG. 6S, a flowchart depicts a process that may be used by a fragment-supporting cache management unit to obtain a fragment if it is cached at a computing device that contains the cache management unit. In other words, FIG. 6S depicts a process that might be used to determine if a cache hit can be generated at a fragment-supporting cache, e.g., in response to examining a request message.

The process begins by retrieving the source identifier, e.g., a URI path, associated with a request (step 6132). The rulelist database is then searched to determine whether a cache ID rulelist exists within the rulelist database for the URI path (step 6134). If there was no rulelist associated with the URI path, then a cache miss indication is returned (step 6136), and the process is complete.

If there is a rulelist associated with the URI path, then the rules within the rulelist are employed in to create a cache ID (step 6138), assuming that a cache ID can be generated, i.e. all of the required information is present for at least one rule to be successfully evaluated. A determination is then made as to whether the cache ID has been used previously to store a fragment (step 6140), i.e. whether there is a cache hit. If not, then a cache miss indication is returned, and the process is complete.

If there is a cache hit, then the cache index associated with the cache ID is retrieved (step 6142), which allows the subsequent retrieval of the appropriate fragment using the cache index (step 6144). The fragment is then returned to the requester (step 6146), thereby completing the process.

Figure 6T:
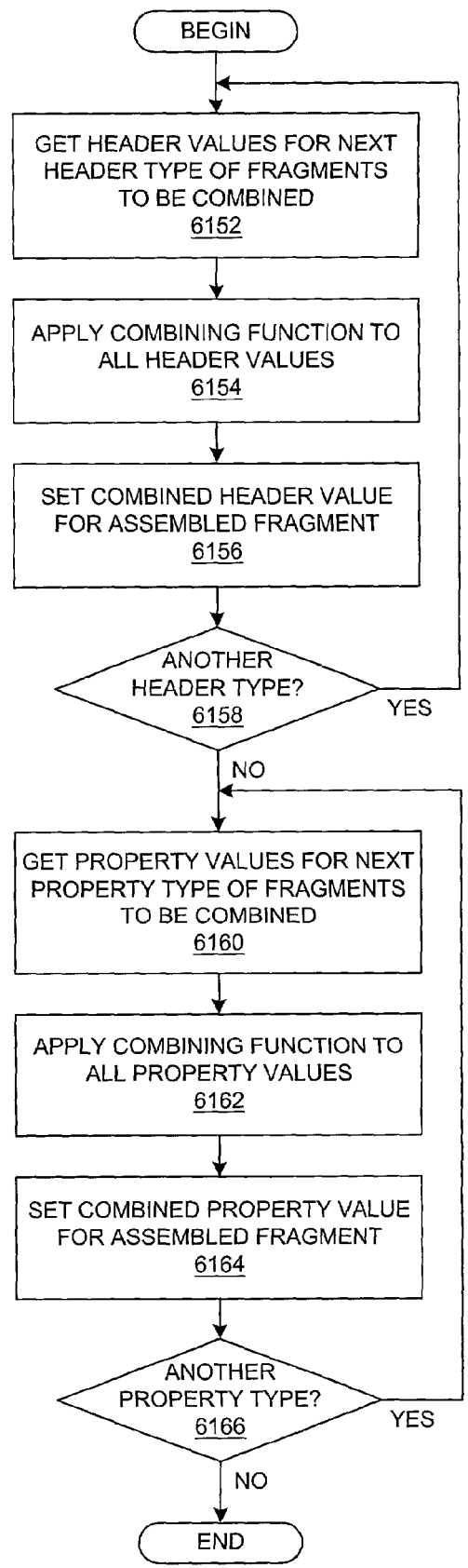
FIG. 6T is a flowchart that depicts a process for combining header values and property values associated with a plurality of fragments.

With reference now to FIG. 6T, a flowchart depicts a process for combining header values and property values associated with a plurality of fragments. FIG. 6T presents a process that may be substituted for step 6054 in FIG. 6M or step 6074 in FIG. 6N. Each fragment that is to be combined, whether it was received in a response message or retrieved from the cache of the computing device, has an associated set of protocol headers that were received with each fragment in a response message. The values of the headers and properties are combined into a single directive/value for each header or property.

The process begins by getting the header values for a next header type of all fragments that are to be combined (step 6152). An appropriate combining function is then applied to all of these header values (step 6154), and the combined header value is then set or associated with the assembled page or fragment (step 6156). A determination is then made as to whether or not there is another header type to be processed (step 6158), and if so, then the process branches back to step 6152 to process another header type.

After all of the headers have been processed, the process then retrieves the property values for a next property type of all fragments that are to be combined (step 6160). An appropriate combining function is then applied to all of these property values (step 6162), and the combined property value is then set or associated with the assembled page or fragment (step 6164). A determination is then made as to whether or not there is another property type to be processed (step 6166), and if so, then the process branches back to step 6160 to process another property type; otherwise, the process is complete.

Figure 6U:
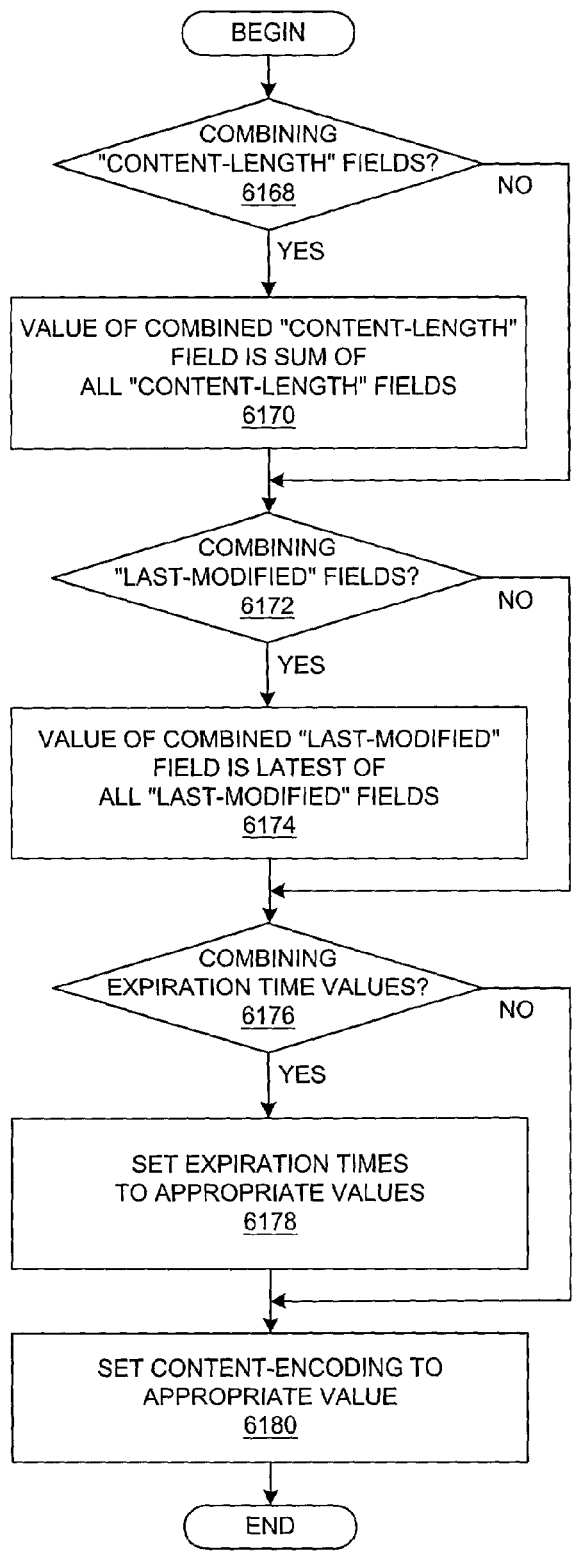
FIG. 6U is a flowchart that depicts a set of steps that represent a series of combining functions for header types and property values.

With reference now to FIG. 6U, a flowchart depicts a set of steps that represent a series of combining functions for header types and property values. FIG. 6U represents some combining functions that might be used in steps 6154 or 6162 in FIG. 6T; the combining functions that are shown are not intended as a complete list of combining functions that could be present in a cache management unit.

The process begins by determining whether or not an HTTP "Content-Length" field is being combined (step 6168). If not, then the next step is skipped; otherwise, the value of the combined "Content-Length" field is the sum of all of the "Content-Length" fields (step 6170).

The process continues by determining whether or not an HTTP "Last-Modified" field is being combined (step 6172). If not, then the next step is skipped; otherwise, the value of the combined "Last-Modified" field is the latest of all of the "Last-Modified" fields (step 6174).

The process continues by determining whether or not expiration time values are being combined (step 6176). If not, then the next step is skipped; otherwise, the value of the combined expiration time values is set in accordance with the following considerations (step 6178). The relationship between the response headers that invalidate based on time in the fragments and those in the assembled page should be respected by a cache that supports fragments. The assembly process should determine the invalidation times for the assembled page in the following manner. First, from the "Expires" header, which is an absolute time, the "Cache-Control" header with a "max-age" directive, which is a relative time, and the "Date" header of each fragment, the shortest equivalent time interval of all fragments is calculated, including the top-level fragment and all recursively contained fragments. This is done by converting absolute times to delta times using the "Date" header value. This value can be termed "minimumRelativeTime". Second, the value in the assembled page's "Expires" header is set to the value in the "Date" header plus the computed minimumRelativeTime value. This is needed for caches that do not support the HTTP/1.1 "Cache-Control" header. Third, the assembled page's "max-age" directive is set to the computed minimumRelativeTime value because the HTTP/1.1 specification mandates that the "max-age" directive overrides the "Expires" header even if the "Expires" header is more restrictive. This is needed for caches that do support HTTP/1.1.

The last step in the process sets the content-encoding type to an appropriate value (step 6180). In a first alternative, according to the HTTP/1.1 specification, the cache may modify the content-encoding if the new encoding is known to be acceptable to the client, provided a "no-transform" cache-control directive is not present in one of the headers that is being combined. In a second alternative, the content-encodings of the included fragments are changed to be the same as the top-level fragment.

Figure 6V:
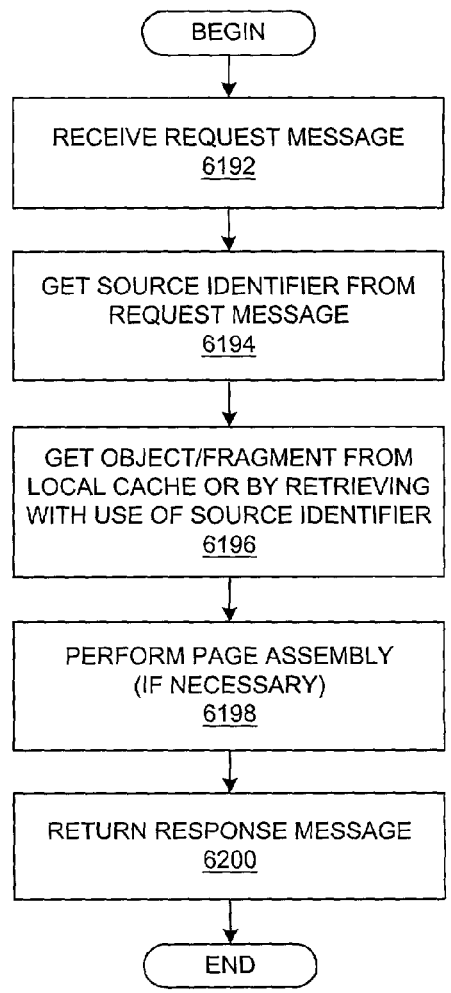
FIG. 6V is a flowchart that depicts a process that may be used by a fragment-supporting cache management unit when processing request messages.

With reference now to FIG. 6V, a flowchart depicts a process that may be used by a fragment-supporting cache management unit when processing request messages. In contrast to FIG. 6B, which depicts the processing of a response message, FIG. 6V depicts some of the steps associated with the processing of a request message.

The process begins by receiving a request message (step 6192), after which the source identifier is retrieved from the request message (step 6194). The source identifier is used to either obtain the identified object or fragment from the local cache, i.e. a cache hit occurs, or to retrieve the object or fragment by request, i.e. a cache miss occurs (step 6196). The process associated with a cache hit or a cache miss was described above with respect to FIG. 6Q. In either case, if page assembly is required, then it is performed (step 6198); the process associated with page assembly was described above with respect to FIG. 6T. A response message is then returned for the received request message (step 6200), thereby completing the process.

Figure 6W:
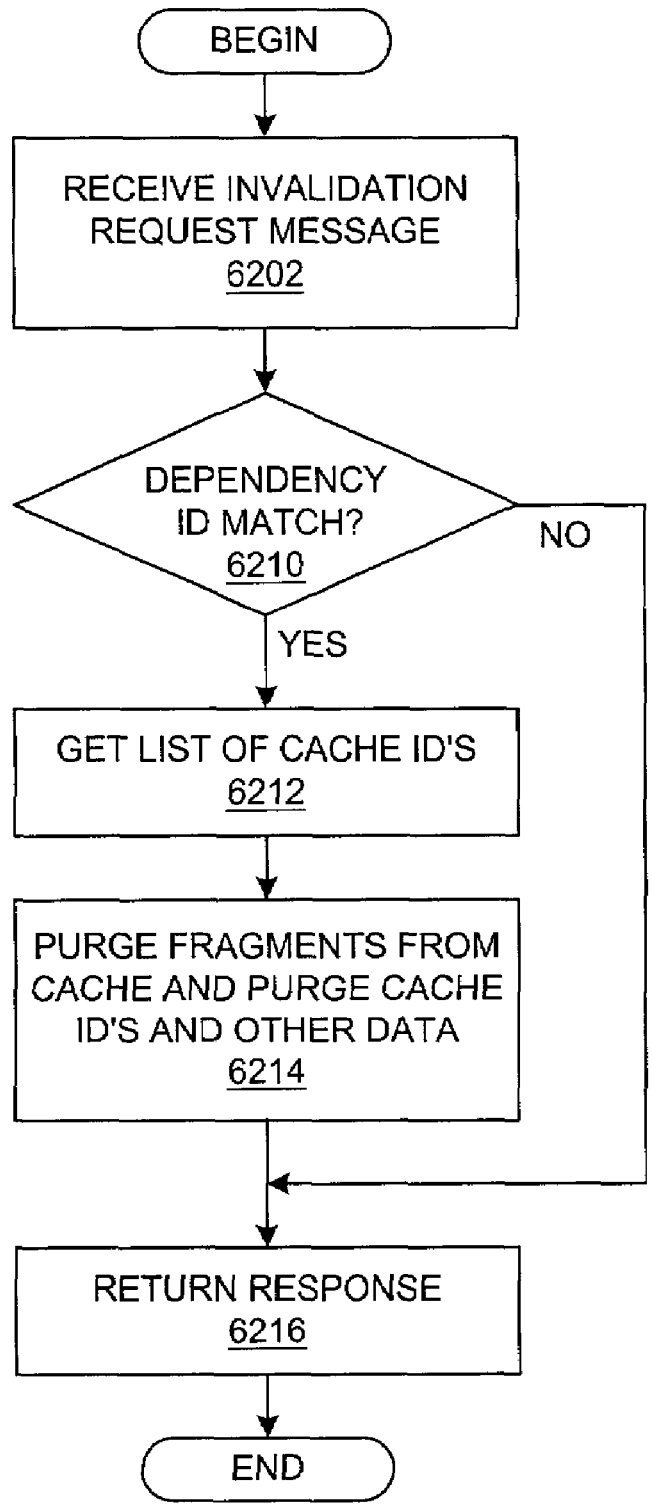
FIG. 6W is a flowchart that depicts a process that may be used by a fragment-supporting cache management unit when processing invalidation messages in accordance with an implementation of the present invention.

With reference now to FIG. 6W, a flowchart depicts a process that may be used by a fragment-supporting cache management unit when processing invalidation messages in accordance with an implementation of the present invention. As noted above, the technique of the present invention does not mandate any particular invalidation algorithm, and the process depicted in FIG. 6W is merely an example of the use of the dependency IDs of the present invention.

The process begins by receiving an invalidation request message at a computing device from an origin server that has published or served fragments that may be cached in the computing device (step 6202). This request contains a list of dependency ids. It is assumed that an origin server does not generate conflicting dependencies; by qualifying the dependencies with an application ID that includes at least its domain name, it is assumed that globally unique dependencies can be maintained. Authentication will normally be required to associate the application ID with the invalidator, so that an invalidator can only invalidate its own content.

A determination is then made as to whether any of the dependencies in the dependency database match the one or more dependencies within the received message (step 6210), and if so, the list of cache IDs that is associated with the matching dependency (or dependencies) is retrieved (step 6212). The cache IDs are then used to purge associated fragments from the cache (step 6214). If necessary or appropriate, associated rulelists and dependencies may also be purged.

An optional response may be returned to the originator of the invalidation request message (step 6216). If there were no dependency matches, then the process branches to step 6216. In any case, the process is complete.

Figure 7A:
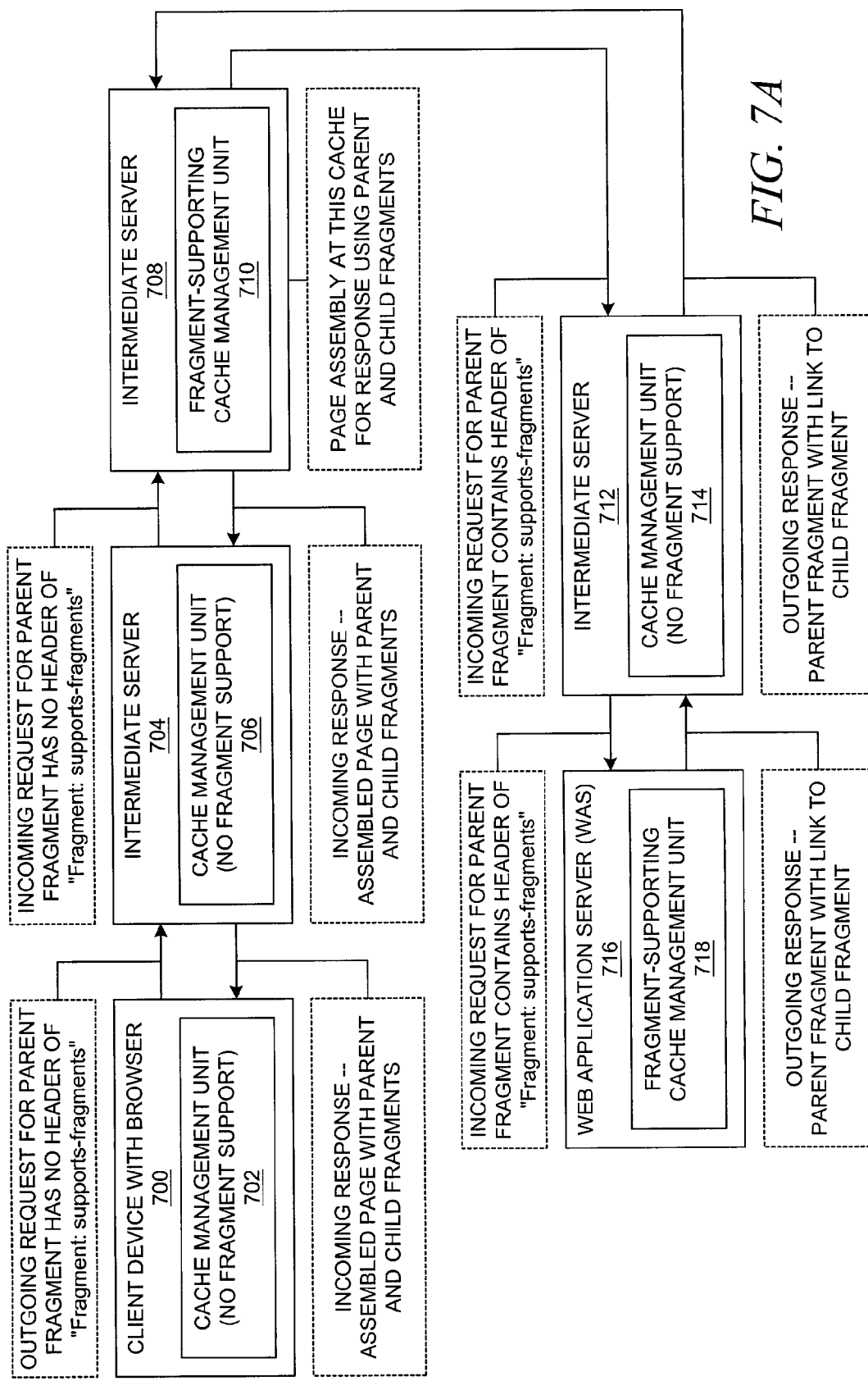
FIG. 7A is a block diagram that depicts some of the dataflow between a Web application server and a client in order to illustrate when some caches perform fragment assembly.

Examples of Some of the Coordination Between Cache Management Units for Fragment-Supporting Caches With reference now to FIG. 7A, a block diagram depicts some of the dataflow between a Web application server and a client in order to illustrate when some caches perform fragment assembly. Client device 700 comprises non-fragment-supporting cache management unit 702, which generates a request for a page and sends the request to intermediate server 704. Unbeknownst to the client device, the requested page actually comprises a parent fragment and a link to a child fragment. Intermediate server 704 receives the request, but cache management unit 706 does not support fragments nor does it have a cached version of the requested page.

The request is then forwarded to intermediate server 708, which comprises fragment-supporting cache management unit 710. Intermediate server 708 does not have a cached version of the requested page; intermediate server 708 adds a "Fragment: supports-fragments" header to the request message prior to sending the request message to intermediate server 712, which comprises non-fragment-supporting cache management unit 714. Intermediate server 712 does not have a cached version of the requested page and sends/forwards the request message to Web application server 716, which comprises fragment-supporting cache management unit 718.

From the incoming request message, which includes the "Fragment: supports-fragments" header, Web application server 716 can determine that a downstream computing device has a fragment-supporting cache management unit that is able to act as a page assembler. Hence, instead of returning the entire assembled page in the response, Web application server 716 returns a response with a parent fragment containing a FRAGMENTLINK child fragment. Intermediate server 712 does not support fragments, so it merely forwards the response.

Fragment-supporting cache management unit 710 recognizes that it is the fragment-supporting cache that is closest to the end-user or client; the original request did not contain a "Fragment: supports-fragments" header, so fragment-supporting cache management unit 710 determines that it should perform page assembly prior to returning the response. During the page assembly process, fragment-supporting cache management unit 710 requests and receives the child fragment that is linked into the parent fragment; the child fragment and the parent fragment are combined into a single assembled page, and the assembled page is returned to the client device. Intermediate server 704 forwards the response to client device 700, which then presents the assembled page to the end-user. Neither intermediate server 704 nor client device 700 would cache the assembled page because the response would be marked with a "no-cache" directive that would prevent these devices from caching the assembled page. Intermediate server 708 would cache both the parent fragment and the child fragment.

Figure 7B:
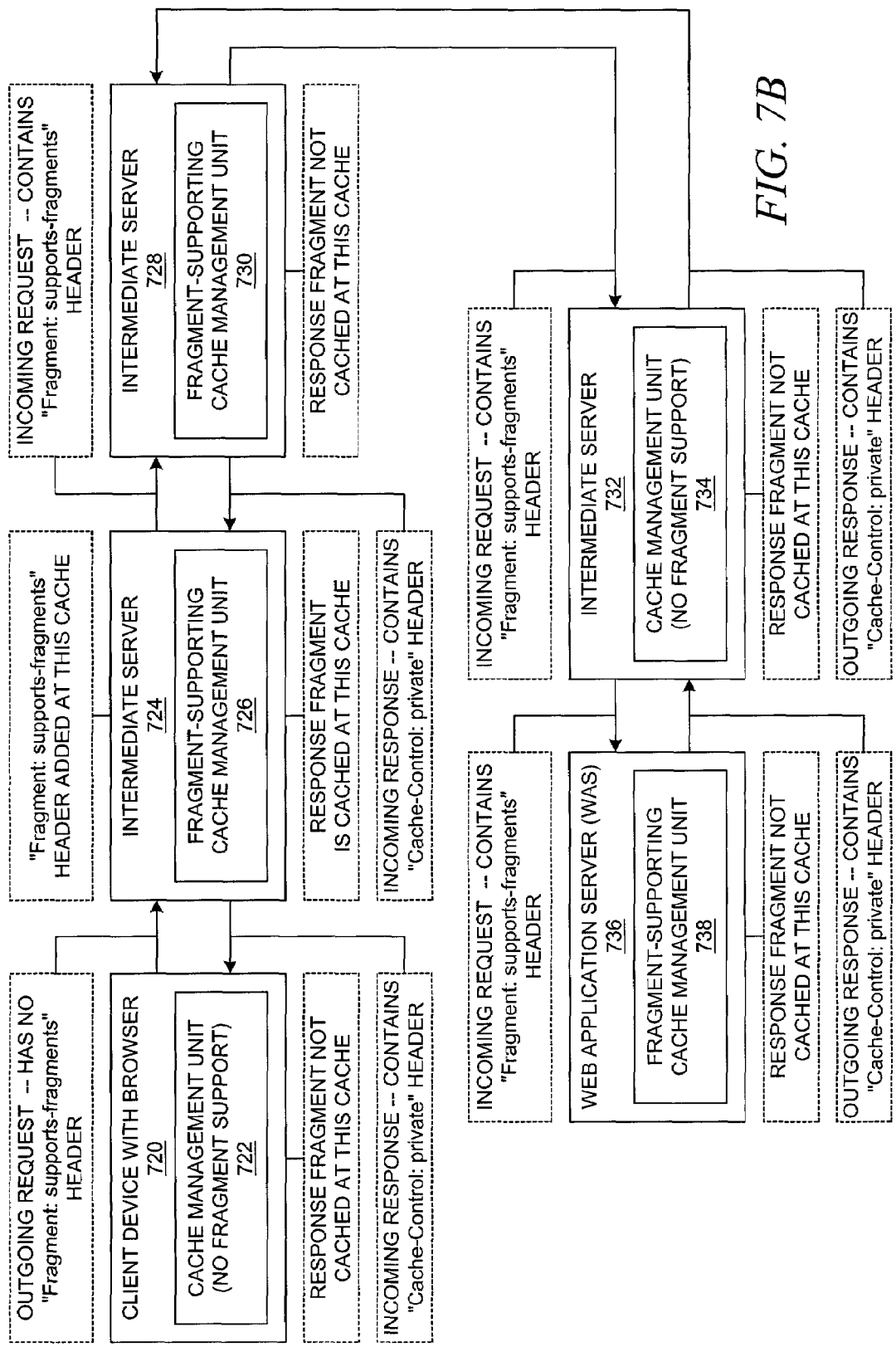
FIG. 7B is a block diagram that depicts some of the dataflow between a Web application server and a client in order to illustrate how a set of devices can be directed to cache fragments in a cache that is closest to an end-user or client device.

With reference now to FIG. 7B, a block diagram depicts some of the dataflow between a Web application server and a client in order to illustrate how a set of devices can be directed to cache fragments in a cache that is closest to an end-user or client device. Client device 720 comprises non-fragment-supporting cache management unit 722, which generates a request for an object and sends the request to intermediate server 724. Unbeknownst to the client device, the requested object is actually a fragment. Intermediate server 724 receives the request; since cache management unit 726 supports fragments but does not have a cached version of the requested fragment, cache management unit 726 adds a "Fragment: supports-fragments" header to the request and forwards the request to the destination server.

Intermediate server 728 receives the request; since cache management unit 730 does not have a cached version of the requested fragment, fragment-supporting cache management unit 730 ensures that a "Fragment: supports-fragments" header is contained in the request message and forwards the request to the destination server. Intermediate server 732 contains cache management unit 734 that does not support fragments and does not have a cached version of the requested object, and it forwards the request.

From the incoming request message, which includes the "Fragment: supports-fragments" header, Web application server 736 can determine that a downstream computing device has a fragment-supporting cache management unit. Hence, Web application server 736 can determine that it is appropriate to return a response containing fragments. However, Web application server 736 marks the response message with a "Cache-Control: private" header that will result in the fragment in the response being cached only by the fragment-supporting cache that is closest to the end-user or client device; cache management unit 738 does not cache the fragment in the response.

Intermediate server 732 does not support fragments. Cache management unit 734 recognizes the "private" directive, so it does not cache the fragment, and intermediate server 732 merely forwards the response. In contrast, cache management unit 730 does support fragments, but it recognizes that the original request was marked with a "Fragment: supports-fragment" header such that a downstream device can cache the fragment even closer to the end-user or client device. Hence, cache management unit 730 interprets the "private" directive as instructing it not to cache the fragment in the response.

Cache management unit 726 also supports fragments, but it recognizes that the original request was not marked with a "Fragment: supports-fragment" header such that no downstream device can cache the fragment closer to the end-user or client device. Hence, cache management unit 726 interprets the "private" directive as instructing it to cache the fragment in the response. Intermediate server 724 then forwards the response to client device 720; cache management unit 722 does not support fragments, so it recognizes the "private" directive as instructing it not to cache the fragment.

Example of Fragment-Supporting Caches Being Used to Support Caching of Role-Specific or Category-Specific Content With reference now to FIGS. 8A-8D, a dataflow diagram depicts some of the processing steps that occur within a client, an intermediate fragment-supporting cache, or a server to illustrate that caching of dynamic role-specific or category-specific content can be achieved using the present invention. Some Web content can be categorized such that it is specific to a group of users based on their association with a particular institution or based on their role within an institution. For example, an enterprise may publish one version of its pricing database for its products to a first company and a second version of its pricing database for its products to a second company. For instance, the second company may get substantial volume discounts for purchasing large quantities of the enterprise's products.

When a first employee of the first company visits the enterprise's Web site, this employee should receive Web pages that show the pricing information for the first company. The pricing information may change relatively frequently, so the pricing information would be more difficult to cache compared with static content. When an employee of the second company visits the enterprise's Web site, this employee should receive Web pages that show the pricing information for the second company.

Using the present invention, the Web pages that were generated for the employees of the different customer companies may be cached such that they are available to other employees of the same company. When a second employee of the first company visits the enterprise's Web site, this employee may receive the Web pages that were cached for the first employee of the same company. In other words, the enterprise's content has been categorized for use by different institutions, i.e. the different customer companies.

Using a second example, a corporation may have a Web site that contains human resource information, but some of the information should be restricted for viewing only by managerial-level employees of the corporation. However, even though the managerial-level information may be dynamic content, there should be no need to cache multiple copies of the managerial-level information for each manager that views the information. Using the present invention, role-specific content can be cached, e.g., managerial versus non-managerial, and the user's role within an organization can be used to assist in the determination of which set of cached content is returned to the user.

These examples can be described in a general manner using a category distinction. The concept of a category of content can be applied to user roles, institutional entities, etc., based on a characteristic that can be applied to a user that is accessing content. FIGS. 8A-8D provide a general example of the manner in which the present invention may be used to cache category-specific content.

Figure 8A:
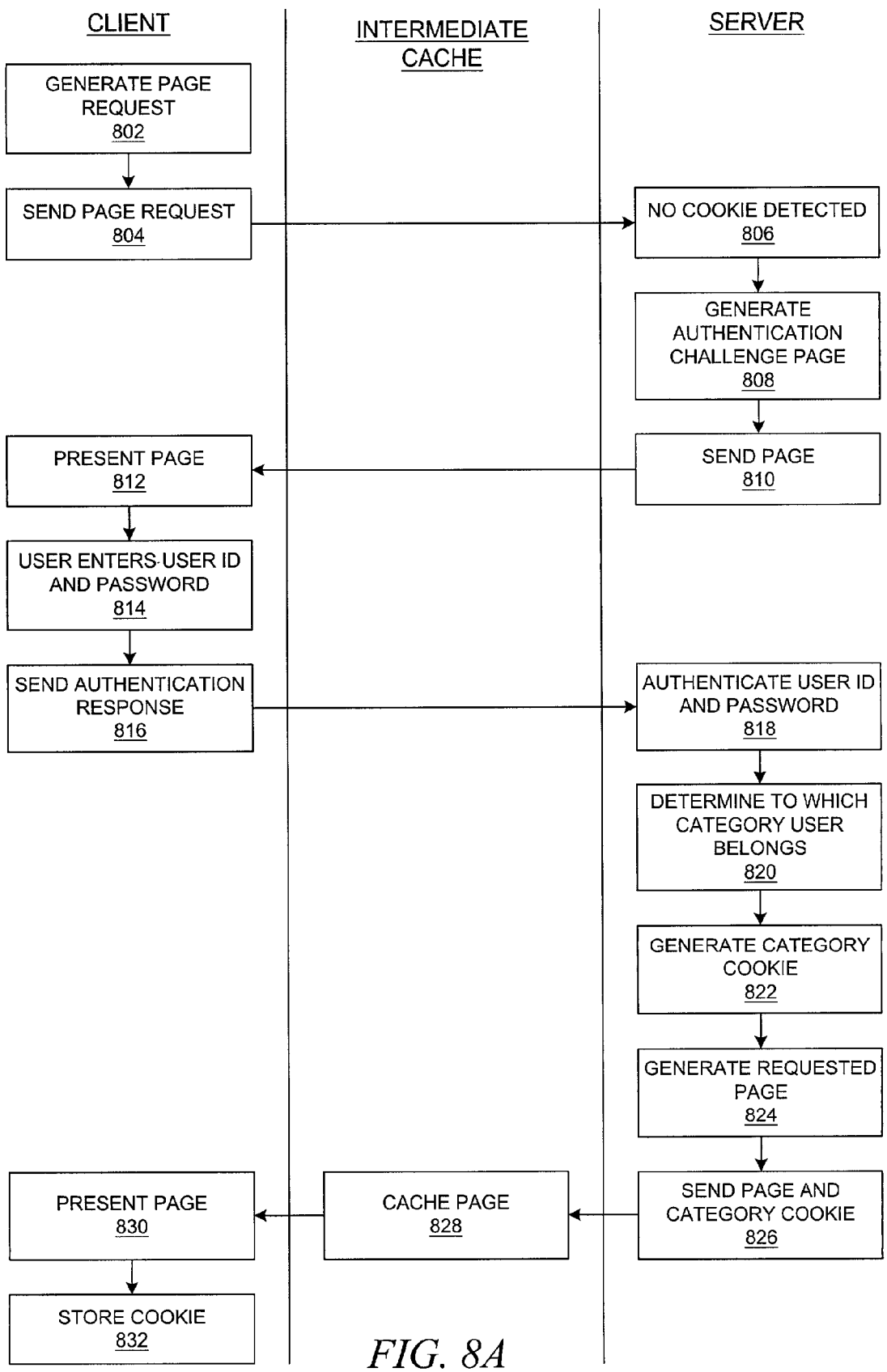
FIGS. 8A-8D are dataflow diagrams that depict some of the processing steps that occur within a client, an intermediate fragment-supporting cache, or a server to illustrate that caching of dynamic role-specific or category-specific content can be achieved using the present invention.

Referring to FIG. 8A, a client application, e.g., a browser, generates a page request (step 802) and sends it to an application server (step 804). An intermediate fragment-supporting cache does not have a copy of the requested page, so it cannot return a cached copy. The application server determines that the requested page is restricted to viewing by a certain category of users, but the application server detects that the request has not been accompanied by a required cookie that identifies the requester as a member of the restricted category of users (step 806). The server generates an authentication challenge page (step 808) and sends it to the client (step 810); the authentication challenge page is marked as not being cacheable, so the intermediate cache does not cache it.

The client receives the authentication challenge page and presents it to the user (step 812), who then provides a user ID and a password (step 814) that are sent back to the server (step 816). The server authenticates the user's information (step 818) and uses the user ID to determine to which user category the identified user belongs (step 820). After determining a user category, such as a managerial role, the server generates a category cookie that contains information that allows for the identification of the determined user category (step 822). The originally requested page is also generated (step 824), and the page and the category cookie are sent to the client (step 826).

Until this point in time, the intermediate cache has not cached any content. However, the page that is currently being returned is marked as being cacheable according to fragment-supporting caching rules, so the intermediate cache stores the page (step 828) using an identifier for the page, the category cookie that accompanies the page, and any other appropriate information that the intermediate cache is directed to use in the fragment caching rules that accompany the response message to the client. After the client receives the requested page, it is presented to the user (step 830), and the accompanying category cookie is stored by the client application in its cookie cache (step 832).

Figure 8B:
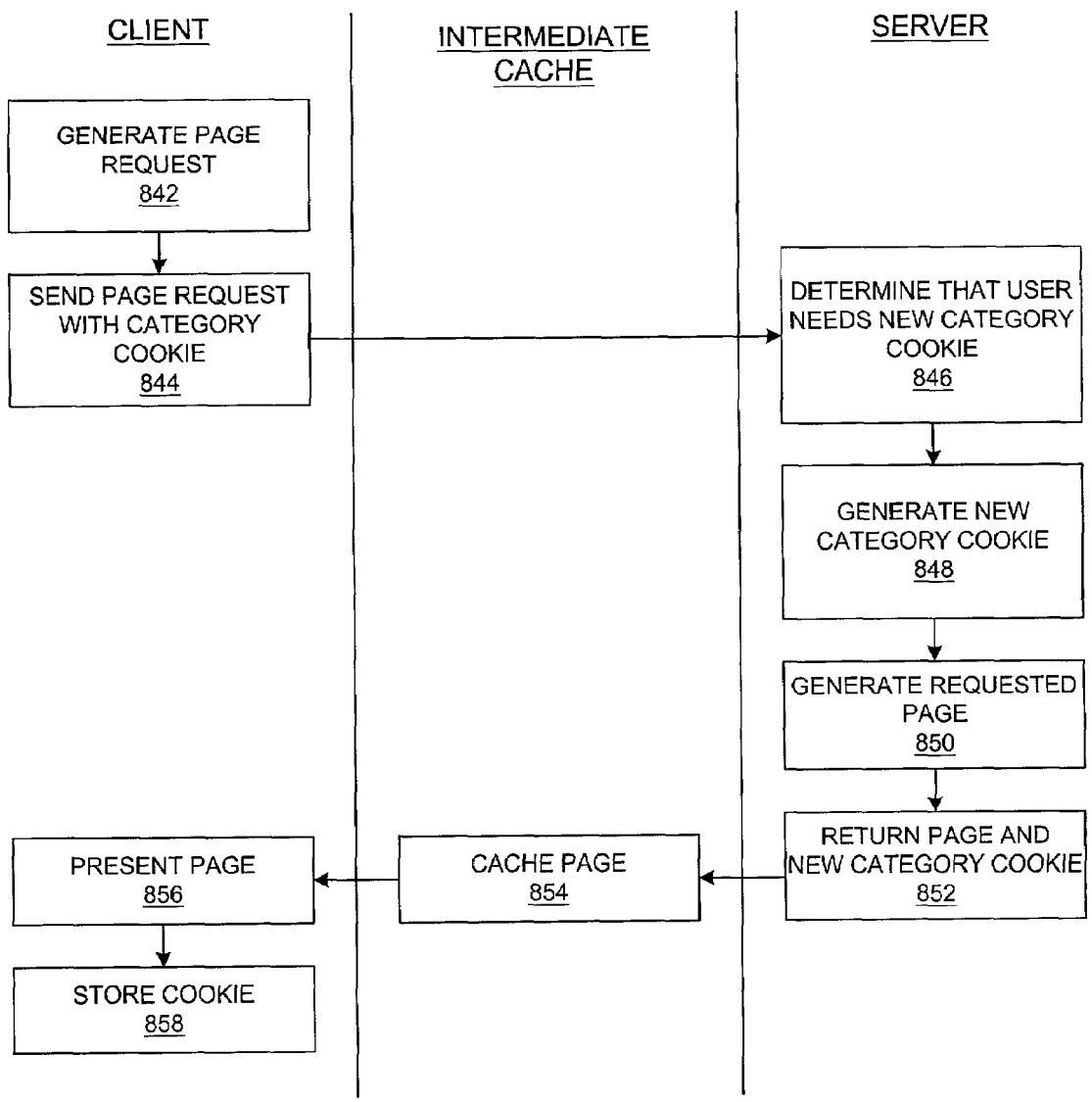

Referring to FIG. 8B, an example is shown for updating a previously issued category cookie. A client application generates a page request (step 842) that is similar to the page request shown in FIG. 8A, e.g., from the same domain. However, the user has performed some action that causes the user's category to be changed. For example, the user may have been viewing pages in relation to the user's role as a manager of a certain group of employees, and the user may then decide to view pages that are related to the user's role as a financial officer. Since the user has been authenticated previously, the server should not perform another authentication process. However, the server should issue a new category cookie for the user.

The page request is sent to the server with the accompanying category cookie (step 844). The intermediate cache does not have the requested page, so it has a cache miss. The server determines that the client is requesting an operation that requires a new category cookie value (step 846) and issues a new category cookie (step 848). The requested page is also generated (step 850), and the requested page and newly issued category cookie are returned (step 852). The intermediate cache then stores the page in accordance with the new cookie value (step 854). The client receives and presents the requested page (step 856), and the new cookie value is stored in the cookie cache at the client (step 858). In this manner, the intermediate cache is updated when the category cookie is updated.

Figure 8C:
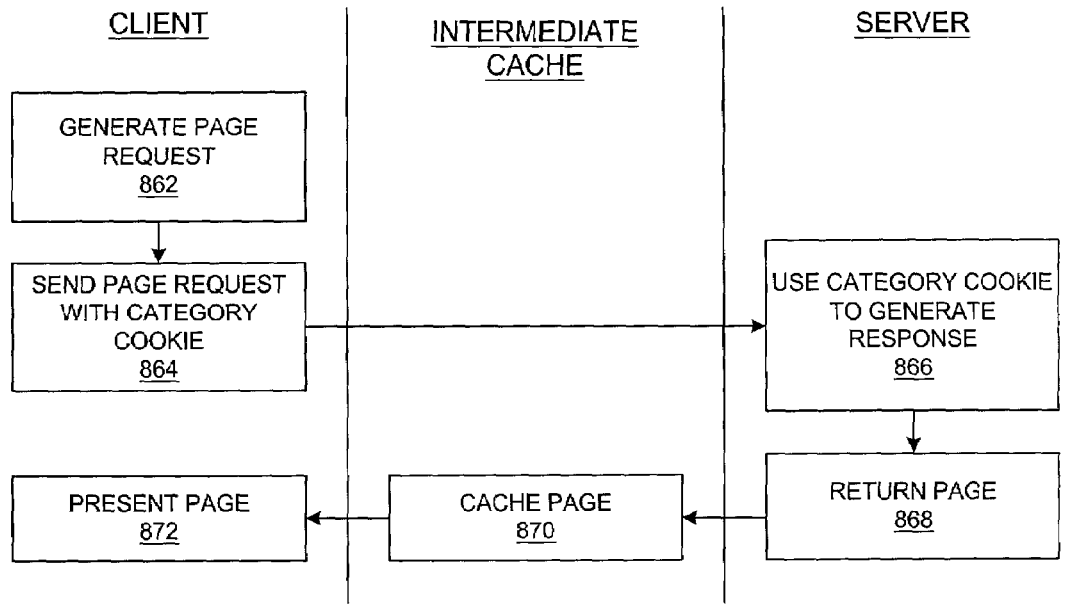

Referring to FIG. 8C, an example is shown of the manner in which continued use of the same category cookie may still result in a cache miss. A client application generates a page request (step 862) that is sent to the server with the accompanying category cookie (step 864). The intermediate cache does not have the requested page, so it has a cache miss. The server uses the value in the category cookie to dynamically determine a certain type of content and to generate an appropriate page (step 866), and the generated page and the unaltered category cookie are returned (step 868). The intermediate cache stores the page (step 870) and forwards it to the client. The client receives and presents the requested page (step 872); since the category cookie has not changed, the client is not shown as overwriting the category cookie in the cookie cache.

In accordance with the present invention, in steps 828, 854, and 870, the intermediate cache has stored a copy of the page from the response message in accordance with the fragment-caching rule that was placed in the response message by the server. The present invention allows a cookie to be used in a cache ID operation to distinguish two different versions of a similar page that might otherwise be identified as identical if only the URI associated with the page were used for caching purposes. More importantly, a page can be cached in association with a category cookie such that a category cookie can be subsequently used in the cache lookup process, thereby allowing cache hits to be established based on similarities in the asserted category cookie, as shown in FIG. 8D.

Figure 8D:
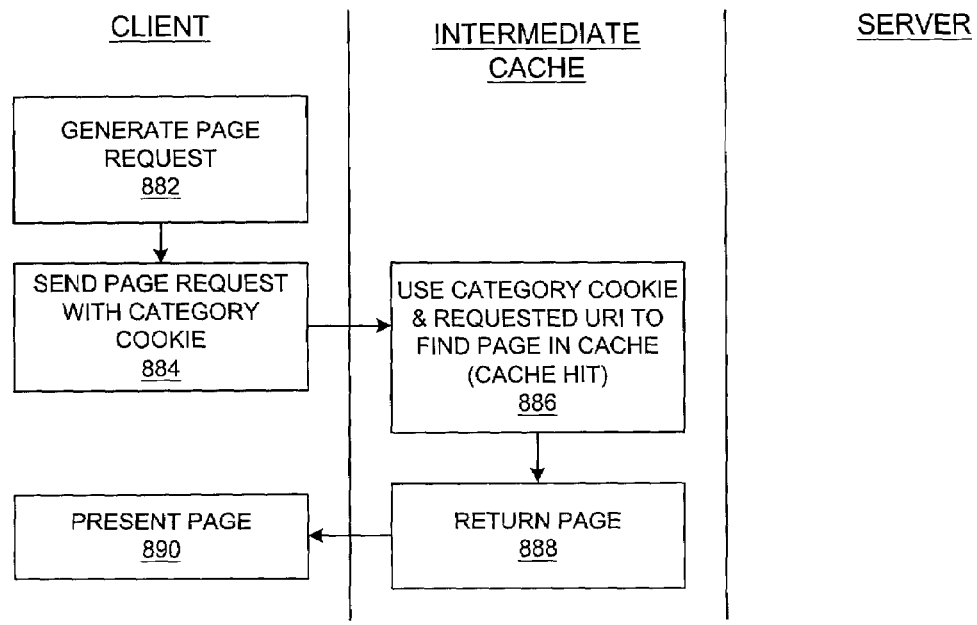

Referring to FIG. 8D, an example is shown for the manner in which use of a same category cookie by two different users may still result in a cache hit across accesses of a single page by different users. In this example, a different user is accessing the same page as the first user in the previous example shown in FIG. 8C. However, the second user belongs to the same category of users as the first user. In other words, the two users can be described as belonging to the same category of user or as being assigned the same role. For example, these two users may be managers that are viewing a company memo for managers that contains dynamic content that is particular tailored to the managers in a division to which the two users belong. Rather than generate and cache the memo for each manager, the memo was previously associated with the managers' role. After the first manager has accessed the memo, it would have been cached, and subsequent attempts to retrieve the memo by other managers in the same category would result in cache hits. Subsequent attempts to access the memo by other managers in a different category would result in a cache miss because the subsequent managers would have different category cookie, even though the two different versions of the memo may be associated with the same URI.

A client application generates a page request (step 882) that is sent to the server with the accompanying category cookie that belongs to the second user (step 884). In this case, the intermediate cache does have a copy of the requested page as identified by the URI path within the request and the associated category cookie, so it has a cache hit (step 886). The intermediate cache is able to return the requested page immediately without forwarding the request to the server (step 888), and the client receives and presents the requested page to the second user (step 890).

In this manner, the intermediate cache may actually store multiple versions of the same fragment, and the appropriate version of the fragment is returned to a user based on the user's asserted category cookie, i.e. only the category cookie determines the selection between different versions of an otherwise similar fragment. Further examples of the use of cookies to distinguish fragments are provided further below, particularly with respect to categories of shopper groups.

Efficiency Enhancement for Processing Multiple Fragments in a Single Message

Figure 9A:
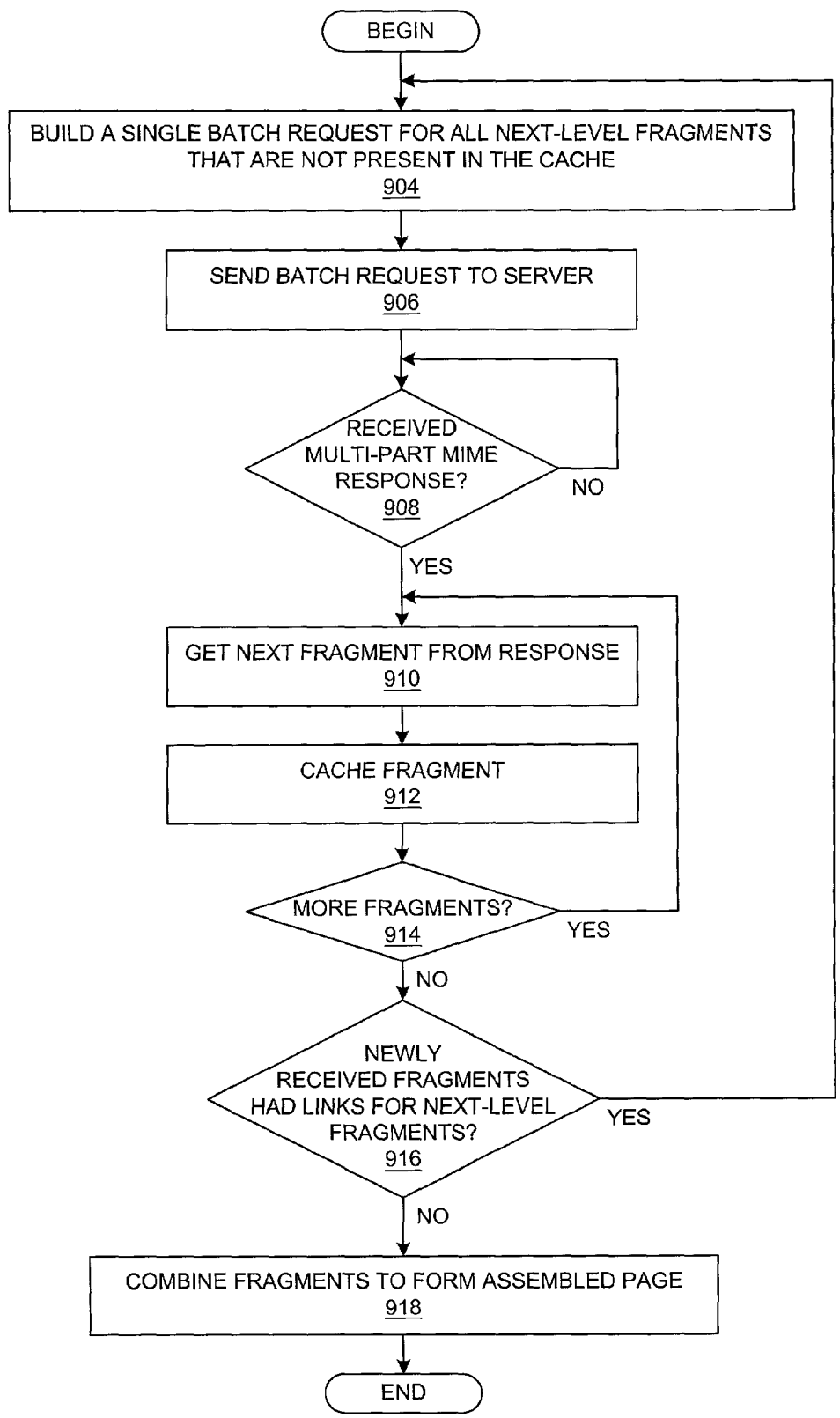
FIG. 9A is a flowchart that depicts a process by which multiple fragments can be specified in a single request message and subsequently processed.

With reference now to FIG. 9A, a flowchart depicts a process by which multiple fragments can be specified in a single request message and subsequently processed. The process shown in FIG. 9A could be used in conjunction with the process shown FIG. 6N or any other process in which multiple fragments need to be obtained, particularly prior to combining those fragments into a single fragment.

After obtaining a fragment from a response message or from the cache, the process begins by checking the "contains-fragments" directive to see whether it is a leaf fragment or contains other fragments. If it contains other fragments, it is parsed to find these contained fragments.

After gathering the source identifiers for all of the next-level fragments, a single batch request is generated (step 904); the batch request may include a batch server-side program to be used in obtaining the fragments, i.e. a servlet. The batch request contains all of the source identifiers, e.g., URIs, for the next-level fragments. It is presumed that the local cache has been checked for a cache hit on any of these next-level fragments; if there was a cache hit for a next-level fragment, then it is not included in the batch request.

The batch request message is then sent to a server (step 906), and the cache management unit waits to receive a multi-part MIME (Multipurpose Internet Mail Extension) response (step 908). Preferably, a thread is spawned for the request, and the thread sleeps as it waits for a response while the computing device performs other operations.

After the response is received, the cache management unit steps through each fragment in the response. A next fragment is retrieved from the multi-part response message (step 910) and then cached (step 912). A determination is made as to whether or not there are any more fragments in the multi-part response message to be processed (step 914), and if so, then the process branches back to step 910 to process another fragment. Otherwise, the newly received fragments can be parsed or checked to determine whether or not these fragments include links to next-level fragments (step 916), and if so, then the process branches back to step 902 to request more fragments in a batch request, if necessary. Otherwise, the newly received fragments are combined in a page assembly operations (step 918), and the process is complete.

Figure 9B:
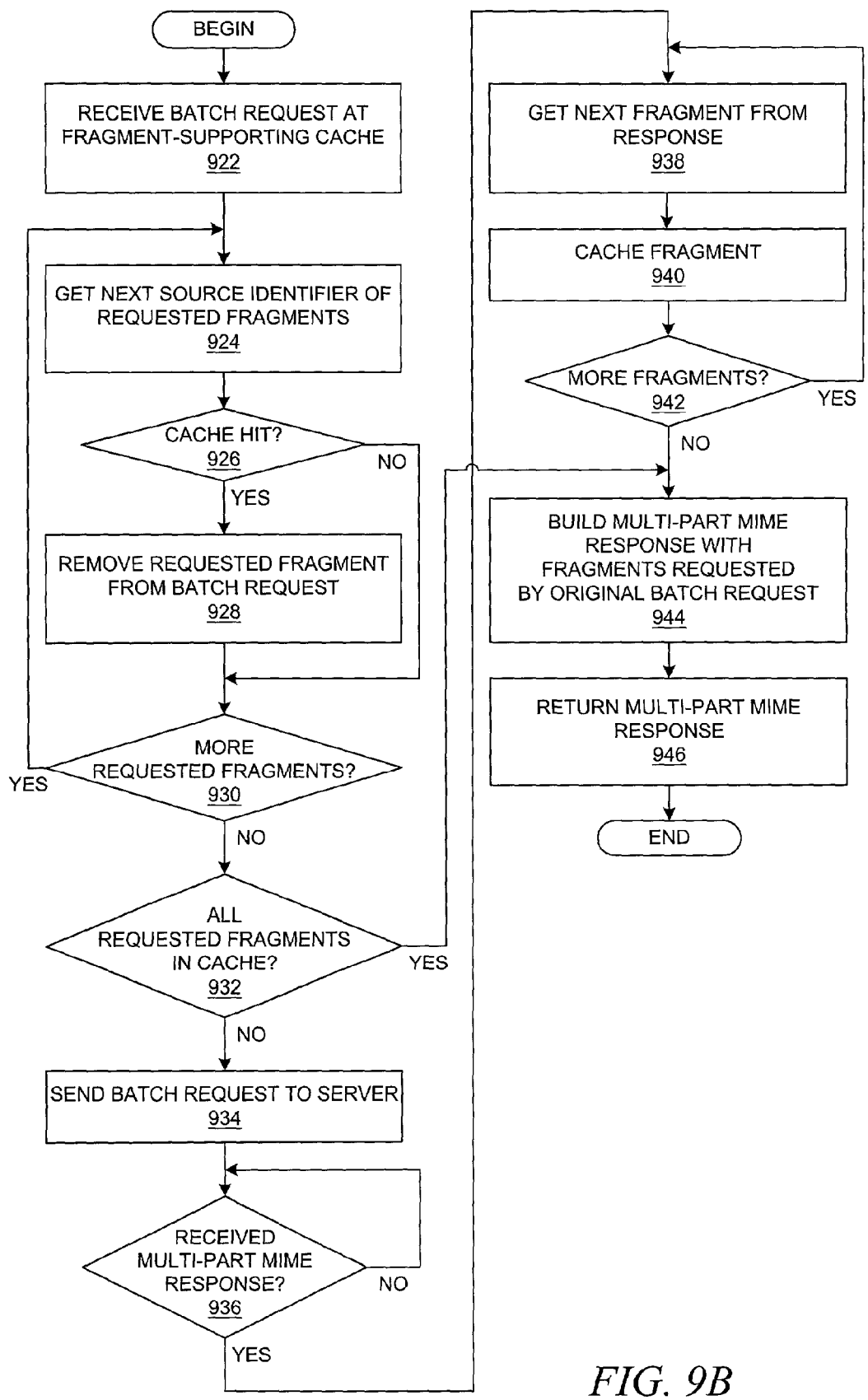
FIG. 9B is a flowchart depicts a process by which a single request message can be received at an intermediate cache management unit and subsequently processed.

With reference now to FIG. 9B, a flowchart depicts a process by which a single request message can be received at an intermediate cache management unit and subsequently processed. The process shown in FIG. 9B could be used in conjunction with the process shown FIG. 6V or any other process in which a request message is processed at an intermediate cache.

The process begins when a batch request is received at an intermediate fragment-supporting cache (step 922). The set of source identifiers within the batch request are then processed in a loop. The next source identifier for one of the requested fragments is retrieved from the request message (step 924), and a determination is made as to whether or not there is a cache hit in the local cache (step 926). If there is a cache hit, then the next step can be skipped; if there is a cache hit, then the source identifier can be removed from the batch request message (step 928). A determination is made as to whether or not there are any more source identifiers in the batch request message to be processed (step 930), and if so, then the process branches back to step 924 to process another source identifier.

A determination is made as to whether or not all of the requested fragments have been found in the local cache (step 932). If so, then there is no need to forward the batch request, and the process branches to prepare a response message. If there was at least one cache miss, then the modified batch request with the removed source identifier (or identifiers) is forwarded to the server (step 934). Alternatively, if there is a single remaining source identifier, then the batch request could be changed to an ordinary request message. The cache management unit waits to receive a multi-part MIME response (step 936); preferably, a thread is spawned for the request, and the thread sleeps as it waits for a response while the computing device performs other operations.

After the response is received, the cache management unit steps through each fragment in the response. A next fragment is retrieved from the multi-part response message (step 938) and then cached (step 940), assuming that it is appropriate to cache the fragment within the local cache. A determination is made as to whether or not there are any more fragments in the multi-part response message to be processed (step 942), and if so, then the process branches back to step 938 to process another fragment. It is assumed that the newly received fragments are not parsed or checked to determine whether or not these fragments include links to next-level fragments as this process can be assumed to be performed at the cache management unit that generated the original batch request; alternatively, this process could be performed at the current cache management unit in a manner similar to that described in FIG. 9A. In any case, a multi-part MIME response is generated with the fragments that correspond to the source identifiers that were received in the original batch request (step 944), and the multi-part MIME response is returned (step 946), thereby completing the process.

Figure 9C:
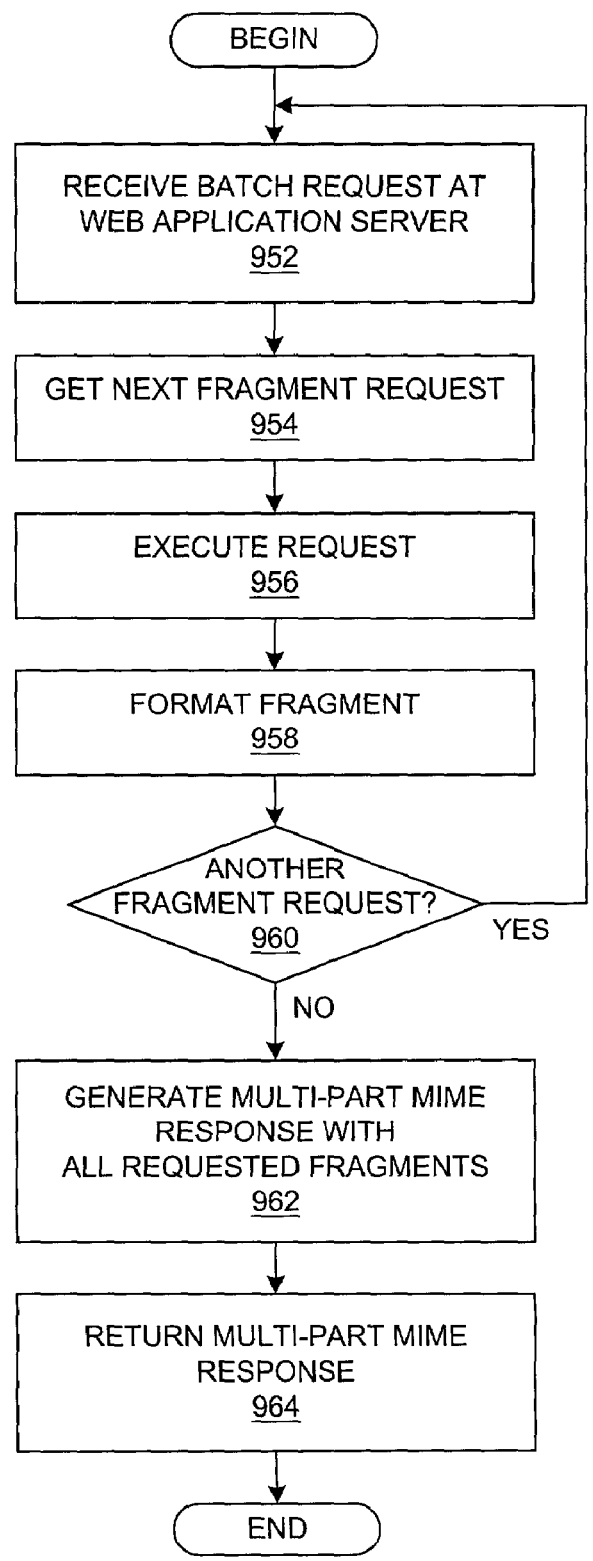
FIG. 9C is a flowchart that depicts a process at a Web application server for processing a batch request message for multiple fragments.

With reference now to FIG. 9C, a flowchart depicts a process at a Web application server for processing a batch request message for multiple fragments. The process shown in FIG. 9C could be performed after a batch request message has flowed through multiple computing devices with fragment-supporting cache management units which could not fulfill the fragment requests, i.e. multiple devices may have had cache misses.

The process begins by receiving a batch request at a server (step 952); the batch request contains multiple fragment requests, which are then processed in turn. A next fragment request is retrieved from the batch request message (step 954) and executed (step 956), which presumably includes generating the fragment, after which the fragment may optionally need to be formatted or tagged for transmittal (step 958), although the fragment may have been previously cached at the server. A determination is made as to whether or not there is another fragment request in the batch request message (step 960), and if so, then the process branches in order to process another fragment request. Otherwise, a multi-part MIME response message with all requested fragments is generated (step 962), and the response message is returned, thereby completing the process.

Examples of Cache Size Reduction

With reference now to FIGS. 10A-10D, a set of examples are provided to show the advantageous cache size reduction that can be achieved with the present invention. One criterion for choosing what constitutes a fragment in a particular application is how often a piece of content is shared across different pages. If a piece of content is heavily shared, then making it a fragment allows one to heavily factor the size of the cache because one can store the fragment once instead of repeating it in many pages. Thus, fragments provide a form of compression across many pages to reduce cache size. The advantage of this compression can be viewed as a cost reduction, e.g., reducing cache size for a fixed hit ratio, a performance improvement, e.g., increasing the hit ratio of a fixed size cache, or some combination of these. FIGS. 10A-10D show various scenarios of usage for the present invention and the reductions in cache size that can be achieved compared to equivalent scenarios in which the present invention is not used.

Figure 10A:
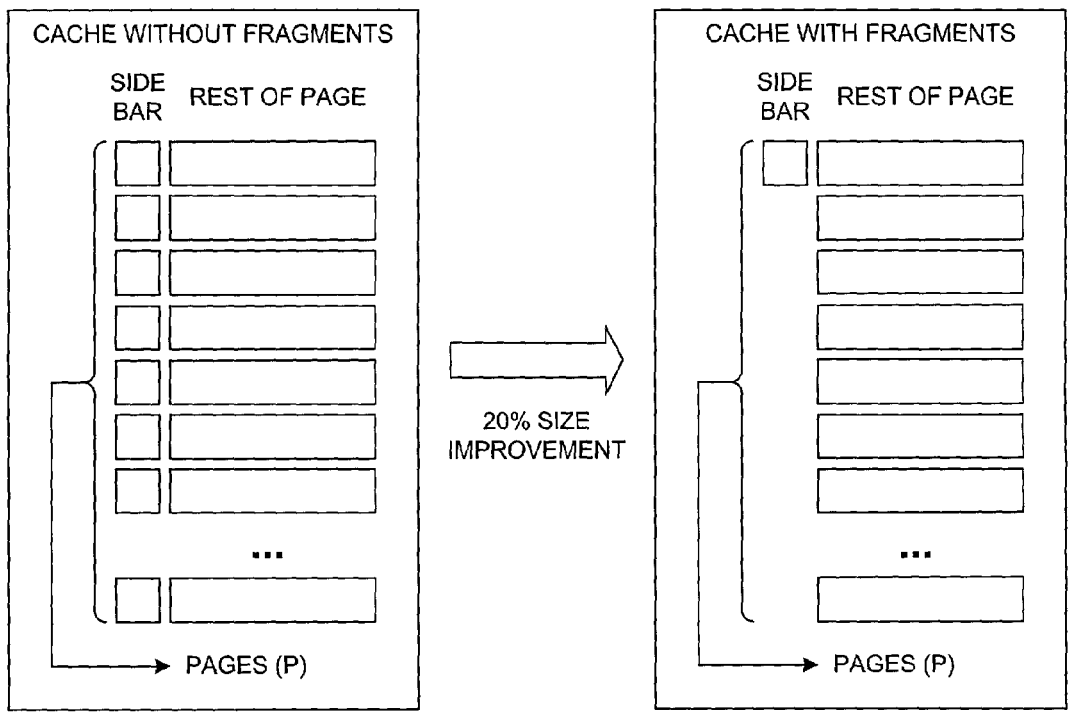
FIGS. 10A-10D are a set of examples that show the advantageous cache size reduction that can be achieved with the present invention.

Referring to FIG. 10A, a shared sidebar scenario is shown. Each page comprises sidebar portions and other page portions; without the present invention, each page is stored as a complete page with all subordinate objects within a cache that does not support fragments. With the present invention, each page has been composed to include a sidebar fragment and a remainder page fragment, all of which are stored in a cache that supports fragments. As is apparent, with the present invention, the sidebar fragment is only stored one time. In other words, all pages on a particular site share the same sidebar fragment. If the sidebar is 20% of every page, then factoring it out of all pages can reduce the size of the cache by about 20% because the sidebar is not replicated.

Figure 10B:
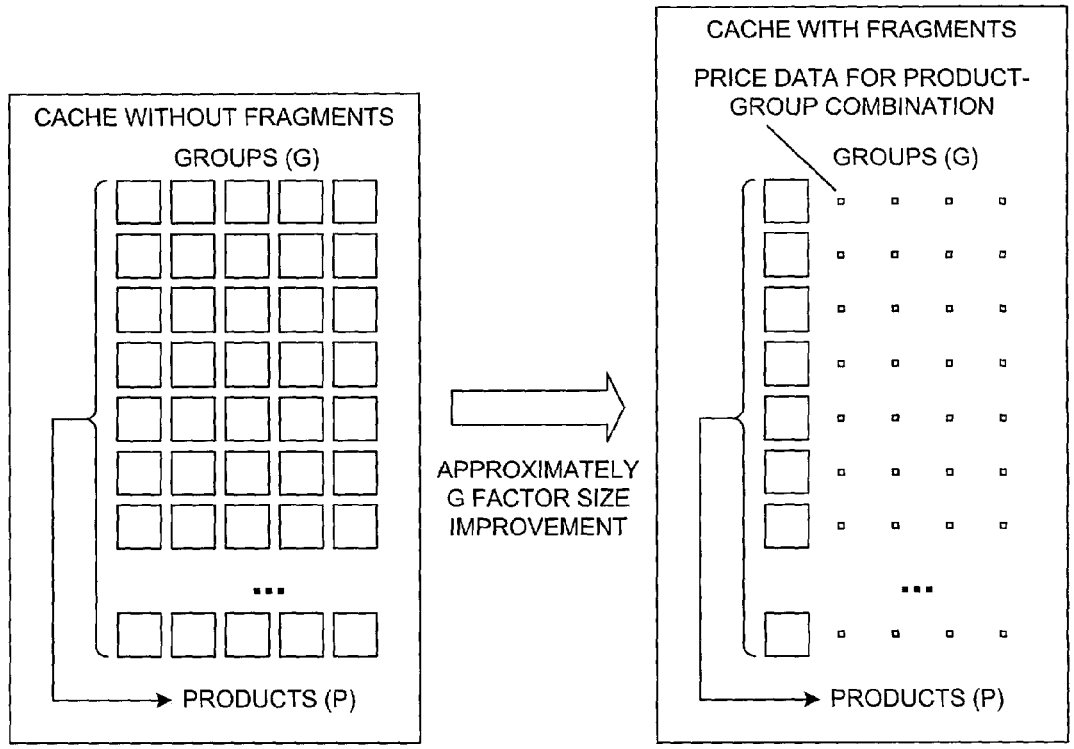

Referring to FIG. 10B, a shopper group scenario is shown. A product description page has a different price for each shopper group, but the rest of the product description is independent of shopper group. Without the present invention, there is a product page for each combination of product and shopper group, each of these product pages could potentially be cached in a cache that does not support fragments. In contrast, a cache that supports fragments in accordance with the present invention need only store the price data fragment for the product-group combination and the product description fragment and need not store all of the entire page combinations.

The potential storage space savings can be approximated as follows. Each price is 100B (s1) and the rest of the product description is 10 kB (s2). There are 10,000 products (p) and 5 shopper groups (g). If one stores the fully expanded pages, then there are potentially (10,000×5)=50,000 (p*g) total items with a size of about 10 kB each (s2 is approximately equal to s1+s2), which has a total size of about 500,000 kB (p*g*s2). Instead, if one stores the prices in separate fragments from the rest of the product description, then there are 10,000 (p) product fragments in the cache at 10 kB (s2) each, which has a size of 100,000 kB (p*s2), plus 10,000×5=50,000 (p*g) prices at 100B (s1) each, which has a size of 5,000 kB. The total with fragments is the sum of these, or 105,000 kB. This is almost a 5× size reduction in cache size after implementing a cache that supports fragments.

Figure 10C:
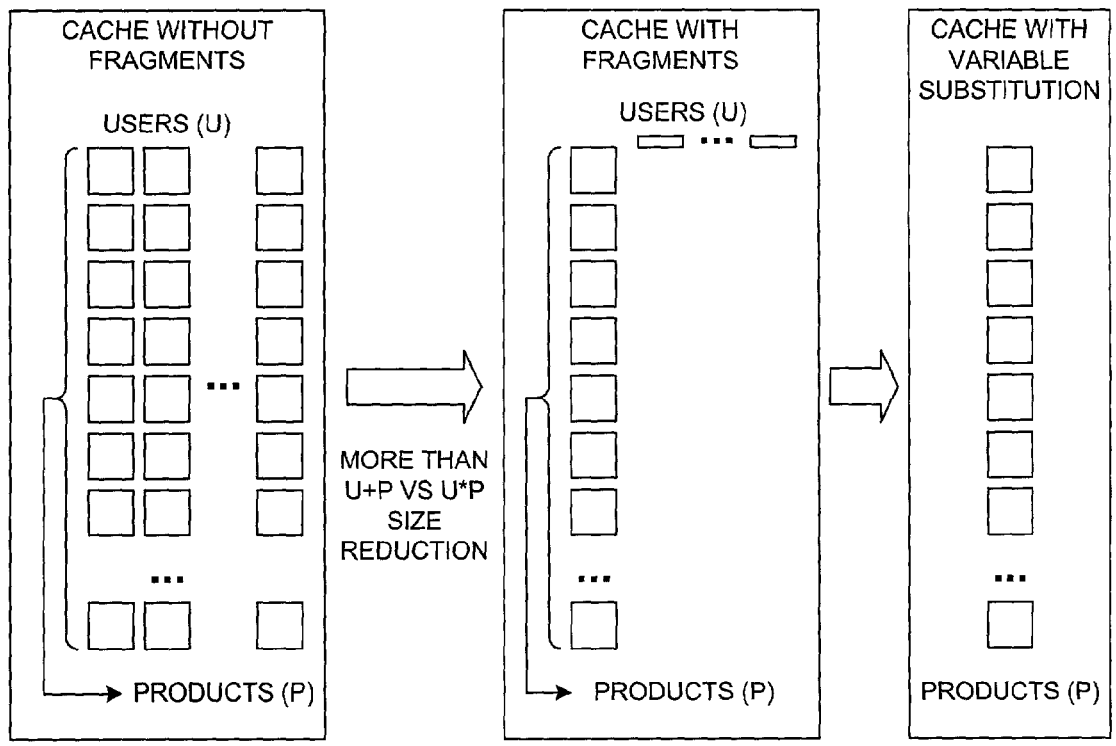

Referring to FIG. 10C, a personalization scenario is shown. A product description page includes a personalization section, and there are 10,000 products (p) and 100,000 users (u). Without the present invention, if one stores the fully expanded pages, then there are potentially 10,000×100,000=1,000,000,000 (u*p) total items in the cache.

In contrast, with a fragment-supporting cache that is implemented in accordance with the present invention, one can store the pages as separate fragments. In that case, there are only 10,000+100,000=110,000 (u+p) total items in the cache, and each item is smaller. This is approximately a 20,000× size reduction.

Continuing with the same example, a FRAGMENTLINK tag whose SRC attribute identifies a cookie, e.g., src="cookie://{cookie name}", or a URI query parameter, e.g., src="parm://{parm name}", can be used to substitute the value of that cookie or query parameter. In this scenario, if the personalization were small enough to be a cookie value, then this variable substitution could be used to eliminate the overhead of requesting a personalization fragment from a Web application server and caching it. For example, a greeting like "Hello, John Smith. Welcome to our store!!!" could be performed with a cookie whose name is "userName" and value is "John Smith" with the following HTML statement:

Hello, {fragmentlink src="cookie://userName"}. Welcome to our store!!!

Figure 10D:
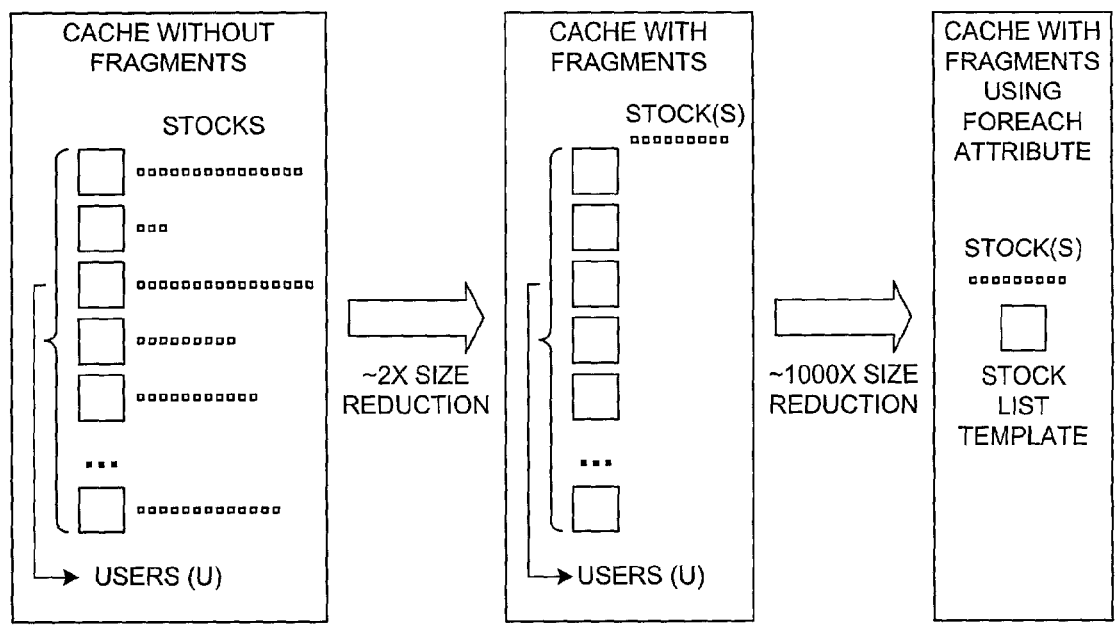

Referring to FIG. 10D, a stock watchlist scenario is shown; stock watchlists are available on many Web portals. A page contains a personalized list of stock quotes. This scenario is similar to the personalization scenario except that the user-specific information is associated with the top-level fragment instead of the included fragment. Each user has a separate list of stocks, but each stock is shared by many user lists. There are 100,000 users (u) and 1,000 stocks (s). Each user description is 1 kB (s1), and each stock quote is 100B (s2). Users average 10 stocks in their list (l). If one stores the fully expanded pages, the cache size is 100,000*1 kB=100,000 kB (u*s1), plus 100,000*10* 100B=100,000 kB (u*l*s2), for a total of 200,000 kB. Instead, if one stores the individual stock quotes as separate fragments, then the cache size is 100,000×1 kB=100,000 kB (u*s1) for the user-specific fragments, plus 1,000*100B=10 kB (s*s2) for the stock quote fragments, for a total of 100,100 KB. This is roughly a 2× size reduction because stock quotes are not replicated.

The stock watchlist scenario can be improved further by using the FOREACH feature of fragments. In this case, all user-specific fragments are eliminated. This is also illustrated in FIG. 10D. The FOREACH feature specifies a cookie whose value is a space-delimited list of name-value pairs separated by "=". For each name-value pair, a fragment is generated with the name-value pair added as a URI query parameter. In this scenario, a cookie named "stocks" would have a list of stock symbol parameters as a value, e.g., "symbol=IBM symbol=CSCO symbol=DELL". This would generate three fragments, one for each stock symbol in the cookie. The size of the cache would be 1 kB (s1) for the single non-user-specific template fragment, plus 100 kB (s*s2) for the stock quote fragments, for a total of 101 kB. This is roughly a 1000× size reduction, because the user-specific stock list fragments are replaced by a single stock list fragment.

The present invention also reduces the amount of work that is required to maintain cache contents. A criterion for choosing what constitutes a fragment in a particular application is how often a portion of content changes. When content changes too often for it to be manually published every time, applications typically use a template, e.g., a JSP, that accesses a database to generate the content as well as a mechanism for automatically invalidating the content when the database changes or when a time limit expires. This dynamic content approach takes the human out of the loop and allows frequent updates.

Currently, most caches do not cache requests that have query parameters because that typically indicates dynamic content. However, dynamic content is often a good candidate for caching. Although the content changes at some rate (e.g., a price may change weekly, mutual funds change daily, stocks change every few minutes), there may be a large number of cache hits between changes such that caching still offers significant performance improvements.

When content can change rapidly, it becomes important to reduce the work caused by each change. Separating a page into fragments allows incremental generation of content. When a change happens, only those parts of only those pages directly affected have to be generated again. If a piece of content changes rapidly, then it could be made a separate fragment.

Referring again to the sidebar scenario in FIG. 10A, the sidebar contains content that changes every few minutes, e.g., news headlines. If the fully expanded pages are stored, then all pages would have to be generated again and replaced when the sidebar changes. Instead, if the sidebar is a separate fragment, then only one fragment need be generated and replaced when the sidebar changes.

Referring again to the shopper group scenario in FIG. 10B, the shopper group prices might change every minute based on sales volume within the shopper group. If the fully expanded pages are stored, then all 50,000 pages would have to be generated every minute. This would cause 500,000 kB of cache to be generated and replaced every minute. Instead, if the prices are stored as separate fragments, then 50,000 fragments would still be generated and replaced, but only 5,000 kB of the cache would be generated and replaced. This is a 100× reduction in required bandwidth. If a non-price aspect of a product description changed, only one fragment would have to be generated and replaced instead of five pages. This is a 5× reduction in bandwidth.

Referring again to the personalization scenario in FIG. 10C, a product might change every few seconds, and a user-specific personalization might change every day. If the expanded pages were cached, then each product change would cause all 100,000 pages for that product to be generated and replaced, and each personalization change would cause all 10,000 pages for that user to be generated and replaced. Instead, if the product description and the personalization were stored in separate fragments, then each product change would cause only one fragment to be generated and replaced (a 100,000× improvement), and each personalization change would cause only one fragment to be generated and replaced (a 10,000× improvement).

Referring again to the stock watchlist scenario in FIG. 10D, the stock prices might change every 20 seconds. If the expanded pages are stored in the cache, all 100,000 user pages (100,000 kB) must be generated every 20 seconds. Instead, if the stocks are stored as separate fragments, then only the 1,000 stock fragments (100 kB) must be generated and replaced every 20 seconds. This is more than a 1,000× improvement in bandwidth. If a single user stock watchlist is modified, e.g., the user adds or removes a stock in the watchlist), then in either case only one fragment would have to be generated and replaced.

Examples for Generating and Using Fragment Cache Identifiers

As described above, caching information is associated with each fragment that instructs caches how to cache that fragment. For static content, caching information is associated with each fragment. Dynamic content is generated by a template or program (JSP, CGI, etc.), and caching information would be associated with this template. This could be constant information, so that all fragments generated by the template would have the same values. Alternatively, the template could have code that determines the caching information, so that it can be different for each generated fragment based on some algorithm. In either case, a specific fragment has constant values.

A fragment can be defined as a portion of content that has been delimited for combination with another portion of content. A standardized fragment naming technique is used when implementing the present invention; the technique generates cache IDs in accordance with a technique that was described more formally above. This section describes the use of cache IDs through a series of examples further below, although a brief recap of the formation and determination of cache IDs is first provided.

A cache stores the fragment using a cache ID in some manner. Enough information should be included in the cache ID to make it unique among all applications using the cache. For example, a product ID alone might collide with another store's product ID or with something else entirely. Since the URI path for a fragment typically has to address this same name scoping problem at least in part, it is convenient to include the URI path as part of the cache ID for a fragment.

The information content of a cache ID determines how widely or narrowly the fragment is shared, as shown in the following examples.

(A) If a user ID is included in a cache ID, then the fragment is used only for that user.

(B) If a shopper group ID is included in a cache ID, then the fragment is shared across all members of that shopper group.

(C) If no user ID or shopper group ID is included in a cache ID, then the fragment is shared across all users.

A Web application developer can specify the information content of a cache ID by a rule in the fragment's HTTP FRAGMENT header with a CACHEID directive that states what is included in the fragment's cache ID. A rule allows any URI query parameter or cookie to be appended to the URI path, or allows the full URI (including query parameters). The absence of a rule means do not cache. When multiple rules are used, the rules are tried in order of appearance. The first rule that works determines the cache ID. If no rule works, then the fragment is not cached. When a query parameter or cookie is included in the cache ID, it can be either required or optional, as follows.

(A) A required query parameter that is not present in the parent's request causes the rule to fail.

(B) A required cookie that is not present in the parent's request or in the result causes the rule to fail.

(C) An optional query parameter or cookie that is not present is not included in the cache ID.

A cache ID is case-sensitive except for those parts that some standard has declared case-insensitive. The HTTP specification states that a URI's protocol and host name are case-insensitive while the rest of the URI is case-sensitive including query parameter names. According to the specification "HTTP State Management Mechanism", RFC 2109, Internet Engineering Task Force, February 1997, cookie names are case-insensitive. A cache implementation can easily enforce this by transforming these case insensitive parts to a uniform case. The fragment caching technique of the present invention preferably makes query parameter values and cookie values case-sensitive.

With reference now to FIGS. 11A-11H, a series of diagrams are used to illustrate the manner in which the technique of the present invention constructs and uses unique cache identifiers for storing and processing fragments.

Figure 11A:
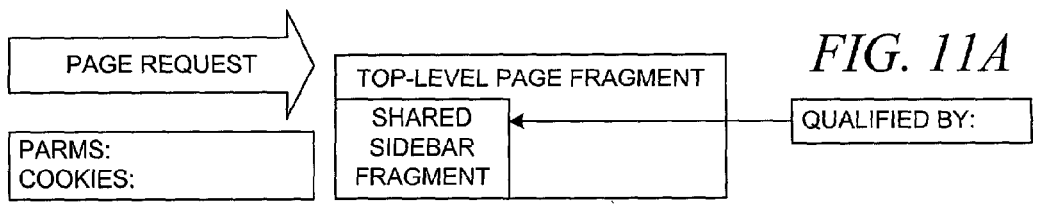
FIGS. 11A-11H are a series of diagrams that illustrate the manner in which the technique of the present invention constructs and uses unique cache identifiers for storing and processing fragments.

Referring to FIG. 11A, all parent fragments at a site contain the same sidebar child fragment. The parent fragment is not specified in this scenario except that all parents contain the same sidebar fragment, so only the child fragment is at issue. The child fragment is logically qualified by its URI. Since it is static content, its cache ID is the full URI. The cache ID rule would be:

Fragment: cacheid="URI"

In other words, the cache ID is the full URI including all query parameters. An example of the cache ID would be:

http://www.acmeStore.com/sidebar.html

Figure 11B:

Referring to FIG. 11B, a product description page contains no embedded or child fragments, i.e. the page is the only fragment. It is logically qualified by the productID. The page URI has a productID query parameter. The page request has an encrypted userID cookie that is created by the Web application server during logon. The userID cookie allows user-specific state (shopping cart, user profile, etc.) to be associated with the user. The userID is used as a cookie rather than a query parameter because it may be used with almost every request, and it would be tedious for the Web application developer to put it in every link. The single cache ID rule for the product page could use the full URI as the cache ID, which includes the productID query parameter, so that it can be cached with the correct qualifications. For this single fragment page, the cache ID can be its URI. The cache ID rule would be:

Fragment: cacheid="URI"

In other words, the cache ID is the full URI including all query parameters. An example of the cache ID would be:

http://www.acmeStore.com/productDesc.jsp?productID=A T13394

Another way to specify the cache ID for this top-level fragment is the product ID used by the merchant, e.g., AT13394, which is a URI query parameter, plus the constant URI path to ensure uniqueness, e.g., http://www.acmeStore.com/productDesc. In this case, the cache ID rule would be:

Fragment: cacheid="(productId)"

In other words, the cache ID is the following parts concatenated together:

(A) the URI path; and (B) the name and value of the productID query parameter.

The lack of square brackets in the rule indicates that the productID parameter should exist. Otherwise, the rule fails, and the fragment will not be cached. An example of the cache ID would be:

http://www.acmeStore.com/productDesc.jsp_productID=A T13394

It should be noted again that the Web application developer specifies only the information content of a cache ID, not the exact format. The cache implementations can choose their own way to encode the specified information content in the cache ID. The above example uses simple concatenation with an underscore character ("_") as a separator delimiter. The Web application developer does not need to know this encoding.

Figure 11C:
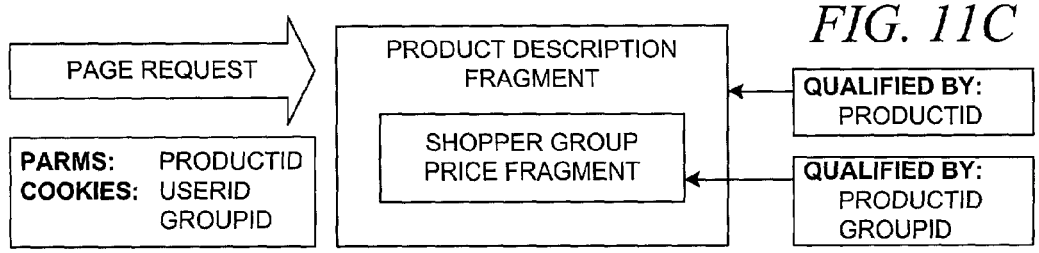

Referring to FIG. 11C, an extension of the product description scenario is provided. The price is now determined by which shopper group in which the user belongs, but the rest of the product description is independent of shopper group. A parent product description fragment contains a child price fragment. The parent is logically qualified by the productID. The child is logically qualified by the productID and the groupID. The page URI has a productID query parameter. The page request has encrypted userID and groupID cookies. The groupID cookie is created by the Web application during logon based on the user profile. The groupID is made a cookie rather than a query parameter because it may be used with almost every request, and it would be tedious for the Web application developer to put it in every link.

The price should be in a separate child fragment included by the parent. The single cache ID rule for the parent fragment would be the same as in the product display scenario. The single cache ID rule for the child fragment would use the URI path along with the productID query parameter and groupID cookie, so that it can be cached with the correct qualifications. It should be noted that the cache ID does not include user ID because then the fragment could only be used by a single user instead of all users belonging to the same shopper group, thereby resulting in a much larger cache and more work to keep the cache updated. The cache ID rule would be:

Fragment: cacheid="(productID, [groupID])"

In other words, the cache ID is the following parts concatenated together:

(A) the URI path;

(B) the name and value of the productID query parameter; and (C) the name and value of the groupID cookie if present in the request.

A comma separates the URI query parameters from cookies. The square brackets in the rule indicate that the cookie is optional. If this cookie is not present, the rule can still succeed, and the cache ID will not include the cookie name-value pair. This allows the merchant to have a no-group price as well as a price per group. An example of the cache ID would be:

http://www.acmeStore.com/productDesc.jsp_productID=A T13394_groupID=*@#!

Figure 11D:
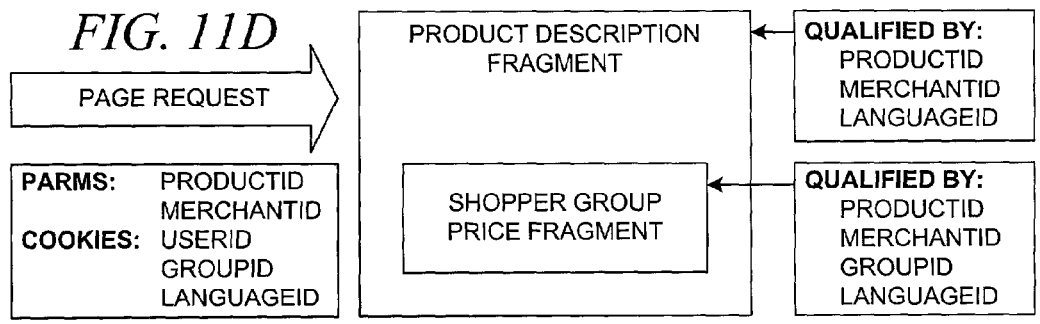

Referring to FIG. 11D, an extension of the shopper group scenario is provided. Support for multiple merchants has been added; for example, an application service provider (ASP) supports multiple merchants in the same Web application server using multiple languages. The parent product description fragment again contains a child price fragment. The parent is logically qualified by productID, merchantID, and languageID. The child is logically qualified by productID, groupID, languageID and merchantID. The page URI has productID and merchantID query parameters. The request has userID, groupID, and languageID cookies. The languageID cookie is created by the Web application during logon based on the user profile. The languageID is made a cookie rather than a query parameter because it is used with every request, and it would be tedious for the Web application developer to put it in every link.

The single cache ID rule for the parent fragment would use the URI path along with the productID and merchantID query parameters, and languageID cookie, so it can be cached with the correct qualifications. The parent cache ID rule would be:

Fragment: cacheid="(productID merchantID, [languageID])"

In other words, the cache ID is the following parts concatenated together:

(A) the URI path;

(B) the name and value of the productID query parameter;

(C) the name and value of the merchantID query parameter; and (D) the name and value of the languageID cookie if present in the request.

An example of the parent cache ID would be:
    http://www.acmeMall.com/
productDesc.jsp_productID=AT
13394_merchantID=MyStore_languageID=eng The single cache ID rule for the child fragment would use the URI path along with productID and merchantID query parameters, and groupID and optional languageID cookies, so it can be cached with the correct qualifications. The cache ID rule would be:
    Fragment: cacheid="(productID merchantID,[groupID] [languageID])"

In other words, the cache ID is the following parts concatenated together:
    (A) the URI path;
    (B) the name and value of the productID query parameter;
    (C) the name and value of the merchantID query parameter;
    (D) the name and value of the groupID cookie if it is present in the request; and
    (E) the name and value of the languageID cookie if it is present in the request.

Figure 11E:
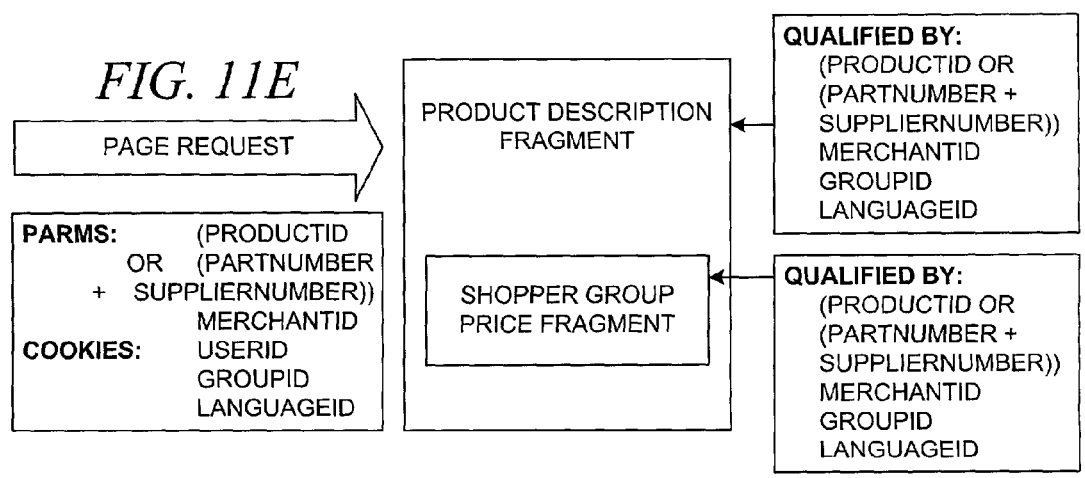

An example of the cache ID would be:
    http://www.acmeMall.com/productDesc.jsp_productID=AT13394_merchantID=MyStore_groupID=*@#!_languageID=eng Referring to FIG. 11E, an extension to the ASP and multiple languages scenario is provided. Support has been added for multiple ways to identify products. The parent product description fragment contains a child price fragment. The parent is logically qualified by product (there are two ways to specify this), languageID, and merchantID. The child is logically qualified by product, groupID, languageID, and merchantID. The product is identified either by the productID query parameter, or by partNumber and supplierNumber query parameters. The request has userID, groupID, and languageID cookies. The parent fragment would require two rules, which are specified as:
    Fragment: cacheid="(productID merchantID, [languageID]) (partNumber supplierNumber merchantID, [languageID])"

The first rule is tried. If it succeeds, then it determines the cache ID. If it fails, the second rule is tried. If the second rule succeeds, then it determines the cache ID. If it fails, the fragment is not cached. The first rule means that the cache ID is the following parts concatenated together:
    (A) the URI path;
    (B) the name and value of the productID query parameter;
    (C) the name and value of the merchantID query parameter; and
    (D) the name and value of the languageID cookie if present in the request.

An example of the cache ID for the first rule would be:
    http://www.acmeStore.com/
productDesc.jsp_productID=A
T13394_merchantID=MyStore_languageID-eng The second rule means that the cache ID is the following parts concatenated together:
    (A) the URI path;
    (B) the name and value of the partNumber query parameter;
    (C) the name and value of the supplierNumber query parameter;
    (D) the name and value of the merchantID query parameter; and
    (E) the name and value of the languageID cookie if present in the request.

An example of a cache ID for the second rule would be:
    http://www.acmeStore.com/
productDesc.jsp_partNumber=22984Z_supplierNumber=339001_merchantID=MyStore_languageI D=eng The child fragment requires two rules, which are specified as follows:
    Fragment: cacheid="(productID merchantID, [groupID] [languageID]) (partNumber supplierNumber merchantID, [groupID] [languageID])"

The first rule is tried. If it succeeds, then it determines the cache ID. If it fails, then the second rule is tried. If the second rule succeeds, then it determines the cache ID. If the second rule fails, the fragment is not cached. The first rule means that the cache ID is the following parts concatenated together:
    (A) the URI path;
    (B) the name and value of the productID query parameter;
    (C) the name and value of the merchantID query parameter;
    (D) the name and value of the groupID cookie if it is present in the request; and
    (E) the name and value of the languageID cookie if it is present in the request.

An example of a cache ID for the first rule would be:
    http://www.acmeStore.com/productDesc.jsp_productID=A     T13394_merchantID=MyStore_groupID=*@#!_languageID=eng The second rule means that the cache ID is the following parts concatenated together:
    (A) the URI path;
    (B) the name and value of the partNumber query parameter;
    (C) the name and value of the supplierNumber query parameter;
    (D) the name and value of the merchantID query parameter;
    (E) the name and value of the groupID cookie; and
    (F) the name and value of the languageID cookie.

Figure 11F:
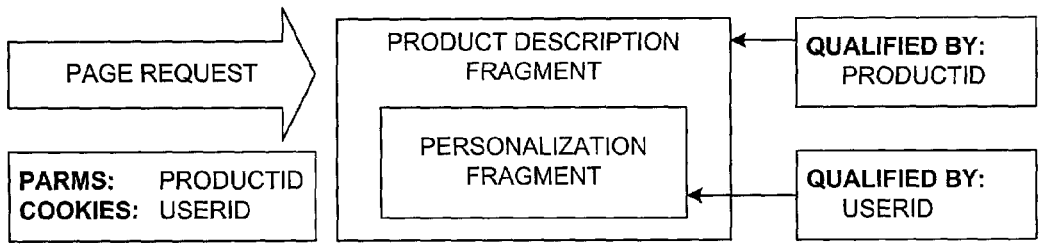

An example of a cache ID for the second rule would be:
    http://www.acmeStore.com/productDesc.jsp_partNumber=22984Z_supplierNumber=339001_merchantID=MyStore_groupID=* @#!_language=eng Referring to FIG. 11F, an extension to the product description scenario using personalization is provided. A parent product description fragment contains a child personalization fragment. The parent fragment is logically qualified by the productID. The child fragment is logically qualified by the userID. The page URI has a productID query parameter. The request has a userID cookie.

The parent cache ID includes the productID query parameter. The cache ID rule for the parent fragment would be either of the following two cases:
    Fragment: cacheid="URI"

In other words, the cache ID is the full URI with all query parameters. Another potential rule would be:
    Fragment: cacheid="(productId)"

In other words, the cache ID is the following parts concatenated together:
    (A) the URI path; and
    (B) the name and value of the productID query parameter.

It should be noted that even though the request for this page includes a userID cookie, it is not included in the cache ID for either fragment because the fragment is product-specific and not user-specific. If it were included, then this fragment would only be accessible by that user, resulting in a larger cache and more work to keep the cache updated. An example of a cache ID would be:

http://www.acmeStore.com/productDesc.jsp_productID=A T13394

The child personalization fragment's cache ID includes a userID cookie. The child fragment's cache ID rule would be:

Fragment: cacheid="(, userId)"

In other words, the cache ID is the following parts concatenated together:

(A) the URI path; and
(B) the name and value of the userID cookie.

An example of a cache ID would be:

http://www.acmeStore.com/personalization.jsp_userID=@($*!%

In this personalization example, the personalization fragments should be marked as private data, e.g., by using "Cache-Control: private".

Figure 11G:
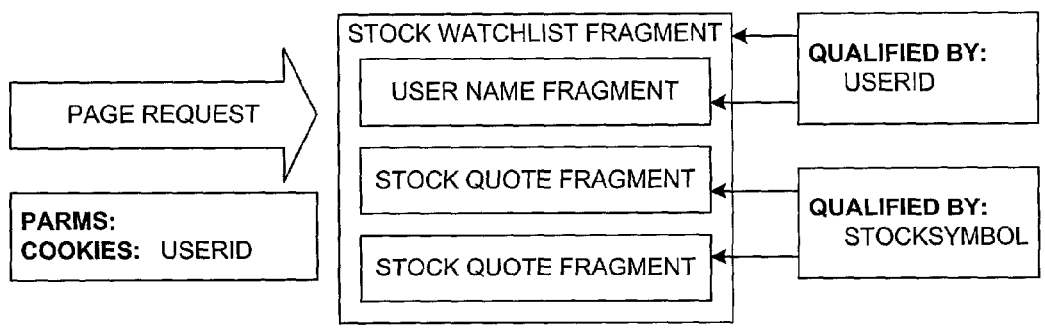

Referring to FIG. 11G, a parent stock watchlist fragment on a simple portal page contains multiple child stock quote fragments. The parent fragment also contains the user's name as a simple personalization. The parent is logically qualified by userID, i.e. the list of stock symbols is user-specific. The user name is logically qualified by the userID. Each child is logically qualified by its stock symbol, i.e. a stock's value is not user-specific. The page URI contains no query parameters. The request has a userID cookie.

The top-level fragment contains a required user-specific list of stock quotes. The top-level fragment's URI contains no query parameters. The top-level fragment's cache ID includes an encrypted cookie named userID. The cache ID rule would be:

Fragment: cacheid="(, userId)"

In other words, the cache ID is the following parts concatenated together:

(A) the URI path; and
(B) the name and value of the userID cookie.

An example of a cache ID would be:

http://www.acmeInvest.com/stockList.jsp_userID=@($*!%

For each of the stock quote fragments, the cache ID includes the "symbol" parameter. The cache ID rule would be the full URI or the URI path plus the stockSymbol query parameter:

Fragment: cacheid="(stockSymbol)"

In other words, the cache ID is the following parts concatenated together:

(A) the URI path; and
(B) the name and value of the symbol query parameter.

An example of a cache ID would be:

http://www.acmeInvest.com/stockQuote.jsp_stockSymbol=IBM

This scenario can be modified to use the FOREACH feature; the stock quote fragments would not change, but the parent fragment can be highly optimized. There is only one static top-level fragment. A stocksymbols cookie would be used whose value is a blank-separated list of stock symbols for the user. There would be only one parent fragment for all users that is quite static, which contains a FRAGMENTLINK tag whose FOREACH attribute would name the stockSymbols cookie. This dynamically generates a simple FRAGMENTLINK for each stock symbol whose SRC attribute is the same as the SRC of the FRAGMENTLINK containing the FOREACH attribute with the stock symbol added as a query parameter. Because this parent fragment is the same for all users, it can be cached with the correct qualifications with a single cache rule that uses its URI as the cache ID, which has no query parameters, as follow:

Fragment: cacheid="URI"

The stocksymbols cookie contains all the user-specific information for the parent fragment and travels with the page request, so it satisfies the parent's logical userID qualification.

A userName cookie whose value is the user's name would be used in a FRAGMENTLINK tag for the simple personalization whose SRC attribute identifies the userName cookie. This fragment is not cached since it can easily be generated from the userName cookie. The userName cookie contains all the user-specific information for this fragment and travels with the page request, so it satisfies the parent's logical userID qualification.

The single cache ID rule for the child fragment uses its URI for the cache ID so that it can be cached with the correct qualifications, as follows:

Fragment: cacheid="URI"

In this stock watchlist scenario, when the FOREACH feature is not being used, the top-level stock watchlist fragments would be marked private, e.g., by using "Cache-Control: private". When the FOREACH feature is used, then there is only one top-level fragment that is shared, so it is not marked private.

Figure 11H:
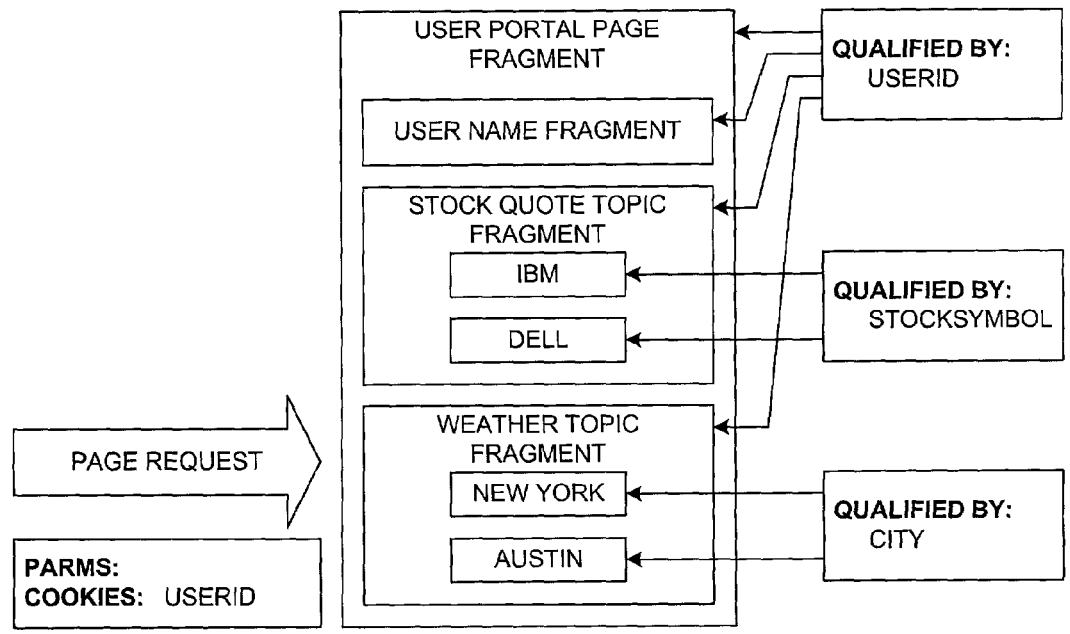

Referring to FIG. 11H, the example depicts a scenario that is similar to a personalized portal page, such as myYahoo!. A first-level portal fragment contains multiple mid-level topic fragments, such as stocks, weather, sports, each of which contains multiple leaf item fragments. The parent fragment also contains the user's name. The top-level portal fragment is logically qualified by the userID, i.e. the list of topics is user-specific. The user name is logically qualified by the userID. The mid-level topics fragment is logically qualified by the topicID and userID, i.e. the list of items in the topic is user-specific. The leaf item fragment is logically qualified by the itemID, i.e. an item's value is not user-specific. The page URI contains no query parameters. The page request has a userID cookie. Through the use of the FOREACH feature, the parent fragment can be highly optimized.

Using the FOREACH feature, a topics cookie (created during logon based on user profile) would be used whose value is a blank-separated list of topicIDs for that user. There would be only one parent fragment for all users that is quite static, containing a FRAGMENTLINK tag whose FOREACH attribute would name the topics cookie. This dynamically generates a simple FRAGMENTLINK for each topicID, whose SRC attribute is the same as the SRC of the FRAGMENTLINK containing the FOREACH attribute with the topicID appended as a query parameter. Because this parent fragment is the same for all users, it can be cached with the correct qualifications with a single cache rule that uses its URI as the cache ID, which has no query parameters, as follows:

Fragment: cacheid="URI"

The topics cookie contains all the user-specific information for the parent fragment and travels with the page request, so it satisfies the parent's logical userID qualification. A userName cookie whose value is the user's name would be used in a FRAGMENTLINK for the simple personalization whose SRC attribute identifies the userName cookie. This fragment is not cached since it can easily be generated from the userName cookie. The userName cookie contains all the user-specific information for this fragment and travels with the page request, so it satisfies the parent's logical userID qualification.

There is a topic fragment for each topic. Because of the FOREACH feature, each of the topic fragments can be highly optimized. For each topic, a cookie (created during logon based on user profile) would be used whose value is a blank-separated list of itemIDs for that user and topic. For each topic, there would be only one topic fragment for all users that is quite static containing a FRAGMENTLINK whose FOREACH attribute would name the corresponding cookie for that topic. This dynamically generates a simple FRAGMENTLINK for each itemID whose SRC attribute is the SRC of the FRAGMENTLINK containing the FOREACH attribute with the itemID added as a query parameter (the topicID query parameter is already there). Because each topic fragment is the same for all users, it can be cached with the correct qualifications with a single cache rule that uses its URI as the cache ID, which has its topicID as a query parameter. The topics cookie contains all the user-specific information for the topic fragment and travels with the page request, so it satisfies the topic fragment's logical userID qualification.

The URI for each item fragment contains its topicID and itemID as query parameters. The single cache ID rule for each item fragment uses its URI for the cache ID, so it can be cached with the correct qualifications.

Examples for the Specification of FRAGMENTLINK Tags

Referring again to the sidebar example in FIG. 11A, a single FRAGMENTLINK would be placed in the page instead of the sidebar and in the same location where the sidebar is desired, such as:

{fragmentlink src="http://www.acmeStore.com/sidebar.html"}

Referring again to the shopper group example in FIG. 11C, a single FRAGMENTLINK would be located where the price would be, such as:

{fragmentlink src="http://www.acmeStore.com/productPrice.jsp"}

The URI that is constructed for a particular price fragment would look as follows:

http://www.acmeStore.com/productPrice.jsp?productID=AT13394

The request for the fragment includes all of the parent's query parameters, i.e. "productId", and cookies, i.e. "groupId", so that they are available during the execution of productPrice.jsp in the application server.

Referring again to the personalization example in FIG. 11F, the top-level fragment would include a FRAGMENTLINK located where the personalized fragment is desired, such as:

{fragmentlink src="http://www.acmeStore.com/personalization.jsp"}

The URI that is constructed for a particular user-specific personalization fragment would look like as follows:

http://www.acmeStore.com/personalization.jsp?productID=AT13394

The request for the fragment includes all of the parent's query parameters (ie, "productId") and cookies (ie, "userId"). During the execution of personalization.jsp, the "userId" cookie is used but the "productId" query parameter is ignored.

Referring again to the stock watchlist example in FIG. 11G, the top-level fragment would include a variable number of FRAGMENTLINK tags that depends on how many stock quotes that the user wanted. Each FRAGMENTLINK tag would be located where the stock quotes would be. Each would look as follows:

{fragmentlink
 src="http://www.acmeInvest.com/stockQuote.jsp?symbol=IBM"}

The URI that is constructed for a particular stock quote fragment would look as follows:
http://www.acmeInvest.com/stockQuote.jsp?symbol=IBM This scenario can be modified to use the FOREACH feature; the variable number of FRAGMENTLINK tags are replaced by a single FRAGMENTLINK tag with the FOREACH attribute specifying the name of a cookie (stocks) whose value is a blank-separated list of stock symbol parameters:

{fragmentlink
 src="http://www.acmeInvest.com/stockQuote.jsp"
 foreach="stocks"}

If the value of the cookie named "stocks" was
symbol=IBM symbol=CSCO symbol=DELL then this would be equivalent to the following set of FRAGMENTLINK tags:

{fragmentlink
 src="http://www.acmeInvest.com/stockQuote.jsp?symbol=IBM"}
{fragmentlink
 src="http://www.acmeInvest.com/stockQuote.jsp?symbol=CSCO"}
{fragmentlink
 src="http://www.acmeInvest.com/stockQuote.jsp?symbol=DELL"}

Referring again to the full portal example in FIG. 11H, the FOREACH feature can be used for a single static top-level fragment that would be shared by all users. The userName in the top-level fragment would be included using the following FRAGMENTLINK that identifies the userName cookie, which contains the user's name:

fragmentlink src="cookie://userName"}

The top-level fragment would also have a FRAGMENTLINK tag whose FOREACH attribute identifies the topics cookie, which contains that user's list of topics:

{fragmentlink
 src="http://www.acmePortal.com/portalPage.jsp"
 foreach="topics"}

This cookie contains a list of topicIDs. For a topics cookie whose value is the following:
topic=stocks topic=weather topic=tv the above FRAGMENTLINK containing the FOREACH attribute would generate the following simple FRAGMENTLINKS:

```
{fragmentlink
    src="http://www.acmePortal.com/portalPage.jsp?topic=
stocks"}
{fragmentlink
    src="http://www.acmePortal.com/portalPage.jsp?topic=
weather"}
{fragmentlink
    src="http://www.acmePortal.com/portalPage.jsp?topic=
tv"}
```

Each of the dynamically generated SRC attributes locates a fragment that handles the specified topic.

The implementation of "portalPage.jsp" in the Web application server acts as a dispatcher that calls a fragment based on the query parameters. No parameter returns the top-level fragment. A "topic=stocks" query parameter returns the stocks topic fragment. Using the stocks topic fragment as an example, and again using the FOREACH feature, the stocks topic fragment contains a FRAGMENTLINK whose FOREACH attribute identifies a stocks cookie, which contains that user's list of stock symbols for that topic:

```
{fragmentlink
    src="http://www.stockQuotes.com/stockQuote.jsp"
    foreach="stocks"}
```

An exemplary use of this would be to generate rows of a table with a row for each stock symbol in the stocks cookie. For a "stocks" cookie whose value is symbol=IBM symbol=DELL symbol=CSCO the above FRAGMENTLINK containing the FOREACH attribute would dynamically generate the following FRAGMENTLINKS:

```
{fragmentlink
    src="http://www.stockQuotes.com/stockQuote.jsp?symbol=
IBM"}
{fragmentlink
    src="http://www.stockQuotes.com/stockQuote.jsp?symbol=
DELL"}
{fragmentlink
    src="http://www.stockQuotes.com/stockQuote.jsp?symbol=
CSCO"}
```

Examples of Passing Data From Parent Fragment to Child Fragment

A fragment should be as self-contained as possible. There are two reasons for this. The first reason is that good software engineering dictates that software modules should be as independent as possible. The number and complexity of contracts between modules should be minimized, so that changes in one module are kept local and do not propagate into other modules. For example, an application might get data in a parent module and pass this data into a child module that formats it. When this is done, there has to be a contract describing what the data is and how it is to be passed in. Any change in what data is needed by the child module requires changes to both modules. Instead, if the child module gets its own data, then the change is kept local. If there is a need to make either module independent of how its data is obtained, or the code that obtains its data is the same in several modules, then a separate data bean and a corresponding contract can be used to accomplish either of these requirements. However, adding yet another contract between the parent and child modules is only added complexity without accomplishing anything.

The second reason that a fragment should be as self-contained as possible is that to make caching efficient, the code that generates a fragment should be self-contained. In the above example, if the parent module gets all the data for the child module and passes it into the child, then the child itself only does formatting. With this dependency between modules, if the data needed by the child module becomes out of date, then both the parent and child have to be invalidated and generated again. This dependency makes caching of the separate fragments much less effective. A fragment that is shared by multiple parents complicates both of the above problems.

The JSP programming model allows data to be passed between JSPs via request attributes or session state. For nested fragments, the request attribute mechanism does not work because the parent and child JSPs may be retrieved in different requests to the application server. Also, the session state mechanism may not work if the parent and child can be executed in different sessions. Instead, any information that should be passed should use URI query parameters or cookies. Even a complex data structure that was passed from parent to child using request attributes could still be passed by serializing it and including it as a query parameter in the URI in the FRAGMENTLINK tag's SRC attribute.

Even when fragments get their own data, there is still a need to pass some control data between them. Referring to the above examples again, in the sidebar scenario, no data is passed from the top-level fragments to the sidebar. In the shopper group scenario, the top-level product-description fragment needs to know the product ID, and the child group-product specific price needs both the product ID and the shopper group ID. The product ID is supplied by the external request. The shopper group ID is generated by the application using the user ID, both of which are generated at logon. Both the product ID and the shopper group ID should be passed through the product description fragment to the price fragment. All URI query parameters and cookies are automatically passed to the child fragment.

In the personalization scenario, the top-level product description fragment needs to know the product ID, and the child personalization fragment needs to know the user ID. Both of these parameters are supplied by the external request, so the user ID should be passed through the product description fragment to the personalization fragment. This is done by passing the cookie named "userId" on to the child fragment.

In the stock watchlist scenario, the top-level stock watchlist fragment needs to know the user ID cookie, and each of the child stock quote fragments need to know the stock symbol. The stock symbols and the FRAGMENTLINK tags that contain them are generated as part of the top-level stock watchlist fragment. The stock symbol should be passed to the stock quote fragment. This is done by putting the stock symbol as a query parameter of the URI in the SRC attribute of the FRAGMENTLINK.

Examples of FRAGMENTLINK Tags and FRAGMENT Headers

With reference now to Tables 1A-1C, a set of HTML and HTTP statements are shown for the sidebar example discussed above. Both fragments within this scenario are static. The parent top-level fragment would be a JSP because it contains another fragment using a "jsp:include" and because cache control information needs to be associated with the parent fragment. The child sidebar fragment is also a JSP because caching control information needs to be associated with it, but it does not contain any JSP tags.

Table 1A shows a JSP including HTML statements for the top-level fragment that contains the sidebar fragment.

TABLE 1A

```
{html}
{head}
    {title}A page containing a side bar.{/title}
{/head}
{body}
    {!-- Add the side bar. --}
    {jsp:include page="/sidebar.html"}
    {p}This is the rest of the body.
{/body}
{/html}
```

Table 1B shows the HTTP output that would be generated by a Web application server for the top-level fragment.

TABLE 1B

```
HTTP/1.1 200 OK
Date: Mon, 23 Apr 2002 17:04:04 CMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 246
Content-Type: text/html
Cache-Control: no-cache fragmentrules
Pragma: no-cache
Fragment: cacheid="URL"
Cache-Control: max-age=600
Fragment: contains-fragments
{html}
{head}
    {title}A page containing a side bar.{/title}
{/head}
{body}
{%-- Add the side bar --%}
    fragmentlink src="http://www.acmeStore.com/sidebar.html"}
    . . . This is the rest of the body . . .
{/body}
{/html}
```

Table 1C shows the HTTP output that would be generated by a Web application server for the sidebar fragment.

TABLE 1C

```
HTTP/1.1 200 OK
Date: Mon, 23 Apr 2002 17:04:04 GMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 82
Content-Type: text/html
Cache-Control: no-cache fragmentrules
Pragma: no-cache
Fragment: cacheid="URL"
Cache-Control: max-age=6000
{html}
{body}
{p}This is the side bar body.
{/body}
{/html}
```

With reference now to Tables 2A-2D, a set of HTML and HTTP statements are shown for the shopper group example discussed above. Both fragments within this scenario are dynamic. A JSP is used for the top-level fragment that contains the product-group-specific price fragment. The child fragment is also a JSP because it contains business application logic for obtaining the appropriate price.

Table 2A shows a JSP containing HTML statements for the top-level product description fragment that contains the child fragment.

TABLE 2A

```
{html}
{head}
    {title}.Product description.{/title}
{/head}
{body}
{h1}Product with Shopper Group.{/h1}
{%@ page    language="java"
            import="com.acmeStore.databeans.*"
%}
{%
    // Add the product description.
    ProductSGDataBean databean = new ProductSGDataBean( );
    databean.setProductId(request.getParameter("productId"));
    databean.execute( );
    out.println("{p}Product id is" + databean.getProductId( ));
%}
{%-- Add the price ---%}
{jsp:include page="/groupPrice.jsp"}
{/body}
{/html}
```

Table 2B shows the HTTP output that would be generated by a Web application server for the product description fragment.

TABLE 2B

```
HTTP/1.1 200 OK
Date: Mon, 23 Apr 2002 17:04:04 GMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 82
Content-Type: text/html
Cache-Control: no-cache fragmentrules
Pragma: no-cache
Fragment: cacheid="(productId)"
Cache-Control: max-age=600
Fragment: contains-fragments
{html}
{head}
    {title}Product description.{/title}
{/head}
{body}
{h1}Product with Shopper Group.{/h1}
    . . . The formatted product descriptions would be here . . .
    {fragmentlink src="http://www.acmeStore.com/groupPrice.jsp"}
{/body}
{/html}
```

Table 2C shows a JSP containing HTML statements for the child product-group-specific price fragment.

TABLE 2C

```
{html}
{body }
{%@ page language="java"
        import="com.acmeStore.databeans.*"%}
{% // Get the groupd from its cookie.
    Cookie[ ] cookies = request.getCookies( );
    String groupId = null;
    for (int i = 0; i {cookies.length; i++) {
        if (cookies[i].getName( ).equals("groupId")) {
            groupId = cookies[i].getValue( );
        }
```

TABLE 2C-continued

```
        }
        // Get the price.
        GroupPriceDataBean databean = new GroupPriceDataBean( );
        databean.setGroupId(groupId);
        databean.execute( );
        String price = databean.getPrice( );
        out.println("{p}Price is" + price); %}
    {/body}
    {/html}
```

Table 2D shows the HTTP output that would be generated by a Web application server for the product-group-specific price fragment.

TABLE 2D

```
HTTP/1.1 200 OK
Date: Mon, 23 Apr 2002 17:04:04 GMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 82
Content-Type: text/html
Cache-Control: private
Cache-Control: no-cache fragmentrules
Pragma: no-cache
Fragment: cacheid="(productId, groupId)"
Fragment: dependencies="http://www.acmeStore.com__groupid=*@#!"
{html}
{body}
     Price is $24.99
{/body}
{/html}
```

With reference now to Tables 3A-3D, a set of HTML and HTTP statements are shown for the personalization example discussed above. Both fragments within this scenario are dynamic. A JSP that generates the top-level product fragment contains a single user-specific personalization fragment. The child fragment is also a JSP because it contains business application logic for obtaining the appropriate personalization data for the user.

Table 3A shows a JSP containing HTML statements for the top-level product description fragment that contains the child fragment.

TABLE 3A

```
{html}
{head}
{title}Product description.{/title}
{/head}
{body}
{%@ page language="java"
    import="com.acmeStore.databeans.*,com.acmeStore.formatters.*"
%}
{%
    // Add the product description.
    ProductDataBean databean = new ProductDataBean( );
    databean.setProductId(request.getParameter("productId"));
    databean.execute( );
    ProductFormatter productFormatter = new ProductFormatter( );
    out.println(productFormatter.format(databean));
%}
{%-- Add the personalization --%}
{jsp:include page="/personalization.jsp"}
{/body}
{/html}
```

Table 3B shows the HTTP output that would be generated by a Web application server for the product description fragment.

TABLE 3B

```
HTTP/1.1 200 OK
Date: Mon, 23 Apr 2002 17:04:04 GMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 82
Content-Type: text/html
Cache-Control: no-cache fragmentrules
Pragma: no-cache
Fragment: cacheid="(productId)"
Cache-Control: max-age=600
Fragment: contains-fragments
{html}
{head}
    {title}Product description.{/title}
{/head}
{body}
{h1}Product with Shopper Group.{/h1}
    . . . The formatted product descriptions would be here . . .
    {fragmentlink src="http://www.acmeStore.com/personalization.jsp"}
{/body}
{/html}
```

Table 3C shows a JSP containing HTML statements for the child user-specific fragment.

TABLE 3C

```
{html}
{body}
{%@ page language="java"
    import="com.acmeStore.databeans.*" %}
{% // Get the userId from the userId cookie.
    Cookie[ ] cookies = request.getCookies( );
    String userId = null;
    for (int i = 0; i { cookies.length; i++) {
        if (cookies[i] .getName( ) .equals("userId")) {
            userId = cookies[i] .getValue( ); } }
    "dependencies=\"http://www.acmeStore.com/userId=@($*!%\"");
    response.addHeader("Fragment", "cacheid=\"(, userId)\"");
    // this one depends on userId:
    response.addHeader("Fragment",
        "dependencies=\"http://www.acmeStore.com/userId=" +
        userId + "\"");
    // Create the personalization.
    PersonalizationDataBean databean =
            new PersonalizationDataBean( );
    databean.setUserId(userId);
    databean.execute( );
    String personalization = databean.getPersonalization( );
    out.println(personalization); %}
{/ body}
{/html}
```

Table 3D shows the HTTP output that would be generated by a Web application server for the child fragment.

TABLE 3D

```
HTTP/1.1 200 OK
Date: Mon, 23 Apr 2002 17:04:04 GMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 82
Content-Type: text/html
Cache-Control: private
Cache-Control: no-cache fragmentrules
Pragma: no-cache
```

TABLE 3D-continued

```
Fragment: cacheid="(, userId)"
Fragment: dependencies="http://www.acmeStore.com__userId=@($*!%"
{html}
{body}
    ... The personalization would be here ...
{/body}
{/html}
```

With reference now to Tables 4A-4F, a set of HTML and HTTP statements are shown for the stock watchlist example discussed above. Both fragments within this scenario are dynamic.

Table 4A shows a JSP that generates the top-level stock watchlist fragment that contains multiple stock quote fragments. The "jspext:cookie" tag displays the user name that is in a cookie named "userName". This example dynamically generates a variable number of "RequestDispatcher.include" method invocations, each generating a FRAGMENTLINK tag in the output.

TABLE 4A

```
{html}
{head}
{title}Stock watch list.{/title}
{/head}
{body}
{%@ page    language="java"
            import="com.acmeInvest.databeans.*"
%}
{%
    // Get the userId from the userId cookie.
    Cookie[ ] cookies = request.getCookies( );
    String userId = null;
    for (int i = 0; i { cookies.length; i++) {
        if (cookies[i] .getName( ) .equals("userId")) {
            userId = cookies[i] .getValue( );
        }
    }
%}
{table border}
    {tr}
        {th colspan=2 align=center}
        {jspext:cookie name="userName"}'s Stock Watch List:
        {/th}
    {/tr}
    {tr}
        {th align=center}Symbol{/th}
        {th align=center}Price{/th}
    {/tr}
{%
    // Add the stock watch list rows to the table.
    StockListDataBean databean = new StockListDataBean( );
    databean.setUserId(userId);
    databean.execute ( );
    String[ ] symbols = databean.getStockSymbolList( );
    for (int i = 0; i { symbols.length; i++) {
        String url = "/stockQuote.jsp?stockSymbol=" + symbols[i];
        ServletContext servletContext = getServletContext( );
        RequestDispatcher requestDispatcher =
        servletContext.getRequestDispatcher("/stockQuote.jsp");
        requestDispatcher.include(request, response);
    }
%}
{/table}
{/body}
{/html}
```

Table 4B shows the HTTP output that would be generated by a Web application server for the stock watchlist fragment.

TABLE 4B

```
HTTP/1.1 200 OK
Date: Mon, 23 Apr 2002 17:04:04 GMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 82
Content-Type: text/html
Cache-Control: private
Cache-Control: no-cache fragmentrules
Pragma: no-cache
Fragment: cacheid="(, userId)"
Fragment: contains-fragments
{html}
{body}
{table border}
    {tr}
        {th colspan=2 align=center}
        {fragmentlink src="cookie://userName"}'s Stock Watch List:
        {/th}
    {/tr}
    {tr}
        {th align=center}Symbol{/th}
        {th align=center}Price{/th}
    {/tr}
    {fragmentlink
    src="http://www.acmeInvest.com/stockQuote.jsp?symbol=IBM"}
    {fragmentlink
    src="http://www.acmeInvest.com/stockQuote.jsp?symbol=CSCO"}
    {fragmentlink
    src="http://www.acmeInvest.com/stockQuote.jsp?symbol=DELL"}
{/table}
{/body}
{/html}
```

Table 4C shows a JSP that generates the top-level stock watchlist fragment that incorporates a FOREACH attribute.

TABLE 4C

```
{html}
{head}
{title}Stock watch list.{/title}
{/head}
{body}
{%@ page    language="java"
            import="com.acmeInvest.databeans.*" % }
{table border}
    {tr}
        {th colspan=2 align=center}
        {jspext:cookie name="userName"}'s Stock Watch List:
        {/th}
    {/tr}
    {tr}
        {th align=center}Symbol{/th}
        {th align=center}Price{/th}
    {/tr}
    {jspext:include page="/stockQuote.jsp" foreach="stocks"}
{/table}
{/body}
{/html}
```

Table 4D shows the HTTP output that would be generated by a Web application server for the top-level stock watchlist fragment that incorporates a FOREACH attribute.

TABLE 4D

```
HTTP/1.1 200 OK
Date: Mon, 23 Apr 2002 17:04:04 GMT
Server: IBM__HTTP__Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 246
```

TABLE 4D-continued

```
Content-Type: text/html
Cache-Control: no-cache fragmentrules
Pragma: no-cache
Fragment: contains-fragments
Fragment: cacheid="URL"
Cache-Control: max-age=600
{html}
{head}
    {title}Stock watch list.{/title}
{/head}
{body}
    {table border}
        {tr}
        {th colspan=2 align=center}
        {fragmentlink src="cookie://userName"}'s Stock Watch List:
        {/th}
        {/tr}
        {tr}
            {th align=center}Symbol{/th}
            {th align=center}Price{/th}
        {/tr}
        {fragmentlink
                src="http://www.acmeInvest.com/stockQuote.jsp"
                foreach="stocks"}
    {/table}
{/body}
{/html}
```

Table 4E shows a JSP that generates the individual stock quote.

TABLE 4E

```
{html}
{body}
{%@ page    language="java"
            import="com.acmeInvest.databeans.*"
%}
{%
    // Add the stock quote.
    StockQuoteDataBean databean = new StockQuoteDataBean( );
    String symbol = request.getParameter("symbol");
    databean.setStockSymbol(symbol);
    databean.execute( );
    String quote = databean.getStockQuote( );
    String rtn =
        "{tr}" +
        "{td align=center}" + symbol + "{/td}" +
        "{td align=right}" + quote + "{/td}" +
        "{/tr}";
    out.println(rtn);
%}
{/body}
{/html}
```

Table 4F shows the HTTP output that would be generated by a Web application server for a symbol query parameter "IBM".

TABLE 4F

```
HTTP/1.1 200 OK
Date: Mon, 23 Apr 2002 17:04:04 GMT
Server: IBM_HTTP_Server/1.3.6.2 Apache/1.3.7-dev (Unix)
Last-Modified: Wed, 11 Apr 2001 21:05:09 GMT
ETag: "b7-d8d-3ad4c705"
Accept-Ranges: bytes
Content-Length: 82
Content-Type: text/html
Cache-Control: private
Cache-Control: no-cache fragmentrules
Pragma: no-cache
Fragment: cacheid="(, userId)"
Cache-Control: max-age=1200
{html}
```

TABLE 4F-continued

```
{body}
    {tr}
        {td align=center}IBM{/td}
        {td align=right}$112.72{/td}
    {/tr}
{/body}
{/html}
```

Conclusion

The advantages of the present invention should be apparent in view of the detailed description of the invention that is provided above. A fragment caching technique can be implemented within a cache management unit that may be deployed in computing devices throughout a network such that the cache management units provide a distributed fragment caching mechanism.

A FRAGMENT header is defined to be used within a network protocol, such as HTTP; the header associates metadata with a fragment for various purposes related to the processing and caching of a fragment. For example, the header is used to identify whether either the client, server, or some intermediate cache has page assembly abilities. The header also specifies cache ID rules for forming a cache identifier for a fragment; these rules may be based on a URI for the fragment, or the URI path and some combination of the query parameters from the URI, and cookies that accompany the request. In addition, the header can specify the dependency relationships of fragments in support of host-initiated invalidations.

The FRAGMENTLINK tag is used to specify the location in a page for an included fragment which is to be inserted during page assembly or page rendering. A FRAGMENTLINK tag is defined to contain enough information to either find the linked fragment in a cache or to retrieve it from a server. Cache ID rules are used both when a fragment is being stored in the cache and when processing a source identifier from a request to find the fragment within a cache. To find the fragment in the cache, the cache ID rules that are associated with the fragment's URI path are used to determine the cache ID. The rules allow a high degree of flexibility in forming a cache ID for a fragment without having to deploy a computer program that forces a standard implementation for cache ID formation. Multiple cache ID rules may be used. The cache ID rules allow a cache ID to be a full URI for a fragment or the URI and a combination of query parameters or cookies. This scheme allows the same FRAGMENTLINK to locate different fragments depending on the parent fragment's query parameters and cookies; for example, a user ID cookie in the request for a product description page could be used to form the cache ID for a personalization fragment.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer storage medium include media such as EPROM, ROM, tape, floppy disc, hard disk drive, RAM, and CD-ROMs.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing objects within a data processing system in a network, the method comprising:
   receiving a message at a computing device, wherein the message comprises a set of message headers and a message body, wherein the message body contains a top-level fragment comprising a first linking element to a first next-level fragment;
   in response to determining that the first linking element comprises an expansion attribute, generating a set of linking elements in accordance with at least one parameter associated with the expansion attribute;
   retrieving a cookie name parameter associated with the expansion attribute;
   retrieving a cookie value associated with the cookie name; and
   retrieving an expansion parameter name and an expansion parameter value from the cookie value.

2. The method of claim 1 further comprising:
   parsing the cookie value as a string comprising a list of name-value pairs.

3. An apparatus for processing objects within a data processing system in a network, the apparatus comprising:
   means for receiving a message at a computing device, wherein the message comprises a set of message headers and a message body, wherein the message body contains a top-level fragment comprising a first linking element to a first next-level fragment;
   means for generating, in response to determining that the first linking element comprises an expansion attribute, a set of linking elements in accordance with at least one parameter associated with the expansion attribute;
   means for retrieving a cookie name parameter associated with the expansion attribute;
   means for retrieving a cookie value associated with the cookie name; and
   means for retrieving an expansion parameter name and an expansion parameter value from the cookie value.

4. The apparatus of claim 3 further comprising:
   means for parsing the cookie value as a string comprising a list of name-value pairs.

5. A computer program product in a computer readable storage medium for use within a data processing system in a network for processing objects, the computer program product comprising:
   instructions for receiving a message at a computing device, wherein the message comprises a set of message headers and a message body, wherein the message body contains a top-level fragment comprising a first linking element to a first next-level fragment;
   instructions for generating a set of linking elements in accordance with at least one parameter associated with the expansion attribute in response to determining that the first linking element comprises an expansion attribute;
   instructions for retrieving a cookie name parameter associated with the expansion attribute;
   instructions for retrieving a cookie value associated with the cookie name; and
   instructions for retrieving an expansion parameter name and an expansion parameter value from the cookie value.

6. The computer program product of claim 5 further comprising:
   instructions for parsing the cookie value as a string comprising a list of name-value pairs.

* * * * *